(12) United States Patent
Hagadorn et al.

(10) Patent No.: US 10,829,569 B2
(45) Date of Patent: *Nov. 10, 2020

(54) POLYMERS PRODUCED VIA USE OF VINYL TRANSFER AGENTS

(71) Applicant: ExxonMobil Chemical Patents Inc., Baytown, TX (US)

(72) Inventors: John R. Hagadorn, Houston, TX (US); Jo Ann M. Canich, Houston, TX (US); Matthew W. Holtcamp, Huffman, TX (US); Patrick J. Palafox, Hattiesburg, MS (US); Ramyaa Mathialagan, Baytown, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 58 days.

This patent is subject to a terminal disclaimer.

(21) Appl. No.: 15/744,513

(22) PCT Filed: Aug. 10, 2016

(86) PCT No.: PCT/US2016/046402
§ 371 (c)(1),
(2) Date: Jan. 12, 2018

(87) PCT Pub. No.: WO2017/039993
PCT Pub. Date: Mar. 9, 2017

(65) Prior Publication Data
US 2018/0201698 A1    Jul. 19, 2018

Related U.S. Application Data

(60) Provisional application No. 62/212,405, filed on Aug. 31, 2015.

(51) Int. Cl.
*C08F 4/76* (2006.01)
*C08F 4/64* (2006.01)
(Continued)

(52) U.S. Cl.
CPC ...... *C08F 4/65927* (2013.01); *C08F 4/64148* (2013.01); *C08F 8/30* (2013.01);
(Continued)

(58) Field of Classification Search
CPC .............. C08F 4/64193; C08F 4/60193; C08F 4/64148; C08F 4/60148
See application file for complete search history.

(56) References Cited

U.S. PATENT DOCUMENTS 5,821,374 A    10/1998  Jenny et al.
6,103,657 A    8/2000   Murray
(Continued)

FOREIGN PATENT DOCUMENTS

DE    3900479 A    7/1990
EP    2436703 B    4/2012
(Continued)

OTHER PUBLICATIONS

Nam, Y-G. et al., "Propene Polymerization with Stereospecific Metallocene Dichloride—[Ph3C] [B(C6F5)4] Using ω-Alkenylaluminum as an Alkylation Reagent and as a Functional Comonomer" Macromolecules, vol. 35, No. 18, pp. 6760-6762, 2002.
(Continued)

*Primary Examiner* — Rip A Lee

(57) ABSTRACT

Catalyst systems with single site transition metal complexes (such as pyridyldiamido transition metal complexes), an activator, and a metal hydrocarbenyl chain transfer agent (preferably an aluminum vinyl-transfer agent) are disclosed for use in alkene polymerization.

30 Claims, 2 Drawing Sheets

(51) Int. Cl.
C08F 4/6592 (2006.01)
C08F 10/02 (2006.01)
C08F 8/30 (2006.01)
C08F 8/42 (2006.01)
C08F 4/659 (2006.01)
C08F 110/02 (2006.01)

(52) U.S. Cl.
CPC ............... C08F 8/42 (2013.01); C08F 10/02 (2013.01); C08F 4/659 (2013.01); C08F 4/65908 (2013.01); C08F 4/65912 (2013.01); C08F 110/02 (2013.01); C08F 2420/02 (2013.01); C08F 2500/15 (2013.01)

(56) References Cited

U.S. PATENT DOCUMENTS

| | | | |
|---|---|---|---|
| 6,175,409 | B1 | 1/2001 | Nielsen et al. |
| 6,260,407 | B1 | 7/2001 | Petro et al. |
| 6,294,388 | B1 | 9/2001 | Petro |
| 6,306,658 | B1 | 10/2001 | Turner et al. |
| 6,406,632 | B1 | 6/2002 | Safir et al. |
| 6,436,292 | B1 | 8/2002 | Petro |
| 6,454,947 | B1 | 9/2002 | Safir et al. |
| 6,455,316 | B1 | 9/2002 | Turner et al. |
| 6,461,515 | B1 | 10/2002 | Safir et al. |
| 6,475,391 | B2 | 11/2002 | Safir et al. |
| 6,489,168 | B1 | 12/2002 | Wang et al. |
| 6,491,816 | B2 | 12/2002 | Petro |
| 6,491,823 | B1 | 12/2002 | Safir et al. |
| 6,900,321 | B2 | 5/2005 | Boussie et al. |
| 7,858,707 | B2 * | 12/2010 | Arriola .................. C08F 10/00 525/245 |
| 7,947,787 | B2 | 5/2011 | Carnahan et al. |
| 7,973,116 | B2 | 7/2011 | Hagadorn et al. |
| 8,394,902 | B2 | 3/2013 | Hagadorn et al. |
| 9,102,773 | B2 | 8/2015 | Hagadorn et al. |
| 10,450,388 | B2 | 10/2019 | Duchateau et al. |
| 10,465,018 | B2 | 11/2019 | Duchateau et al. |
| 2002/0142912 | A1 | 10/2002 | Boussie et al. |
| 2004/0220050 | A1 | 11/2004 | Frazier et al. |
| 2009/0306318 | A1 | 12/2009 | Boone et al. |
| 2010/0022726 | A1 | 1/2010 | Hagadorn et al. |
| 2010/0227990 | A1 | 9/2010 | Kuhlman et al. |
| 2011/0224391 | A1 | 9/2011 | Hagadorn et al. |
| 2011/0301310 | A1 | 12/2011 | Hagadorn et al. |
| 2012/0071616 | A1 | 3/2012 | Hagadorn et al. |
| 2014/0256893 | A1 | 9/2014 | Hagadorn et al. |
| 2014/0316089 | A1 | 10/2014 | Hagadorn et al. |
| 2015/0141590 | A1 | 5/2015 | Hagadorn |
| 2015/0141596 | A1 | 5/2015 | Hagadorn |
| 2015/0141601 | A1 | 5/2015 | Hagadorn et al. |
| 2017/0355787 | A1 * | 12/2017 | Duchateau ............ C08F 210/16 |
| 2018/0134827 | A1 * | 5/2018 | Hagadorn ............. C08F 210/06 |
| 2018/0201698 | A1 * | 7/2018 | Hagadorn ............. C08F 10/02 |

FOREIGN PATENT DOCUMENTS

| | | |
|---|---|---|
| JP | 2004083772 A | 3/2004 |
| JP | 2004083773 A | 3/2004 |
| JP | 2005-270146 A | 10/2005 |
| WO | 00/09255 A | 2/2000 |
| WO | 2002/38628 A | 5/2002 |
| WO | 2005/095469 A | 10/2005 |
| WO | 2007/035492 A | 3/2007 |
| WO | 2007/067965 A | 6/2007 |
| WO | 2010/037059 A | 4/2010 |
| WO | 2011/014533 A | 2/2011 |
| WO | 2012/134615 A | 10/2012 |
| WO | 2014/137927 A | 9/2014 |
| WO | 2017/039994 A | 3/2017 |
| WO | 2017/039995 A | 3/2017 |

OTHER PUBLICATIONS

Shiono, T. et al., "Isospecific Polymerization of Propene over TiCl3 Combined with Bis(.omega.-alkenyl)zinc Compounds", Macromolecules, vol. 28, pp. 437-443, 1995.

Weng, W. et al., "Long Chain Branched Isotactic Polypropylene" Macromolecules, vol. 35, No. 10, pp. 3838-3843, 2002.

Dekmezian, A.H. et al., "Characterization and Modeling of Metallocene-Based Branch—Block Copolymers", Macromolecules, vol. 35, No, 25, pp. 9586-9594, 2002.

Vaughan, A. et al., "Industrial Catalysts for Alkene Polymerization," Polymer Science: A Comprehensive Reference, vol. 3, Chapter 20, pp. 657-672, Elsevier B.V., 2012.

Gibson, V.C., et al., Advances in Non-Metallocene Olefin Polymerization Catalysis, Chem. Rev., vol. 103, pp. 283-315, 2003.

Britovsek, G.,et al., "The Search for New-Generation Olefin Polymerization Catalysts: Life Beyond Metallocenes", Angew. Chem. Int. Ed., vol. 38, p. 428-447, 1999.

Froese, R., et al., "Mechanism of Activation of Hafnium Pyridyl-Amide Olefin Polymerization Catalyst: Ligand Modification by Monomer" Journal of American Chemical Society, vol. 129, pp. 7831-7840, 2007.

Guerin, F. et al., "Conformationally Rigid Diamide Complexes of Zirconium: Electron Deficient Analogues of Cp2Zr", Organometallics, vol. 15, pp. 5586-5590, 1996.

Boussie, T. et al., "A Fully Integrated High-Throughput Screening Methodology for the Discovery of New Polyolefin Catalysts: Discovery of a New Class of High Temperature Single-Site Group (IV) Copolymerization Catalysts", Journal of American Chemical Society, vol. 125, pp. 4306-4317, 2003.

Okada et al., Sodium hypochlorate pentahydrate (NaOCl 5H20) crystals as an Extraordinary Oxidant for Primary and Secondary Alcohols, vol. 25, pp. 596-598, 2015.

Sorbye et al., "Preparation of Protected Serinol", Synthetic Communications, vol. 27, Issue 16, pp. 2813-2816 (1997).

* cited by examiner

POLYMERS PRODUCED VIA USE OF VINYL TRANSFER AGENTS

PRIORITY AND CROSS REFERENCE TO RELATED APPLICATIONS

This application is a National Phase Application claiming priority to PCT Application Serial No. PCT/US2016/046402, filed Aug. 10, 2016, and claims priority to and the benefit of U.S. Ser. No. 62/212,405, filed Aug. 31, 2015. This application also relates to U.S. Ser. No. 62/332,940, filed May 6, 2016 and U.S. Ser. No. 62/332,921, filed May 6, 2016.

FIELD OF THE INVENTION

The invention relates to the use of pyridyldiamido transition metal complexes and catalyst systems with an activator and a metal hydrocarbenyl chain transfer agent, such as an aluminum vinyl-transfer agent (AVTA).

BACKGROUND OF THE INVENTION

Pyridyldiamido transition metal complexes are disclosed in US 2015/0141601, US 2014/0316089, US 2012/0071616, US 2011/0301310, US 2011/0224391, and US 2010/0022726, where such complexes are useful as catalyst components for the polymerization of olefins.

US 2015/0141596, US 2015/0141590, and US2014/0256893 describe the production of polyolefins using pyridyldiamido catalysts in the presence of chain-transfer agents that do not feature transferrable vinyl groups.

Macromolecules 2002, 35, 6760-6762 discloses propene polymerization with tetrakis(pentafluorophenyl)borate, 7-octenyldiisobutylaluminum, and racMe$_2$Si(2-Me-indenyl)$_2$ZrCl$_2$ or Ph$_2$C(cyclopentadienyl)(fluorenyl)ZrCl$_2$ to produce polypropylene with octenyldiisobutylaluminum incorporated as a comonomer.

Japanese. Kokai Tokkyo Koho (2004), JP 2004-83773-A describes the preparation of polypropylene in the presence of trialkenylaluminum using metallocene and Ziegler-Natta catalysts.

Macromolecules 1995, 28, 437-443 describes the formation of isotactic polypropylene containing vinyl end groups by the Ziegler-Natta catalyzed polymerization of propylene in the presence of dialkenylzincs.

Macromolecules 2002, 35, 3838-3843 describes the formation of long-chain branched polypropylene via the insertion of in situ formed vinyl-terminated polypropylene into growing polymer chains.

Macromolecules 2002, 35, 9586-9594 describes the formation of long-chain branched copolymers of ethylene and alpha olefins via the insertion of in situ formed vinyl-terminated polymer into growing polymer chains.

Eur. Pat. Appl. (2012), EP 2436703 A1 describes the production of comb architecture branch block copolymers in a process that uses dual catalysts and a zinc-based polymerizable chain shuttling agent.

WO 2007/035492 describes the production of long-chain branched and branch block copolymers by polymerization of alkene monomers in the presence of a zinc-based polymerizable shuttling agent.

References of interest also include: 1) Vaughan, A; Davis, D. S.; Hagadorn, J. R. in Comprehensive Polymer Science, Vol. 3, Chapter 20, "Industrial catalysts for alkene polymerization"; 2) Gibson, V. C.; Spitzmesser, S. K. Chem. Rev. 2003, 103, 283; and 3) Britovsek, G. J. P.; Gibson, V. C.; Wass, D. F. Angew. Chem. Int. Ed. 1999, 38, 428; 4) US 2002/0142912; 5) U.S. Pat. No. 6,900,321; 6) U.S. Pat. No. 6,103,657; 7) WO 2005/095469; 8) US 2004/0220050A1; 9) WO 2007/067965; 10) Froese, R. D. J. et al., J. Am. Chem. Soc. 2007, 129, pp. 7831-7840; 11) WO 2010/037059; 12) US 2010/0227990 A1; 13) WO 2002/38628 A2; 14) US 2014/0256893; 15) Guerin, F.; McConville, D. H.; Vittal, J. J., Organometallics, 1996, 15, p. 5586.

There is still a need in the art for new and improved catalyst systems for the polymerization of olefins, in order to achieve specific polymer properties, such as long chain branching, high vinyl content, to increase conversion or comonomer incorporation, or to alter comonomer distribution without impacting the resulting polymer's properties.

SUMMARY OF THE INVENTION

This invention relates to catalyst systems comprising an activator, metal hydrocarbenyl chain transfer agent (such as an aluminum vinyl transfer agent, and single site catalyst complex, such as a pyridyldiamido transition metal complex represented by the formula (A):

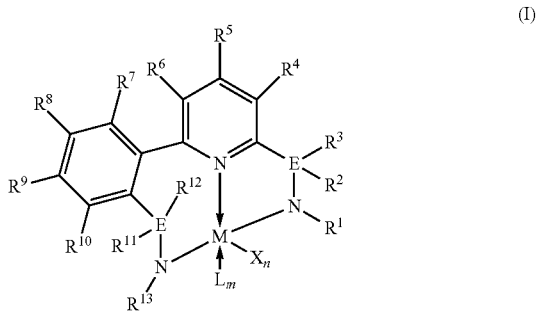

(I)

wherein:
M is a Group 3, 4, 5, 6, 7, 8, 9, 10, 11, or 12 metal;
E is selected from carbon, silicon, or germanium;
X is an anionic leaving group;
L is a neutral Lewis base;
$R^1$ and $R^{13}$ are each independently selected from the group consisting of hydrocarbyls, substituted hydrocarbyls, and silyl groups;
$R^2$, $R^3$, $R^4$, $R^5$, $R^6$, $R^7$, $R^8$, $R^9$, $R^{10}$, $R^{11}$, and $R^{12}$ are each independently selected from the group consisting of hydrogen, hydrocarbyls, alkoxy, silyl, amino, aryloxy, substituted hydrocarbyls, halogen, and phosphino;
n is 1 or 2;
m is 0, 1, or 2; and
two X groups may be joined together to form a dianionic group;
two L groups may be joined together to form a bidentate Lewis base;
an X group may be joined to an L group to form a monoanionic bidentate group;
$R^7$ and $R^8$ may be joined to form a ring;
$R^{10}$ and $R^{11}$ may be joined to form a ring.

This invention further relates to catalyst systems comprising activator, transition metal catalyst complex, and aluminum vinyl transfer agent (AVTA) represented by formula:

$$Al(R')_{3-v}(R'')_v$$

wherein each R', independently, is a $C_1$-$C_{30}$ hydrocarbyl group; each R", independently, is a $C_4$-$C_{20}$ hydrocarbenyl group having an end-vinyl group; and v is from 0.1 to 3.

This invention further relates to processes to produce the above catalyst systems and methods to polymerize olefins using the above catalyst systems.

This invention further relates to processes to produce the above catalyst systems and methods to produce vinyl terminated polyolefins, using the above catalyst systems.

DETAILED DESCRIPTION OF THE INVENTION

Figure 1:
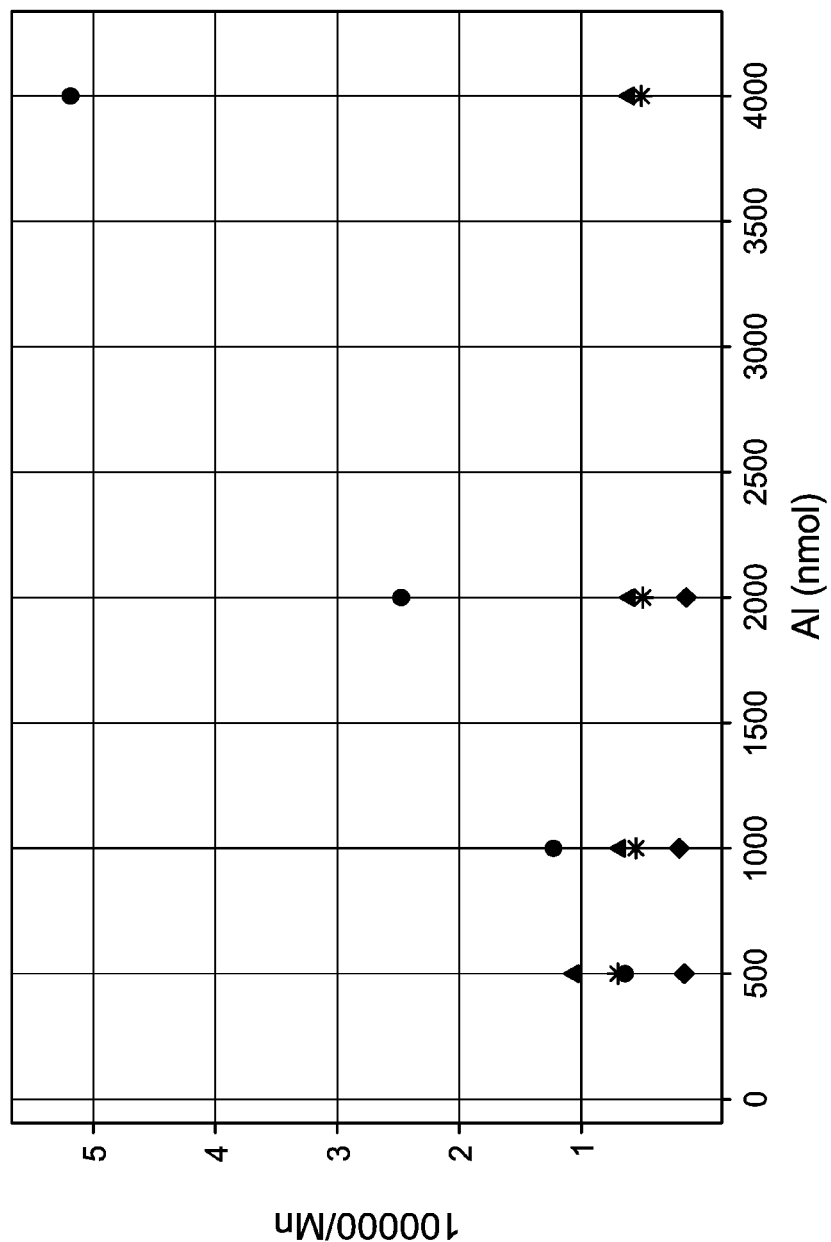
FIG. 1 is a plot of 100,000/Mn versus nmols of AVTA1. Key: circles=complex 3; triangles=complex 1; stars=complex 2; diamonds=complex 4.

The specification describes transition metal complexes and catalyst systems that include the transition metal complexes. The term complex is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization or oligomerization function using an activator which is believed to create a cation as a result of the removal of an anionic group, often referred to as a leaving group, from the transition metal.

As used herein, the numbering scheme for the Periodic Table groups is the new notation as set out in Chemical and Engineering News, 63(5), 27 (1985).

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat$^{-1}$ hr$^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used (kgP/molcat).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on. An oligomer is typically a polymer having a low molecular weight, such as an Mn of less than 25,000 g/mol, or in an embodiment less than 2,500 g/mol, or a low number of mer units, such as 75 mer units or less or 50 mer units or less. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For the purposes of this invention, ethylene shall be considered an α-olefin.

For purposes of this invention and claims thereto, the term "substituted" means that a hydrogen group has been replaced with a heteroatom, or a heteroatom-containing group. For example, a "substituted hydrocarbyl" is a radical made of carbon and hydrogen where at least one hydrogen is replaced by a heteroatom or heteroatom-containing group.

A metallocene catalyst is defined as an organometallic compound with at least one π-bound cyclopentadienyl moiety (or substituted cyclopentadienyl moiety) and more frequently two π-bound cyclopentadienyl moieties or substituted cyclopentadienyl moieties.

As used herein, $M_n$ is number average molecular weight, $M_w$ is weight average molecular weight, and $M_z$ is z average molecular weight, wt % is weight percent, and mol % is mole percent. Molecular weight distribution (MWD), also referred to as polydispersity index (PDI), is defined to be $M_w$ divided by $M_n$. Unless otherwise noted, all molecular weight units (e.g., $M_w$, $M_n$, $M_z$) are g/mol.

Unless otherwise noted all melting points (Tm) are DSC second melt.

The following abbreviations may be used herein: dme is 1,2-dimethoxyethane, Me is methyl, Ph is phenyl, Et is ethyl, Pr is propyl, iPr is isopropyl, n-Pr is normal propyl, Bu is butyl, cPR is cyclopropyl, iBu is isobutyl, tBu is tertiary butyl, p-tBu is para-tertiary butyl, nBu is normal butyl, sBu is sec-butyl, TMS is trimethylsilyl, TIBAL is triisobutylaluminum, TNOAL is tri(n-octyl)aluminum, MAO is methylalumoxane, p-Me is para-methyl, Ph is phenyl, Bn is benzyl (i.e., CH$_2$Ph), THF (also referred to as thf) is tetrahydrofuran, RT is room temperature (and is 23° C. unless otherwise indicated), tol is toluene, EtOAc is ethyl acetate, Cy is cyclohexyl and AVTA is an aluminum-based vinyl transfer agent.

A "catalyst system" comprises at least one catalyst compound and at least one activator. When "catalyst system" is used to describe such the catalyst compound/activator combination before activation, it means the unactivated catalyst complex (pre-catalyst) together with an activator and, optionally, a co-activator. When it is used to describe the combination after activation, it means the activated complex and the activator or other charge-balancing moiety. The transition metal compound may be neutral as in a pre-catalyst, or a charged species with a counter ion as in an activated catalyst system. For the purposes of this invention and the claims thereto, when catalyst systems are described as comprising neutral stable forms of the components, it is well understood by one of ordinary skill in the art, that the ionic form of the component is the form that reacts with the monomers to produce polymers.

In the description herein, the catalyst may be described as a catalyst precursor, pre-catalyst compound, catalyst compound, transition metal complex, or transition metal compound, and these terms are used interchangeably. A polymerization catalyst system is a catalyst system that can polymerize monomers to polymer. An "anionic ligand" is a negatively charged ligand which donates one or more pairs of electrons to a metal ion. A "neutral donor ligand" is a neutrally charged ligand which donates one or more pairs of electrons to a metal ion. Activator and cocatalyst are also used interchangeably.

A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments a co-activator can be pre-mixed with the transition metal compound to form an alkylated transition metal compound.

Non-coordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the noncoordinating anion. Suitable metals include, but are not limited to, aluminum, gold, and platinum. Suitable metalloids include, but are not limited to, boron, aluminum, phosphorus, and silicon. Activators containing non-coordinating anions can also be referred to as stoichiometric activators. A stoichiometric activator can be either neutral or ionic. The terms ionic activator and stoichiometric ionic activator can be used interchangeably. Likewise, the terms neutral stoichiometric activator and Lewis acid activator can be used interchangeably. The term non-coordinating anion activator includes neutral stoichiometric activators, ionic stoichiometric activators, ionic activators, and Lewis acid activators.

For purposes of this invention and claims thereto in relation to catalyst compounds, the term "substituted" means that a hydrogen group has been replaced with a hydrocarbyl group, a heteroatom, or a heteroatom-containing group. For example, methyl cyclopentadiene (Cp) is a Cp group substituted with a methyl group.

For purposes of this invention and claims thereto, "alkoxides" include those where the alkyl group is a $C_1$ to $C_{10}$ hydrocarbyl. The alkyl group may be straight chain, branched, or cyclic. The alkyl group may be saturated or unsaturated. In some embodiments, the alkyl group may comprise at least one aromatic group.

The terms "hydrocarbyl radical," "hydrocarbyl," "hydrocarbyl group," "alkyl radical," and "alkyl" are used interchangeably throughout this document. Likewise, the terms "group", "radical", and "substituent" are also used interchangeably in this disclosure. For purposes of this disclosure, "hydrocarbyl radical" is defined to be C1-C100 radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with at least one halogen (such as Br, Cl, F or I) or at least one functional group such as $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$, and the like, or where at least one heteroatom has been inserted within a hydrocarbyl ring.

The term "alkenyl" or "hydrocarbenyl" means a straight-chain, branched-chain, or cyclic hydrocarbon radical having one or more double bonds that are not part of an aromatic ring. These alkenyl radicals may, optionally, be substituted. Examples of alkenyl radicals include, but are not limited to, ethenyl, propenyl, allyl, 1,4-butadienyl cyclopropenyl, cyclobutenyl, cyclopentenyl, cyclohexenyl, cyclooctenyl, and the like, including their substituted analogues.

The term "alkoxy" or "alkoxide" means an alkyl ether or aryl ether radical wherein the term alkyl is as defined above. Examples of suitable alkyl ether radicals include, but are not limited to, methoxy, ethoxy, n-propoxy, iso-propoxy, n-butoxy, iso-butoxy, sec-butoxy, tert-butoxy, phenoxyl, and the like.

The term "aryl" or "aryl group" means a six carbon aromatic ring and the substituted variants thereof, including but not limited to, phenyl, 2-methyl-phenyl, xylyl, 4-bromo-xylyl. Likewise, heteroaryl means an aryl group where a ring carbon atom (or two or three ring carbon atoms) has been replaced with a heteroatom, preferably N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

The term "continuous" means a system that operates without interruption or cessation. For example, a continuous process to produce a polymer would be one where the reactants are continually introduced into one or more reactors and polymer product is continually withdrawn.

A solution polymerization means a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium.

Such systems are preferably not turbid as described in J. Vladimir Oliveira, C. Dariva and J. C. Pinto, Ind. Eng. Chem. Res., 29, 2000, 4627.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, preferably less than 10 wt %, preferably less than 1 wt %, preferably 0 wt %.

This invention relates to catalyst systems comprising a pyridyldiamido transition metal complex represented by the formula (A), an activator (such as an alumoxane or a non-coordinating anion), and metal hydrocarbenyl chain transfer agent, typically represented by the formula: $Al(R')_{3-v}(R'')_v$ or $E[Al(R')_{2-y}(R'')_y]_2$, wherein each R', independently, is a $C_1$ to $C_{30}$ hydrocarbyl group; each R'', independently, is a $C_4$ to $C_{20}$ hydrocarbenyl group having an allyl chain end; E is a group 16 element (such as O or S); v is from 0.01 to 3 (such as 1 or 2), and y is from 0.01 to 2 (such as 1 or 2). Preferably the metal hydrocarbenyl chain transfer agent is an aluminum vinyl-transfer agent (AVTA) represented by the formula: $Al(R')_{3-v}(R)_v$ with R defined as a hydrocarbenyl group containing 4 to 20 carbon atoms and featuring an allyl chain end, R' defined as a hydrocarbyl group containing 1 to 30 carbon atoms, and v is 0.1 to 3 (such as 1 or 2).

The catalyst/activator combinations are formed by combining the transition metal complex with activators in any manner known from the literature, including by supporting them for use in slurry or gas phase polymerization. The catalyst/activator combinations may also be added to or generated in solution polymerization or bulk polymerization (in the monomer). The metal hydrocarbenyl chain transfer agent (preferably an aluminum vinyl transfer agent) may be added to the catalyst and or activator before, during or after the activation of the catalyst complex or before or during polymerization. Typically, the metal hydrocarbenyl chain transfer agent (preferably the aluminum vinyl-transfer agent) is added to the polymerization reaction separately, such as before, the catalyst/activator pair.

The polymer produced from the polymerization using the catalyst systems described herein preferably contains at least 0.05 allyl chain ends per polymer chain, 0.1 allyl chain ends per polymer chain, at least 0.2 allyl chain ends per polymer chain, at least 0.3 allyl chain ends per polymer chain, at least 0.4 allyl chain ends per polymer chain, at least 0.5 allyl chain ends per polymer chain, at least 0.6 allyl chain ends per polymer chain, at least 0.7 allyl chain ends per polymer chain, at least 0.8 allyl chain ends per polymer chain, at least 0.8 allyl chain ends per polymer chain, at least 1.0 allyl chain ends per polymer chain. Ethylene homopolymers and copolymers are particularly preferred products. If the catalyst complex chosen is also capable of incorporating bulky alkene monomers, such as $C_6$ to $C_{20}$ alpha olefins, into the growing polymer chain, then the resulting polymer (typically an ethylene copolymer) may contain long chain branches formed by the insertion of an allyl terminated polymer chain formed in situ (also referred to as a "vinyl-terminated macromonomer") into the growing polymer chains. Process conditions including residence time, the ratio of monomer to polymer in the reactor, and the ratio of transfer agent to polymer will affect the amount of long chain branching in the polymer, the average length of branches, and the type of branching observed. A variety of branching types may be formed, which include comb architectures and branch on branch structures similar to those found in low-density polyethylene. The combination of chain growth and vinyl-group insertion may lead to polymer with a branched structure and having one or fewer vinyl unsaturations per polymer molecule. The absence of significant quantities of individual polymer molecules containing greater than one vinyl unsaturation prevents or reduces the formation of unwanted crosslinked polymers. Polymers having long chain branching typically have a g'vis of 0.95 or less, alternately 0.90 or less, alternately 0.85 or less, alternately 0.80 or less, alternately 0.75 or less, alternately 0.70 or less, alternately 0.60 or less.

If the catalyst chosen is poor at incorporating comonomers such as $C_2$ to $C_{20}$ alpha olefins, then the polymer obtained is largely linear (little or no long chain branching). Likewise, process conditions including the ratio of transfer agent to polymer will affect the molecular weight of the polymer. Polymers having little or no long chain branching typically have a g'vis of more than 0.95, alternately 0.97 or more, alternately 0.98 or more.

Alkene polymerizations and co-polymerizations using one or more transfer agents, such as an AVTA, with two or more catalysts are also of potential use. Desirable products that may be accessed with this approach includes polymers that have branch block structures and/or high levels of long-chain branching.

The transfer agent to catalyst complex equivalence ratio can be from about 1:100 to 500,000:1. Preferably the molar ratio of transfer agent to catalyst complex is greater than one. Alternately, the molar ratio of transfer agent to catalyst complex is greater than 30. The AVTA to catalyst complex equivalence ratio can be from about 1:100 to 500,000:1. Preferably the molar ratio of AVTA to catalyst complex is greater than one. More preferred the molar ratio of AVTA to catalyst complex is greater than 30.

The AVTA can also be used in combination with other chain transfer agents that are typically used as scavengers, such as trialkylaluminum compounds (where the alkyl groups are selected from $C_1$ to $C_{20}$ alkyl groups, preferably methyl, ethyl, propyl, butyl, pentyl, hexyl, heptyl, octyl, nonyl, decyl, undecyl, dodecyl, or an isomer thereof). Usefully the ATVA can be used in combination with a trialkyl aluminum compound such as tri-n-octylaluminum and tri-isobutylaluminum. The ATVA can also be used in combination with a dialkyl zinc compound, such as diethylzinc, dimethylzinc, or dipropylzinc.

The transfer agent can also be used in combination with oxygen-containing organoaluminums such as bis(diisobutylaluminum)oxide, MMAO-3A, and other alumoxanes. Certain of these oxygen-containing organoaluminums are expected to serve as scavengers while remaining significantly less prone to hydrocarbyl group chain-transfer than typical organoaluminums, such as trimethylaluminum or tri(n-octyl)aluminum.

The production of di-end-functionalized polymers is possible with this technology. One product, prior to exposure to air, from an alkene polymerization performed in the presence of AVTA is the aluminum-capped species $Al(R')_{3-v}$ (polymer-$CH=CH_2)_v$, where v is 0.1 to 3 (alternately 1 to 3, alternately 1, 2, or 3). The Al-carbon bonds will react with a variety of electrophiles (and other reagents), such as oxygen, halogens, carbon dioxide, and the like. Thus, quenching the reactive polymer mixture with an electrophile prior to exposure to atmosphere would yield a di-end-functionalized product of the general formula: Z-(monomers)$_n$-$CH=CH_2$, where Z is a group from the reaction with the electrophile and n is an integer, such as from 1 to 1,000,000, alternately from 2 to 50,000, alternately from 10 to 25,000. For example, quenching with oxygen yields a polymer functionalized at one end with a hydroxy group and at the other end with a vinyl group. Quenching with bromine yields a polymer functionalized at one end with a Br group and at the other end with a vinyl group.

Functional group terminated polymers can also be produced using functional group transfer agents (FGTA). In this embodiment of the invention, the FGTA is represented by the formula $M^{FGTA}(R')_{3-v}(FG)_v$, with R' and v defined as above, $M^{FGTA}$ a group 13 element (such as B or Al), and with FG defined as a group containing 1 to 20 carbon atoms and a functional group Z. The choice of FG is such that it is compatible with the catalyst system being used. Preferred Z groups include, but are not limited to, non-vinyl olefinic groups such as vinylidene, vinylene or trisubstitued olefins, cyclics containing unsaturation such as cyclohexene, cyclooctene, vinyl cyclohexene, aromatics, ethers, and metal-capped alkoxides.

In another embodiment of the invention, the polymer product of this invention are of the formula: polymer-$(CH_2)_n$CH=$CH_2$ where n is from 2 to 18, preferably from 6 to 14, more preferably 6, and where "polymer" is the attached polymeryl chain. Polymers of this formula are particularly well suited in making branch polymer combs. The polymer combs can be made by any number of methods. One method would be to use a catalyst system to make the vinyl terminated polymer, and then use a second catalyst system to incorporate the vinyl terminated polymer into a polymer backbone made from the second catalyst. This can be done sequentially in one reactor by first making the vinyl terminated polymer and then adding a second catalyst and, optionally, different monomer feeds in the same reactor. Alternatively two reactors in series can be used where the first reactor is used to make the vinyl terminated polymer which flows into a second reactor in series having the second catalyst and, optionally, different monomer feeds. The vinyl terminated polymer can be a soft material, as in an ethylene propylene copolymer (such as ethylene propylene copolymer rubber), low density polyethylene, or a polypropylene, or a harder material, as in an isotactic polypropylene, high density polyethylene, or other polyethylene. Typically, if the vinyl terminated polymer is soft, it is preferred that the polymer backbone of the comb be hard; if the vinyl terminated polymer is hard, it is preferred that the polymer backbone of the comb be soft, however any combination of polymer structures and types can be used.

In another embodiment of the invention, the vinyl-terminated polymers (VTPs) of this invention are of formula: polymer-$(CH_2)_n$CH=$CH_2$ where n is from 2 to 18, preferably from 6 to 14, more preferably 6, and where "polymer" is the attached polymeryl chain. VTPs of this formula are particularly well suited in making branch block polymers. The branch block polymers can be made by any number of methods. One method involves using the same catalyst that is used to make the VTP, and then changing polymerization conditions (such as, but not limited to, by changing monomer composition and/or type and/or the amount or presence of AVTA) in the same or different reactor (such as two or more reactors in series). In this case, the branch will have a different polymeric composition vs. the polymer backbone created under the different polymerization conditions. Another method would be to use a catalyst system to make the VTP, then use a second catalyst system to incorporate the VTPs into a polymer backbone made from the second catalyst. This can be done sequentially in one reactor by first making the VTP and then adding a second catalyst and, optionally, different monomer feeds in the same reactor. Alternatively, two reactors in series can be used where the first reactor is used to make the VTP which flows into a second reactor in series having the second catalyst and, optionally, different monomer feeds. The branched block polymers can be of any composition, however, typically a combination of soft and hard polymers (relative to one another) are preferred. For example, an iPP VTP could be produced in a reactor, and then ethylene added to the existing propylene feed to make a rubber EP that would have iPP branches. Or an iPP VTP could be produced in a first reactor, and then sent to a second reactor containing ethylene (or additional ethylene for a propylene ethylene copolymer and, optionally, additional propylene monomer (and the same or different catalyst) to make a rubber EP that would have iPP branches (or propylene ethylene copolymer branches).

Useful metal hydrocarbenyl chain transfer agents (preferably the aluminum vinyl transfer agents) are typically present at from 10 or 20 or 50 or 100 equivalents to 600 or 700 or 800 or 1000 equivalents relative to the catalyst complex. Alternately, the metal hydrocarbenyl chain transfer agents are present at a catalyst complex-to-transfer agent molar ratio of from about 1:3000 to 10:1; alternatively 1:2000 to 10:1; alternatively 1:1000 to 10:1; alternatively, 1:500 to 1:1; alternatively 1:300 to 1:1; alternatively 1:200 to 1:1; alternatively 1:100 to 1:1; alternatively 1:50 to 1:1; alternatively 1:10 to 1:1.

In any embodiment of this invention where the aluminum vinyl transfer agent is present, the aluminum vinyl transfer agent is present at a catalyst complex-to-aluminum vinyl transfer agent molar ratio of from about 1:3000 to 10:1; alternatively 1:2000 to 10:1; alternatively 1:1000 to 10:1; alternatively, 1:500 to 1:1; alternatively 1:300 to 1:1; alternatively 1:200 to 1:1; alternatively 1:100 to 1:1; alternatively 1:50 to 1:1; alternatively 1:10 to 1:1, alternately from 1:1000 or more.

Transition Metal Complex

Transition metal complexes useful herein are certain "non-metallocene" olefin polymization catalysts that undergo alkyl group transfer with the AVTA at a rate that is much higher than the rate at which they undergo typical termination processes, such as beta hydride elimination or chain-transfer to monomer. The term "non-metallocene catalyst", also known as "post-metallocene catalyst" describe transition metal complexes that do not feature any pi-coordinated cyclopentadienyl anion donors (or the like) and are useful the polymerization of olefins when combined with common activators. Families of non-metallocene complexes that may be useful for the present invention are described in Angew. Chem. Int. Ed. 2014, 53, 2-25; Chem. Rev. 2003, 103, 283-315; Angew. Chem. Int. Ed. 1999, 38, 428-447; ACS Catal. 2011, 1, 887-900; Polymer J. 2007, 39:3, 193-207; and U.S. Pat. Nos. 6,841,502, 7,256,296, 7,018,949, 7,964,681.

Transition metal complexes useful herein include chelated transition metal complexes, such as those represented by the following formula (4):

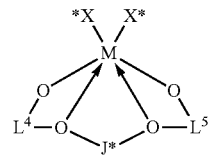

where: (1) J* is a divalent bridging group comprising C, Si, or both; (2) M is a group 4 metal, preferably hafnium or zirconium; (3) O is oxygen; (4) each X* is independently a univalent anionic ligand, or two X*s are joined and bound to the metal atom to form a metallocycle ring, or two X*s are joined to form a chelating ligand, a diene ligand, or an alkylidene ligand; and (5) $L^4$ and $L^5$ are independently, a substituted monocyclic or polycyclic aromatic groups.

In some embodiments, J* is a divalent substituted or unsubstituted $C_{3-6}$ aliphatic or cycloaliphatic group.

In some embodiments, $L^4$ and $L^5$ are independently a monocyclic or polycyclic aromatic group substituted with any combination alkyl, aryl, alkoxy, or amino substituents which may optionally be substituted with halogens.

In yet further embodiments, suitable catalyst compounds useful herein include biphenyl phenol transition metal complexes, such as those having the following structural formula (4a):

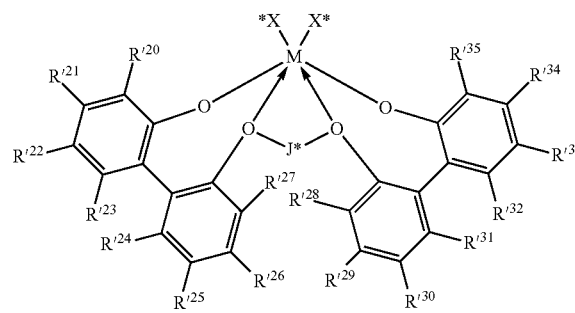

where: (1) J* is a divalent bridging group comprising C, Si, or both; (2) M is a group 4 metal, preferably hafnium or zirconium; (3) O is oxygen; (4) each X* is independently a univalent anionic ligand, or two X*s are joined and bound to the metal atom to form a metallocycle ring, or two X*s are joined to form a chelating ligand, a diene ligand, or an alkylidene ligand; and (5) each $R'^{20}$, $R'^{21}$, $R'^{22}$, $R'^{23}$, $R'^{24}$, $R'^{25}$, $R'^{26}$, $R'^{27}$, $R'^{28}$, $R'^{29}$, $R'^{30}$, $R'^{31}$, $R'^{32}$, $R'^{33}$, $R'^{34}$, $R'^{35}$ is independently hydrogen, halo, $C_1$-$C_{50}$ hydrocarbyl, substituted hydrocarbyl, halocarbyl or substituted halocarbyl.

In particular embodiments, each $R'^{20}$ and $R'^{35}$ may be or may comprise a bulky substituent, such as substituted or unsubstituted aryl, carbazolyl, fluorenyl and/or anthracenyl.

In other particular embodiments, each $R'^{20}$ and $R'^{35}$ independently may be 3,5-di(isopropyl)phenyl, 3,5-di(isobutyl)phenyl, 3,5-di(tert-butyl)phenyl, carbazol-9-yl, 3,6-di-tert-butylcarbazol-9-yl, 2,3,4,5,6,7,8,9-octahydrocarbazol-1-yl, anthracen-9-yl, 1,2,3,4,5,6,7,8-octahydroanthracen-9-yl, naphthyl, fluoren-9-yl, 9-methylfluoren-9-yl, 1,2,3,4,5,6,7,8-octahydrofluoren-9-yl, or 9-methyl-1,2,3,4,5,6,7,8-octahydrofluoren-9-yl. In other particular embodiments, $R'^{22}$ and $R'^{33}$ are independently $C_1$-$C_{10}$ hydrocarbyl, alternatively $C_1$-$C_{10}$ alkyls such as methyl, ethyl and all isomers of propyl, butyl, pentyl, hexyl, heptyl, octyl, nonyl and decyl.

In other particular embodiments, $R'^{25}$ and $R'^{33}$ are independently $C_1$-$C_{10}$ substituted or unsubstituted hydrocarbyl, halo, $C_1$-$C_{10}$ alkoxy, and $C_2$-$C_{20}$ dialkylamino. Alternatively $R'^{25}$ and $R'^{30}$ are independently $C_1$-$C_{10}$ alkyls such as methyl, ethyl and all isomers of propyl, butyl, pentyl, hexyl, heptyl, octyl, nonyl and decyl (including cyclic and linear or branched cyclic combinations); halogens such as fluoro, chloro, bromo; $C_1$-$C_{10}$ alkoxy such as methoxy, ethoxy, and all isomers of propoxy, butoxy, pentoxy, hexoxy, heptoxy, octoxy, nonoxy, and decoxy (including cyclic and linear or branched cyclic combinations); $C_2$-$C_{20}$ dialkylamino such as dimethyl amino, diethyl amino, and all isomers of dipropylamino, dibutylamino, dipentylamino, dihexylamino, diheptylamino, dioctylamino, dinonylamino, didecylamino (including cyclic and linear or branched cyclic combinations) and mixed alkyls such as methylethylamino, methylbutyl amino and the like.

In other particular embodiments, J* may be propan-1,3-diyl, butan-1,4-diyl, cyclohexanediyl, cyclohexen-4,5-diyl, or bis(methylene)cyclohexan-1,2-diyl.

Non-limiting examples of particularly useful biphenyl phenol transition metal complexes are illustrated below, wherein M is hafnium or zirconium and X is methyl, benzyl, or chloro:

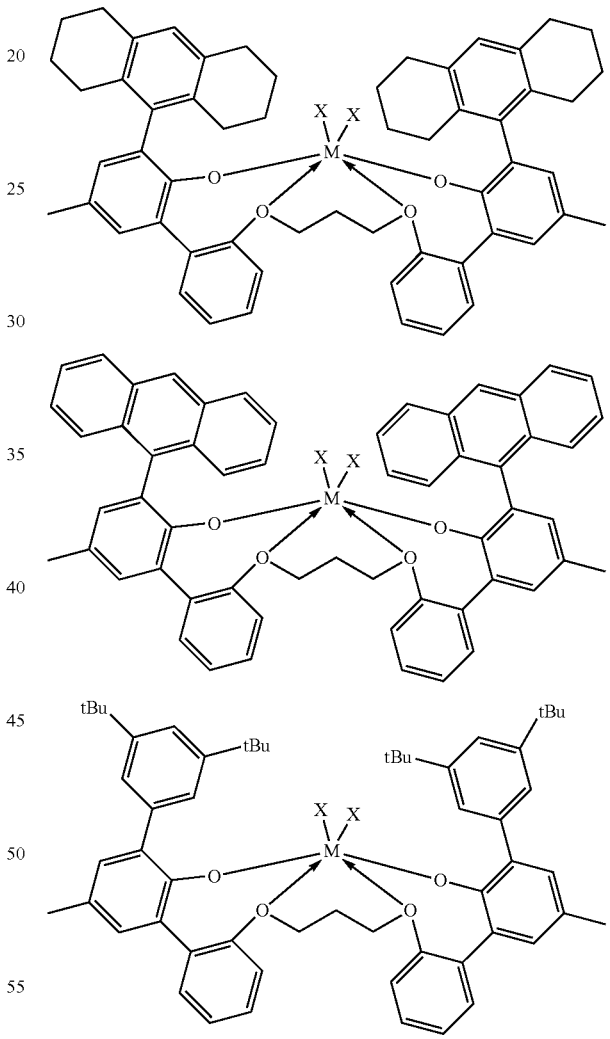

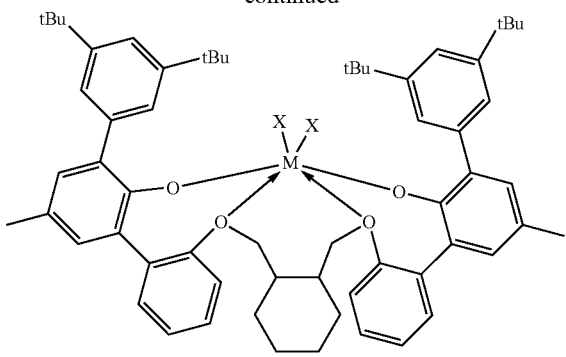
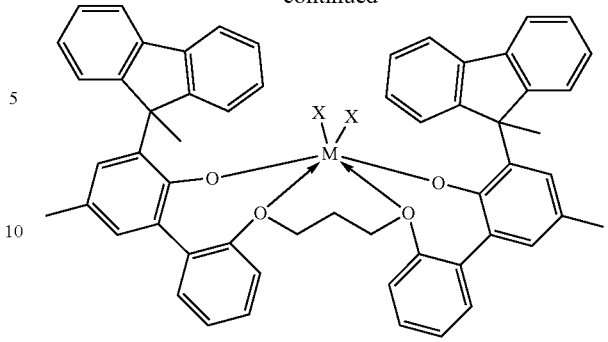
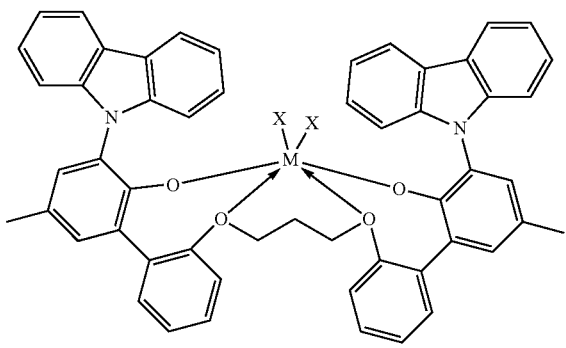
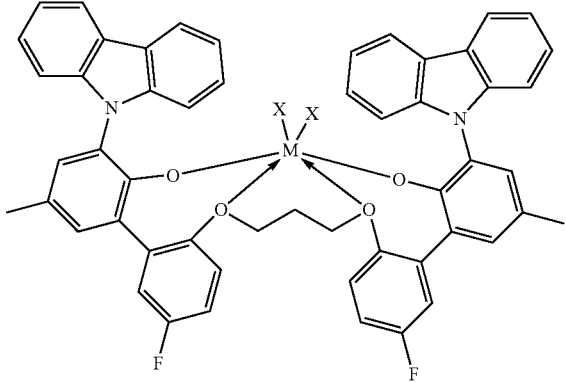
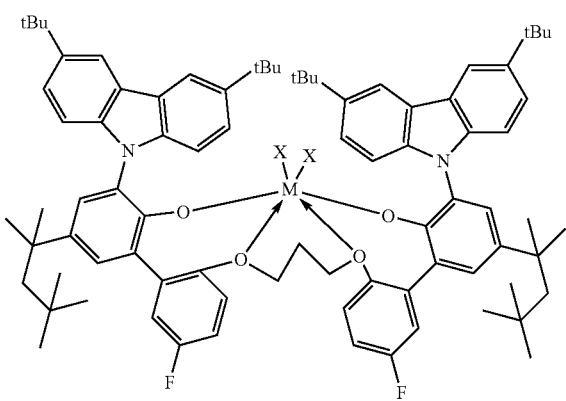

Additional particularly useful biphenyl phenol transition metal complexes are described in WO 2003/091262; WO 2005/108406; US 2006/0025548; US 2006/0052554; WO 2007/136494; WO 2007/136496; WO 2007/136495; WO 2009/064482; and WO 2013/096573, and are incorporated by reference.

In yet further embodiments, transition metal complexes useful herein include those represented by the following formula (5):

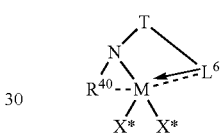

wherein (1) M is a group 4 metal, preferably hafnium; (2) $L^6$ is a $C_5$-$C_{20}$ heteroaryl group containing a Lewis base functionality, especially pyridine-2-yl or substituted pyridine-2-yl group or a divalent derivative thereof; (3) $R^{40}$ is selected from a $C_1$-$C_{30}$ alkyl, cycloalkyl, heteroalkyl, cycloheteroalkyl, aryl and substituted derivatives thereof or a divalent derivative thereof; (4) T is a divalent bridging group comprising carbon and or silicon, preferably a $C_1$-$C_{20}$ hydrocarbyl substituted methylene or silane group; (5) each X* is independently a univalent anionic ligand, or two X*s are joined and bound to the metal atom to form a metallocycle ring, or two X*s are joined to form a chelating ligand, a diene ligand, or an alkylidene ligand; (6) N is nitrogen; and (7) bonds, optional bonds and dative bonds are represented by lines, dotted lines and arrows, respectively.

In yet further embodiments, catalyst compounds useful herein are pyridyl amide metal complexes, such as those having the following formula (5a):

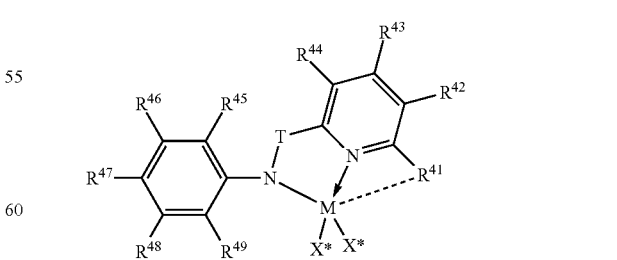

wherein M, T, N and X* are as previously defined as in formula (5); each $R^{41}$, $R^{42}$, $R^{43}$, and $R^{44}$ are independently hydrogen, halo, or an alkyl, cycloalkyl, heteroalkyl, heterocycloalkyl, aryl or silyl group, or one or more adjacent $R^{41}$-$R^{44}$ may be joined together to form a fused ring derivative; $R^{45}$-$R^{49}$ are independently hydrogen, or $C_1$-$C_{10}$ alkyl, most preferably $R^{45}$ and $R^{49}$ are alkyl such as isopropyl or tert-butyl; T is preferably $CR'^{50}R'^{51}$ where $R'^{50}$ and $R'^{51}$ are independently hydrogen, halogen, a $C_1$-$C_{20}$ hydrocarbyl, most preferably, one of $R'^{50}$ and $R'^{51}$ is hydrogen and the other is a $C_6$-$C_{20}$ aryl group, especially 2-isopropyl, phenyl or a fused polycyclic aryl group, most preferably anthracenyl; and bonds, optional bonds and dative bonds are represented by lines, dotted lines and arrows, respectively.

Non-limiting examples of pyridyl amide catalysts useful herein are illustrated below, wherein X is preferably methyl, benzyl or chloro:

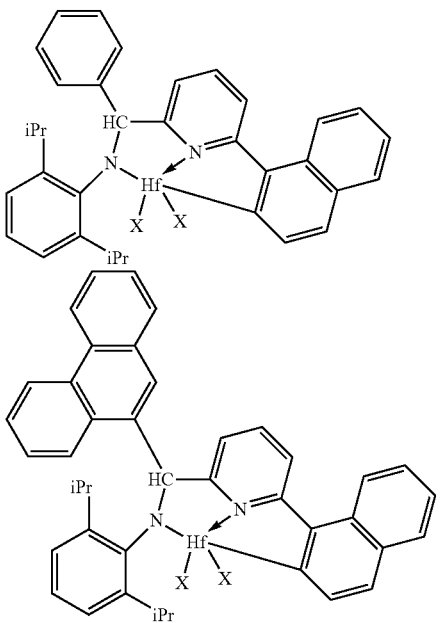

Additional pyridyl amide transition metal complexes particularly useful herein are described in WO 2010/0227990; US 2004/0220050; WO 2004/026925; WO 2004/024740; WO 2004/024739; WO 2003/040201; WO 2002/046249; and WO2002/038628, and are incorporated by reference.

In yet further embodiments, useful catalyst compounds include those having the following structural formula (6):

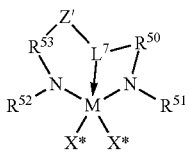

wherein (1) M is a group 4 metal, preferably hafnium; (2) N is nitrogen; (3) $L^7$ is a group that links $R^{50}$ to Z' by a three atom bridge with the central of the three atoms being a group 15 or 16 element that preferably forms a dative bond to M, and is a $C_5$-$C_{20}$ heteroaryl group containing a Lewis base functionality, especially a divalent pyridinyl or substituted pyridinyl group; (4) Z' is a divalent linker group, $(R^{56})_pC$—$C(R^{57})_q$, where $R^{56}$ and $R^{57}$ are independently selected from the group consisting of hydrogen, hydrocarbyls, substituted hydrocarbyls, and wherein adjacent $R^{56}$ and $R^{57}$ groups may be joined to form an aromatic or saturated, substituted or unsubstituted hydrocarbyl ring, wherein the ring has 5, 6, 7 or 8 ring carbon atoms and where the substituents on the ring can join to form additional rings, and p is 1 or 2 and q is 1 or 2; (5) $R^{50}$ and $R^{53}$ are each, independently, $ER^{54}R^{55}$ with E being carbon, silicon or germanium, and each $R^{54}$ and $R^{55}$ being independently selected from the group consisting of hydrogen, hydrocarbyls, substituted hydrocarbyls, alkoxy, silyl, amino, aryloxy, halogen and phosphino, and $R^{54}$ and $R^{55}$ may be joined to form a saturated heterocyclic ring, or a saturated substituted heterocyclic ring where substitutions on the ring can join to form additional rings; (6) $R^{51}$ and $R^{52}$ are independently selected from the group consisting of hydrocarbyls, substituted hydrocarbyls, silylcarbyls and substituted silylcarbyl groups; and (7) each X* is independently a univalent anionic ligand, or two X*s are joined and bound to the metal atom to form a metallocycle ring, or two X*s are joined to form a chelating ligand, a diene ligand, or an alkylidene ligand.

In yet further embodiments, useful catalyst compounds include pyridyl diamide metal complexes represented by the following formula (6a):

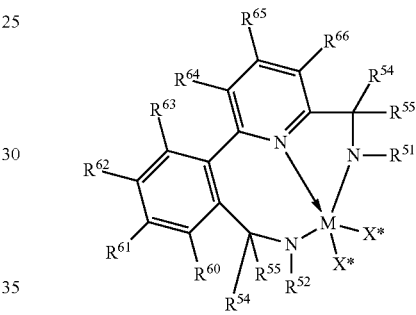

wherein M, X*, N, $R^{51}$, $R^{52}$, $R^{54}$, and $R^{55}$ are as previously defined as in formula (6); $R^{60}$, $R^{61}$, $R^{62}$, $R^{63}$, $R^{64}$, $R^{65}$, $R^{66}$ are independently selected from the group consisting of hydrogen, hydrocarbyls, substituted hydrocarbyls, alkoxy, aryloxy, halogen, amino, and silyl, and wherein any one or more adjacent $R^{60}$-$R^{66}$ may be joined to form a substituted or unsubstituted hydrocarbyl or heterocyclic ring, wherein the ring has 5, 6, 7, or 8 ring atoms and where substitutions on the ring can join to form additional rings.

In an embodiment of the invention, $R^{60}$ to $R^{66}$ are hydrogen.

In an embodiment of the invention, $R^{62}$ is joined with $R^{63}$ to form a phenyl ring fused to the existing phenyl ring (e.g., a naphthyl group), and $R^{60}$, $R^{61}$, $R^{64}$, $R^{65}$, and $R^{66}$ are independently hydrogen or an alkyl group, preferably hydrogen.

In an embodiment of the invention, each $R^{54}$ and $R^{55}$ are independently hydrogen, an alkyl group or an aryl group or substituted aryl group; preferably one or both $R^{54}$ or $R^{55}$ is hydrogen, or one $R^{54}$ or $R^{55}$ is hydrogen and the other is an aryl group or substituted aryl group. Preferred but non limiting aryl groups for $R^{54}$ or $R^{55}$ include phenyl, 2-methylphenyl, 2-ethylphenyl, 2-isopropylphenyl, and naphthyl.

In an embodiment of the invention, $R^{52}$ and $R^{51}$ are independently aryl or substituted aryl; preferably $R^{51}$ is a substituted phenyl group such as, but not limited to 2,6-diisopropylphenyl, 2,6-diethylphenyl, 2,6-dimethylphenyl, mesityl, and the like, and preferably $R^{52}$ is phenyl or a substituted phenyl group such as, but not limited to 2-tolyl, 2-ethylphenyl, 2-propylphenyl, 2-trifluoromethylphenyl, 2-fluorophenyl, mesityl, 2,6-diisopropylphenyl, 2,6-diethylphenyl, 2,6-dimethylphenyl, 3,5-di-tert-butylphenyl, and the like.

In yet further embodiments, useful catalyst compounds include pyridyl diamide metal complexes, such as those represented by the following formula (6b):

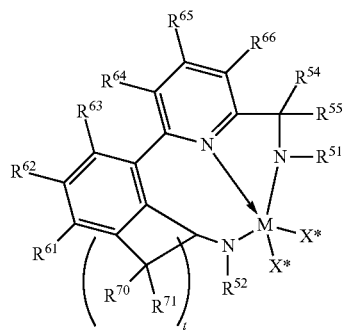

wherein M, X*, N, $R^{51}$, $R^{52}$, $R^{54}$, $R^{55}$, $R^{61}$-$R^{66}$ are as previously defined as in formulae (6) and (6a); each $R^{70}$-$R^{71}$ are independently selected from the group consisting of hydrogen, hydrocarbyls, substituted hydrocarbyls, alkoxy, aryloxy, halogen, amino, and silyl, and wherein any one or more adjacent $R^{70}$-$R^{71}$ may be joined to form a substituted or unsubstituted hydrocarbyl or heterocyclic ring, wherein the ring has 5, 6, 7, or 8 ring atoms and where substitutions on the ring can join to form additional rings, and t is 2 or 3 (corresponding to cyclopentyl and cyclohexyl rings, respectively).

In an embodiment of the invention, $R^{61}$-$R^{66}$ are hydrogen.

In an embodiment of the invention, each $R^{70}$ and $R^{71}$ are independently hydrogen, and t is 2 or 3, preferably 2.

In an embodiment of the invention, each $R^{54}$ and $R^{55}$ are independently hydrogen, an alkyl group or an aryl group or substituted aryl group; preferably one or both $R^{54}$ or $R^{55}$ is hydrogen, or one $R^{54}$ or $R^{55}$ is hydrogen and the other is an aryl group or substituted aryl group. Preferred but non limiting aryl groups include phenyl and 2-methylphenyl, 2-ethylphenyl, 2-isopropylphenyl and naphthyl.

In an embodiment of the invention, $R^{52}$ and $R^{51}$ are independently aryl or substituted aryl; preferably $R^{51}$ is a substituted phenyl group such as, but not limited to 2,6-diisopropylphenyl, 2,6-diethylphenyl, 2,6-dimethylphenyl, mesityl, and the like, and preferably $R^{52}$ is phenyl or a substituted phenyl group such as, but not limited to 2-tolyl, 2-ethylphenyl, 2-propylphenyl, 2-trifluoromethylphenyl, 2-fluorophenyl, mesityl, 2,6-diisopropylphenyl, 2,6-diethylphenyl, 2,6-dimethylphenyl, 3,5-di-tert-butylphenyl, and the like.

In an embodiment of the invention, $R^{54}$, $R^{55}$, $R^{61}$-$R^{66}$, each $R^{70}$-$R^{71}$ are hydrogen, $R^{52}$ is phenyl, $R^{51}$ is 2,6-diisopropylphenyl and t is 2.

Non-limiting examples of pyridyl diamide catalysts that are useful herein are illustrated below, wherein X is methyl, benzyl, or chloro:

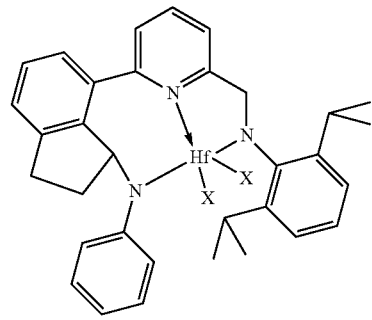

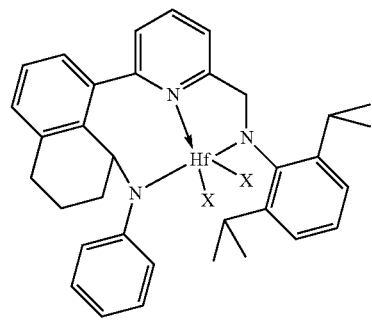

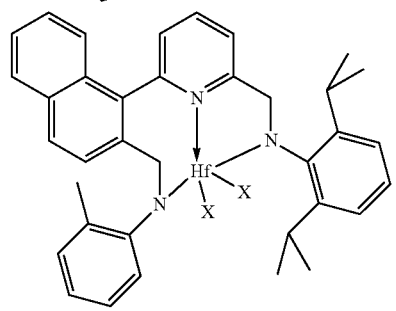

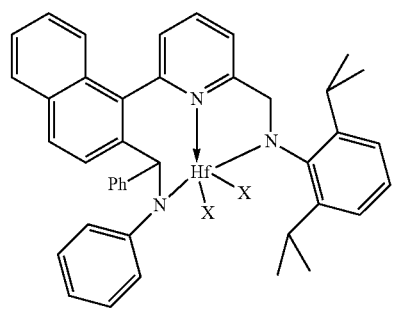

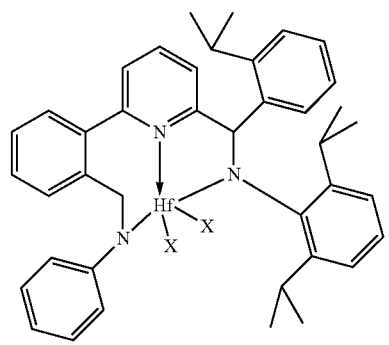

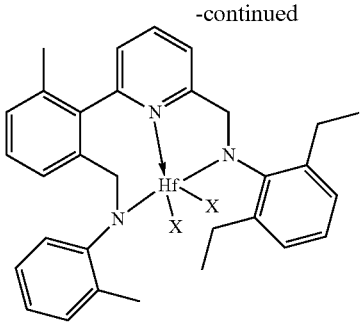

Additional pyridyl diamide iraiialion meial complexes useful herein are described in US 2014/0316089; WO 2012/134614; WO 2012/134615; WO 2012/134613; US 2012/0071616; US 2011/0301310; and US 2010/0022726 and are incorporated by reference.

Transition metal complexes (also referred to as catalyst complexes or pre-catalyst complexes) useful herein include pyridyldiamido transition metal complexes represented by the formula (A):

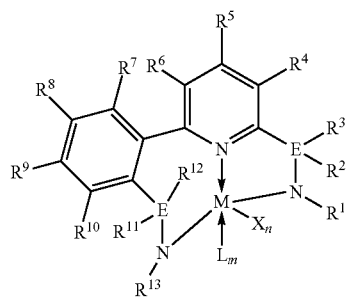

wherein:
M is a Group 3, 4, 5, 6, 7, 8, 9, 10, 11, or 12 metal;
E is selected from carbon, silicon, or germanium, preferably carbon;
X is an anionic leaving group, preferably alkyl, aryl, hydride, alkylsilane, fluoride, chloride, bromide, iodide, triflate, carboxylate, alkylsulfonate;
L is a neutral Lewis base, preferably ether, amine, thioether;
$R^1$ and $R^{13}$ are each independently selected from the group consisting of hydrocarbyls, substituted hydrocarbyls, and silyl groups, preferably aryl;
$R^2$, $R^3$, $R^4$, $R^5$, $R^6$, $R^7$, $R^8$, $R^9$, $R^{10}$, $R^{11}$, and $R^{12}$ are each independently selected from the group consisting of hydrogen, hydrocarbyls, alkoxy, silyl, amino, aryloxy, substituted hydrocarbyls, halogen, and phosphino;
n is 1 or 2;
m is 0, 1, or 2; and
two X groups may be joined together to form a dianionic group;
two L groups may be joined together to form a bidentate Lewis base;
an X group may be joined to an L group to form a monoanionic bidentate group;
$R^7$ and $R^8$ may be joined to form a ring, preferably an aromatic ring, a six-membered aromatic ring with the joined $R^7$ and $R^8$ group being —CH=CHCH=CH—;
$R^{10}$ and $R^{11}$ may be joined to form a ring, preferably a five-membered ring with the joined $R^{10}$ and $R^{11}$ group being —CH$_2$CH$_2$—, a six-membered ring with the joined $R^{10}$ and $R^{11}$ group being —CH$_2$CH$_2$CH$_2$—.

In a preferred embodiment, $R^4$, $R^5$, and $R^6$ are independently selected from the group consisting of hydrogen, hydrocarbyls, substituted hydrocarbyls, alkoxy, aryloxy, halogen, amino, and silyl, and wherein adjacent R groups ($R^4$ & $R^5$ and/or $R^5$ & $R^6$) may be joined to form a substituted or unsubstituted hydrocarbyl or heterocyclic ring, where the ring has 5, 6, 7, or 8 ring atoms and where substitutions on the ring can join to form additional rings.

In another preferred embodiment, $R^7$, $R^8$, $R^9$, and $R^{10}$ are independently selected from the group consisting of hydrogen, hydrocarbyls, substituted hydrocarbyls, alkoxy, halogen, amino, and silyl, and wherein adjacent R groups ($R^7$ & $R^8$, and/or $R^9$ & $R^{10}$) may be joined to form a saturated, substituted or unsubstituted hydrocarbyl or heterocyclic ring, where the ring has 5, 6, 7, or 8 ring carbon atoms and where substitutions on the ring can join to form additional rings.

In still another preferred embodiment, n+m is not greater than 4.

In yet another preferred embodiment, $R^2$ and $R^3$ are each, independently, selected from the group consisting of hydrogen, hydrocarbyls, and substituted hydrocarbyls, alkoxy, silyl, amino, aryloxy, halogen, and phosphino, $R^2$ and $R^3$ may be joined to form a saturated, substituted or unsubstituted hydrocarbyl ring, where the ring has 4, 5, 6, or 7 ring carbon atoms and where substitutions on the ring can join to form additional rings, or $R^2$ and $R^3$ may be joined to form a saturated heterocyclic ring, or a saturated substituted heterocyclic ring where substitutions on the ring can join to form additional rings.

In still yet another preferred embodiment, $R^{11}$ and $R^{12}$ are each, independently, selected from the group consisting of hydrogen, hydrocarbyls, and substituted hydrocarbyls, alkoxy, silyl, amino, aryloxy, halogen, and phosphino, $R^{11}$ and $R^{12}$ may be joined to form a saturated, substituted or unsubstituted hydrocarbyl ring, where the ring has 4, 5, 6, or 7 ring carbon atoms and where substitutions on the ring can join to form additional rings, or $R^{11}$ and $R^{12}$ may be joined to form a saturated heterocyclic ring, or a saturated substituted heterocyclic ring where substitutions on the ring can join to form additional rings.

In a preferred embodiment, $R^1$ and $R^{13}$ may be independently selected from phenyl groups that are variously substituted with between zero to five substituents that include F, Cl, Br, I, CF$_3$, NO$_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

Preferred $R^3$-E-$R^2$ groups and preferred $R^{12}$-E-$R^{11}$ groups include CH$_2$, CMe$_2$, SiMe$_2$, SiEt$_2$, SiPr$_2$, SiBu$_2$, SiPh$_2$, Si(aryl)$_2$, Si(alkyl)$_2$, CH(aryl), CH(Ph), CH(alkyl), and CH(2-isopropylphenyl), where alkyl is a C$_1$ to C$_{40}$ alkyl group (preferably C$_1$ to C$_{20}$ alkyl, preferably one or more of methyl, ethyl, propyl, butyl, pentyl, hexyl, heptyl, octyl, nonyl, decyl, undecyl, dodecyl, and isomers thereof), aryl is a C$_5$ to C$_{40}$ aryl group (preferably a C$_6$ to C$_{20}$ aryl group, preferably phenyl or substituted phenyl, preferably phenyl, 2-isopropylphenyl, or 2-tertbutylphenyl).

In a preferred embodiment, each X may be independently selected from halide, alkyl, aryl, alkoxy, amido, hydrido, phenoxy, hydroxy, silyl, allyl, alkenyl, triflate, alkylsulfonate, arylsulfonate, and alkynyl. The selection of the leaving groups depends on the synthesis route adopted for arriving at the complex and may be changed by additional reactions to suit the later activation method in polymerization. For example, alkyl is preferred when using non-coordinating anions such as N,N-dimethylanilinium tetrakis(pentafluorophenyl)-borate or tris(pentafluorophenyl)borane. In another embodiment, two L groups may be linked to form a dianionic leaving group, for example, oxalate.

In another embodiment of the invention, each L is independently selected from the group consisting of ethers, thio-ethers, amines, nitriles, imines, pyridines, and phosphines, preferably ethers.

In any embodiment of the invention described herein, M is preferably a Group 4 metal, preferably Zr or Hf.

In any embodiment of the invention described herein, each E is preferably carbon.

In any embodiment of the invention described herein, the transition metal complex is represented by the formula:

complex 3

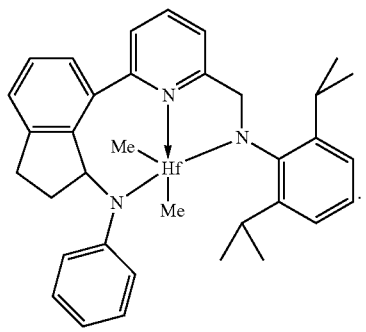

The pyridyl diamine ligands described herein are generally prepared in multiple steps in accordance with the disclosure of U.S. Pat. No. 9,290,519. An important step involves the preparation of a suitable "linker" group(s) containing both an aryl boronic acid (or acid ester) and an amine group. Examples of these include compounds of the general formula: 7-(boronic acid)-2,3-dihydro-1H-inden-1-(amine), 7-(boronic acid ester)-2,3-dihydro-1H-1-(amine), 7-(boronic acid)-1,2,3,4-tetrahydronaphthalen-1-(amine), 7-(boronic acid ester)-1,2,34-tetrahydronaphthalen-1-(amine), which include various boronic acids, boronic acid esters, and amines. The linker groups may be prepared in high yield from arylhalide precursors containing amine functionality by first deprotonation of the amine group with 1.0 molar equivalents of n-BuLi, followed by transmetalation of an arylhalide with t-BuLi and subsequent reaction with a boron-containing reagent. This amine-containing linker is then coupled with a suitable pyridine containing species, such as 6-bromo-2-pyridinecarboxaldehyde. This coupling step typically uses a metal catalyst (e.g., Pd (PPh$_3$)$_4$) in less than 5 mol % loading. Following this coupling step, the new derivative, which can be described as amine-linker-pyridine-aldehyde, is then reacted with a second amine to produce the imine derivative amine-linker-pyridine-imine in a condensation reaction. This can then be reduced to the pyridyl diamine ligand by reaction with a suitable aryl anion, alkyl anion, or hydride source. This reaction is generally performed in etherial solvents at temperatures between −100° C. and 50° C. when aryllithium or alkyllithium reagents are employed. This reaction is generally performed in methanol at reflux when sodium cyanoborohydride is employed.

The preparation of pyridyl diamide metal complexes from pyridyl diamines may be accomplished using typical protonolysis and methylation reactions. In the protonolysis reaction the pyridyl diamine is reacted with a suitable metal reactant to produce a pyridyldiamide metal complex. A suitable metal reactant will feature a basic leaving group that will accept a proton from the pyridiyl diamine and then generally depart and be removed from the product. Suitable metal reactants include, but are not limited to, HfBn$_4$ (Bn=CH$_2$Ph), ZrBn$_4$, TiBn$_4$, ZrBn$_2$Cl$_2$(OEt$_2$), HfBn$_2$Cl$_2$ (OEt$_2$)$_2$, Zr(NMe$_2$)$_2$Cl$_2$(dimethoxyethane), Hf(NMe$_2$)$_2$Cl$_2$ (dimethoxyethane), Hf(NMe$_2$)$_4$, and Hf(NEt$_2$)$_4$. Pyridyldiamide metal complexes that contain metal-chloride groups, such as the PDA dichloride complex, can be alkylated by reaction with an appropriate organometallic reagent. Suitable reagents include organolithium and organomagnesium, and Grignard reagents. The alkylations are generally performed in etherial or hydrocarbon solvents or solvent mixtures at temperatures typically ranging from −100° C. to 50° C.

Another route to pyridyl diamide and other complexes of interest as catalysts involves the insertion of an unsaturated molecule into a covalent metal-carbon bond where the covalently bonded group is part of a multidentate ligand structure, such as that described by Boussie et al. in U.S. Pat. No. 6,750,345. The unsaturated molecule will generally have a carbon-X double or triple bond where X is a group 14 or group 15 or group 16 element. Examples of unsaturated molecules include alkenes, alkynes, imines, nitriles, ketones, aldehydes, amides, formamides, carbon dioxide, isocyanates, thioisocyanates, and carbodiimides. Examples showing the insertion reactions involving imines and carbonyls are found in U.S. Pat. No. 7,973,116 and US 2012/0071616.

In a preferred embodiment of the invention, the transition metal complex is not a metallocene. A metallocene catalyst is defined as an organometallic compound with at least one π-bound cyclopentadienyl moiety (or substituted cyclopentadienyl moiety) and more frequently two π-bound cyclopentadienyl moieties or substituted cyclopentadienyl moieties.

Usefully, the single site catalyst compounds useful herein are preferably tridentateligands bound to the transition metal (such as a group 4 metal), preferably tridentate N,N,N ligands bound to a transition metal (such as a Zr, Hf or Ti).

Activators

The catalyst systems typically comprise a transition metal complex as described above and an activator such as alumoxane or a non-coordinating anion. Activation may be performed using alumoxane solution including methyl alumoxane, referred to as MAO, as well as modified MAO, referred to herein as MMAO, containing some higher alkyl groups to improve the solubility. Particularly useful MAO can be purchased from Albemarle, typically in a 10 wt % solution in toluene. The catalyst system employed in the present invention may use an activator selected from alumoxanes, such as methyl alumoxane, modified methyl alumoxane, ethyl alumoxane, iso-butyl alumoxane, and the like.

When an alumoxane or modified alumoxane is used, the complex-to-activator molar ratio is from about 1:3000 to 10:1; alternatively 1:2000 to 10:1; alternatively 1:1000 to 10:1; alternatively, 1:500 to 1:1; alternatively 1:300 to 1:1; alternatively 1:200 to 1:1; alternatively 1:100 to 1:1; alternatively 1:50 to 1:1; alternatively 1:10 to 1:1. When the activator is an alumoxane (modified or unmodified), some embodiments select the maximum amount of activator at a 5000-fold molar excess over the catalyst precursor (per metal catalytic site). The preferred minimum activator-to-complex ratio is 1:1 molar ratio.

Activation may also be performed using non-coordinating anions, referred to as NCA's, of the type described in EP 277 003 A1 and EP 277 004 A1. NCA may be added in the form of an ion pair using, for example, [DMAH]+[NCA]− in which the N,N-dimethylanilinium (DMAH) cation reacts with a basic leaving group on the transition metal complex to form a transition metal complex cation and [NCA]−. The cation in the precursor may, alternatively, be trityl. Alternatively, the transition metal complex may be reacted with a neutral NCA precursor, such as $B(C_6F_5)_3$, which abstracts an anionic group from the complex to form an activated species. Useful activators include N,N-dimethylanilinium tetrakis (pentafluorophenyl)borate (i.e., [PhNMe$_2$H]B(C$_6$F$_5$)$_4$) and N,N-dimethylanilinium tetrakis (heptafluoronaphthyl) borate, where Ph is phenyl, and Me is methyl.

Additionally preferred activators useful herein include those described in U.S. Pat. No. 7,247,687 at column 169, line 50 to column 174, line 43, particularly column 172, line 24 to column 173, line 53.

In an embodiment of the invention described herein, the non-coordinating anion activator is represented by the following formula (1):

$$(Z)_{d^+}(A^{d-}) \qquad (1)$$

wherein Z is (L-H) or a reducible Lewis acid; L is a neutral Lewis base; H is hydrogen and (L-H)$^+$ is a Bronsted acid; $A^{d-}$ is a non-coordinating anion having the charge d−; and d is an integer from 1 to 3.

When Z is (L-H) such that the cation component is (L-H)d$^+$, the cation component may include Bronsted acids such as protonated Lewis bases capable of protonating a moiety, such as an alkyl or aryl, from the catalyst precursor, resulting in a cationic transition metal species, or the activating cation (L-H)d$^+$ is a Bronsted acid, capable of donating a proton to the catalyst precursor resulting in a transition metal cation, including ammoniums, oxoniums, phosphoniums, silyliums, and mixtures thereof, or ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid, it may be represented by the formula: (Ar$_3$C$^+$), where Ar is aryl or aryl substituted with a heteroatom, or a C$_1$ to C$_{40}$ hydrocarbyl, the reducible Lewis acid may be represented by the formula: (Ph$_3$C$^+$), where Ph is phenyl or phenyl substituted with a heteroatom, and/or a C$_1$ to C$_{40}$ hydrocarbyl. In an embodiment, the reducible Lewis acid is triphenyl carbenium.

Embodiments of the anion component Ad$^-$ include those having the formula [Mk+Qn]d$^-$ wherein k is 1, 2, or 3; n is 1, 2, 3, 4, 5, or 6, or 3, 4, 5, or 6; n−k=d; M is an element selected from Group 13 of the Periodic Table of the Elements, or boron or aluminum, and Q is independently a hydride, bridged or unbridged dialkylamido, halide, alkoxide, aryloxide, hydrocarbyl radicals, said Q having up to 20 carbon atoms with the proviso that in not more than one occurrence is Q a halide, and two Q groups may form a ring structure. Each Q may be a fluorinated hydrocarbyl radical having 1 to 20 carbon atoms, or each Q is a fluorinated aryl radical, or each Q is a pentafluoryl aryl radical. Examples of suitable Ad-components also include diboron compounds as disclosed in U.S. Pat. No. 5,447,895, which is fully incorporated herein by reference.

In an embodiment in any of the NCA's represented by Formula 1 described above, the anion component Ad-is represented by the formula [M*k*+Q*n*]d*− wherein k* is 1, 2, or 3; n* is 1, 2, 3, 4, 5, or 6 (or 1, 2, 3, or 4); n*−k*=d*; M* is boron; and Q* is independently selected from hydride, bridged or unbridged dialkylamido, halogen, alkoxide, aryloxide, hydrocarbyl radicals, said Q* having up to 20 carbon atoms with the proviso that in not more than 1 occurrence is Q* a halogen.

This invention also relates to a method to polymerize olefins comprising contacting olefins (such as propylene) with a catalyst complex as described above and an NCA activator represented by the Formula (2):

$$R_nM^{**}(ArNHal)_{4-n} \qquad (2)$$

where R is a monoanionic ligand; M** is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the NCA comprising an anion of Formula 2 also comprises a suitable cation that is essentially non-interfering with the ionic catalyst complexes formed with the transition metal compounds, or the cation is $Z_d^+$ as described above.

In an embodiment in any of the NCA's comprising an anion represented by Formula 2 described above, R is selected from the group consisting of C$_1$ to C$_{30}$ hydrocarbyl radicals. In an embodiment, C$_1$ to C$_{30}$ hydrocarbyl radicals may be substituted with one or more C$_1$ to C$_{20}$ hydrocarbyl radicals, halide, hydrocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means C$_4$ to C$_{20}$ hydrocarbyl radicals; —SRa, —NRa$_2$, and —PRa$_2$, where each Ra is independently a monovalent C$_4$ to C$_{20}$ hydrocarbyl radical comprising a molecular volume greater than or equal to the molecular volume of an isopropyl substitution or a C$_4$ to C$_{20}$ hydrocarbyl substituted organometalloid having a molecular volume greater than or equal to the molecular volume of an isopropyl substitution.

In an embodiment in any of the NCA's comprising an anion represented by Formula 2 described above, the NCA also comprises cation comprising a reducible Lewis acid represented by the formula: (Ar$_3$C$^+$), where Ar is aryl or aryl substituted with a heteroatom, and/or a C$_1$ to C$_{40}$ hydrocarbyl, or the reducible Lewis acid represented by the formula: (Ph$_3$C$^+$), where Ph is phenyl or phenyl substituted with one or more heteroatoms, and/or C$_1$ to C$_{40}$ hydrocarbyls.

In an embodiment in any of the NCA's comprising an anion represented by Formula 2 described above, the NCA may also comprise a cation represented by the formula, (L-H)d$^+$, wherein L is a neutral Lewis base; H is hydrogen; (L-H) is a Bronsted acid; and d is 1, 2, or 3, or (L-H)d$^+$ is a Bronsted acid selected from ammoniums, oxoniums, phosphoniums, silyliums, and mixtures thereof.

Further examples of useful activators include those disclosed in U.S. Pat. Nos. 7,297,653 and 7,799,879, which are fully incorporated by reference herein.

In an embodiment, an activator useful herein comprises a salt of a cationic oxidizing agent and a noncoordinating, compatible anion represented by the Formula (3):

$$(OX^{e+})_d(A^{d-})_e \qquad (3)$$

wherein $OX^{e+}$ is a cationic oxidizing agent having a charge of e+; e is 1, 2, or 3; d is 1, 2, or 3; and $A^{d-}$ is a non-coordinating anion having the charge of d− (as further described above). Examples of cationic oxidizing agents include: ferrocenium, hydrocarbyl-substituted ferrocenium, $Ag^+$, or $Pb^{+2}$. Suitable embodiments of $A^{d-}$ include tetrakis(pentafluorophenyl)borate.

Activators useful in catalyst systems herein include: trimethylammonium tetrakis(perfluoronaphthyl)borate, N,N-dimethylanilinium tetrakis(perfluoronaphthyl)borate, N,N-diethylanilinium tetrakis(perfluoronaphthyl)borate, triphenylcarbenium tetrakis(perfluoronaphthyl)borate, trimethylammonium tetrakis(perfluorobiphenyl)borate, N,N-dimethylanilinium tetrakis(perfluorobiphenyl)borate, triphenylcarbenium tetrakis(perfluorobiphenyl)borate, and the types disclosed in U.S. Pat. No. 7,297,653, which is fully incorporated by reference herein.

Suitable activators also include: N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Ph_3C+][B(C_6F_5)_4-]$, $[Me_3NH+][B(C_6F_5)_4-]$; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In an embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In an embodiment, two NCA activators may be used in the polymerization and the molar ratio of the first NCA activator to the second NCA activator can be any ratio. In an embodiment, the molar ratio of the first NCA activator to the second NCA activator is 0.01:1 to 10,000:1, or 0.1:1 to 1000:1, or 1:1 to 100:1.

In an embodiment of the invention, the NCA activator-to-catalyst ratio is a 1:1 molar ratio, or 0.1:1 to 100:1, or 0.5:1 to 200:1, or 1:1 to 500:1 or 1:1 to 1000:1. In an embodiment, the NCA activator-to-catalyst ratio is 0.5:1 to 10:1, or 1:1 to 5:1.

In an embodiment, the catalyst compounds can be combined with combinations of alumoxanes and NCA's (see for example, U.S. Pat. Nos. 5,153,157; 5,453,410; EP 0 573 120 B1; WO 94/07928; and WO 95/14044 which discuss the use of an alumoxane in combination with an ionizing activator, all of which are incorporated by reference herein).

In a preferred embodiment of the invention, when an NCA (such as an ionic or neutral stoichiometric activator) is used, the complex-to-activator molar ratio is typically from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2.

Alternately, a co-activator or chain transfer agent, such as a group 1, 2, or 13 organometallic species (e.g., an alkyl aluminum compound such as tri-n-octyl aluminum), may also be used in the catalyst system herein. The complex-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1; 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

Metal Hydrocarbenyl Transfer Agents (Aluminum Vinyl Transfer Agents)

The catalyst systems described herein further comprise a metal hydrocarbenyl transfer agent (which is any group 13 metal agent that contains at least one transferrable group that has an allyl chain end), preferably an aluminum vinyl-transfer agent, also referred to as an AVTA, (which is any aluminum agent that contains at least one transferrable group that has an allyl chain end). An allyl chain end is represented by the formula $H_2C=CH-CH_2-$. "Allylic vinyl group," "allyl chain end," "vinyl chain end," "vinyl termination," "allylic vinyl group," "terminal vinyl group," and "vinyl terminated" are used interchangeably herein and refer to an allyl chain end. An allyl chain end is not a vinylidene chain end or a vinylene chain end. The number of allyl chain ends, vinylidene chain ends, vinylene chain ends, and other unsaturated chain ends is determined using $^1H$ NMR at 120° C. using deuterated tetrachloroethane as the solvent on an at least 250 MHz NMR spectrometer.

Useful transferable groups containing an allyl chain end are represented by the formula $CH_2=CH-CH_2-R^*$, where $R^*$ represents a hydrocarbyl group or a substituted hydrocarbyl group, such as a $C_1$ to $C_{20}$ alkyl, preferably methyl, ethyl, propyl, butyl, pentyl, hexyl, heptyl, octyl, nonyl, decyl, undecyl, dodecyl, or an isomer thereof.

In the catalyst system described herein, the catalyst undergoes alkyl group transfer with the transfer agent, which enables the formation of polymer chains containing one or more allyl chain ends.

Useful transferable groups containing an allyl chain end also include those represented by the formula $CH_2=CH-CH_2-R^{}$, where $R^{}$ represents a hydrocarbeneyl group or a substituted hydrocarbeneyl group, such as a $C_1$ to $C_{20}$ alkylene, preferably methylene $(CH_2)$, ethylene $[(CH_2)_2]$, propandiyl $[(CH_2)_2]$, butandiyl $[(CH_2)_4]$, pentandiyl $[(CH_2)_5]$, hexandiyl $[(CH_2)_6]$, heptandiyl $[(CH_2)_7]$, octandiyl $[(CH_2)_8]$, nonandiyl $[(CH_2)_9]$, decandiyl $[(CH_2)_{10}]$, undecandiyl $[(CH_{20})_{11}]$, dodecandiyl $[(CH_2)_{12}]$, or an isomer thereof. Useful transferable groups are preferably non-substituted linear hydrocarbeneyl groups. Preferably, at least one $R^{**}$ is a $C_4$-$C_{20}$ hydrocarbenyl group.

The term "hydrocarbeneyl" refers to a hydrocarb-di-yl divalent group, such as a $C_1$ to $C_{20}$ alkylene (i.e., methylene $(CH_2)$, ethylene $[(CH_2)_2]$, propandiyl $[(CH_2)_3]$, butandiyl $[(CH_2)_4]$, pentandiyl $[(CH_2)_5]$, hexandiyl $[(CH_2)_6]$, heptandiyl $[(CH_2)_7]$, octandiyl $[(CH_2)_8]$, nonandiyl $[(CH_2)_9]$, decandiyl $[(CH_2)_{10}]$, undecandiyl $[(CH_2)_{11}]$, dodecandiyl $[(CH_2)_{12}]$, and isomers thereof).

AVTA's are alkenylaluminum reagents capable of causing group exchange between the transition metal of the catalyst system ($M^{TM}$) and the metal of the AVTA ($M^{AVTA}$). The reverse reaction may also occur such that the polymeryl chain is transferred back to the transition metal of the catalyst system. This reaction scheme is illustrated below:

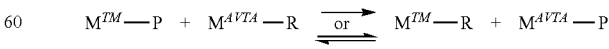

wherein $M^{TM}$ is an active transition metal catalyst site and P is the polymeryl chain, $M^{AVTA}$ is the metal of the AVTA, and R is a transferable group containing an allyl chain end, such as a hydrocarbyl group containing an allyl chain end, also called a hydrocarbenyl or alkenyl group.

Catalyst systems of this invention preferably have high rates of olefin propagation and negligible or no chain termination via beta hydride elimination, beta methyl elimination, or chain transfer to monomer relative to the rate of chain transfer to the AVTA or other chain transfer agent, such as an aluminum alkyl, if present. Pyridyldiamido catalyst complexes (see U.S. Pat. Nos. 7,973,116; 8,394,902; 8,674,040; 8,710,163; 9,102,773; US 2014/0256893; US 2014/0316089; and US 2015/0141601) activated with non-coordinating activators such as dimethylanilinium tetrakis(perfluorophenyl)borate and/or dimethylanilinium tetrakis(perfluoronaphthyl)borate are particularly useful in the catalyst systems of this invention. Compound 3, described above is particularly preferred.

In any embodiment of the invention described herein, the catalyst system comprises an aluminum vinyl transfer agent, which is typically represented by the formula (I):

$$Al(R')_{3-v}(R)_v$$

where R is a hydrocarbenyl group containing 4 to 20 carbon atoms having an allyl chain end, R' is a hydrocarbyl group containing 1 to 30 carbon atoms, and v is 0.1 to 3, alternately 1 to 3, alternately 1.1 to less than 3, alternately v is 0.5 to 2.9, 1.1 to 2.9, alternately 1.5 to 2.7, alternately 1.5 to 2.5, alternately 1.8 to 2.2. The compounds represented by the formula $Al(R')_{3-v}(R)_v$ are typically a neutral species, but anionic formulations may be envisioned, such as those represented by formula (II): $[Al(R')_{4-w}(R)_w]^-$, where w is 0.1 to 4, R is a hydrocarbenyl group containing 4 to 20 carbon atoms having an allyl chain end, and R' is a hydrocarbyl group containing 1 to 30 carbon atoms.

In any embodiment of any formula for a metal hydrocarbenyl chain transfer agent, such as formula I or II, described herein, each R' is independently chosen from $C_1$ to $C_{30}$ hydrocarbyl groups (such as a $C_1$ to $C_{20}$ alkyl groups, preferably methyl, ethyl, propyl, butyl, pentyl, hexyl, heptyl, octyl, nonyl, decyl, undecyl, dodecyl, or an isomer thereof), and R is represented by the formula:

$$-(CH_2)_nCH=CH_2$$

where n is an integer from 2 to 18, preferably between 6 to 18, preferably 6 to 12, preferably 6. In any embodiment of the invention described herein, particularly useful AVTAs include, but are not limited to, tri(but-3-en-1-yl)aluminum, tri(pent-4-en-1-yl)aluminum, tri(oct-7-en-1-yl)aluminum, tri(non-8-en-1-yl)aluminum, tri(dec-9-en-1-yl)aluminum, dimethyl(oct-7-en-1-yl)aluminum, diethyl(oct-7-en-1-yl)aluminum, dibutyl(oct-7-en-1-yl)aluminum, diisobutyl(oct-7-en-1-yl)aluminum, diisobutyl(non-8-en-1-yl)aluminum, diisobutyl(dec-8-en-1-yl)aluminum, diisobutyl(dodec-10-en-1-yl)aluminum, and the like. Mixtures of one or more AVTAs may also be used. In some embodiments of the invention, isobutyl-di(oct-7-en-1-yl)-aluminum, isobutyl-di(dec-9-en-1-yl)-aluminum, isobutyl-di(non-8-en-1-yl)-aluminum, isobutyl-di(hept-6-en-1-yl)-aluminum are preferred.

Useful aluminum vinyl transfer agents include organoaluminum compound reaction products between aluminum reagent ($AlR^a_3$) and an alkyl diene. Suitable alkyl dienes include those that have two "alpha olefins", as described above, at two termini of the carbon chain. The alkyl diene can be a straight chain or branched alkyl chain and substituted or unsubstituted. Exemplary alkyl dienes include but are not limited to, for example, 1,3-butadiene, 1,4-pentadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, 1,14-pentadecadiene, 1,15-hexadecadiene, 1,16-heptadecadiene, 1,17-octadecadiene, 1,18-nonadecadiene, 1,19-eicosadiene, 1,20-heneicosadiene, etc. Exemplary aluminum reagents include triisobutylaluminum, diisobutylaluminumhydride, isobutylaluminumdihydride and aluminum hydride ($AlH_3$).

In any embodiment of the invention described herein, R" is butenyl, pentenyl, heptenyl, or octenyl. In some embodiments R" is preferably octenyl.

In any embodiment of the invention described herein, R' is methyl, ethyl, propyl, isobutyl, or butyl. In any embodiment of the invention described herein, R' is isobutyl.

In any embodiment of the invention described herein, v is about 2, or v is 2.

In any embodiment of the invention described herein, v is about 1, or v is 1, preferably from about 1 to about 2.

In any embodiment of the invention described herein, v is an integer or a non-integer, preferably v is from 1.1 to 2.9, from about 1.5 to about 2.7, e.g., from about 1.6 to about 2.4, from about 1.7 to about 2.4, from about 1.8 to about 2.2, from about 1.9 to about 2.1 and all ranges there between.

In preferred embodiments of the invention described herein, R' is isobutyl and each R" is octenyl, preferably R' is isobutyl, each R" is octenyl, and v is from 1.1 to 2.9, from about 1.5 to about 2.7, e.g., from about 1.6 to about 2.4, from about 1.7 to about 2.4, from about 1.8 to about 2.2, from about 1.9 to about 2.1.

The amount of v (the aluminum alkenyl) is described using the formulas: $(3-v)+v=3$, and $Al(R')_{3-v}(R")_v$ where R" is a hydrocarbenyl group containing 4 to 20 carbon atoms having an allyl chain end, R' is a hydrocarbyl group containing 1 to 30 carbon atoms, and v is 0.1 to 3 (preferably 1.1 to 3). This formulation represents the observed average of organoaluminum species (as determined by $^1H$ NMR) present in a mixture, which may include any of $Al(R')_3$, $Al(R')_2(R")$, $Al(R')(R")_2$, and $Al(R")_3$. $^1H$ NMR spectroscopic studies are performed at room temperature using a Bruker 400 MHz NMR. Data is collected using samples prepared by dissolving 10-20 mg the compound in 1 mL of $C_6D_6$. Samples are then loaded into 5 mm NMR tubes for data collection. Data is recorded using a maximum pulse width of 45°, 8 seconds between pulses and signal averaging either 8 or 16 transients. The spectra are normalized to protonated tetrachloroethane in the $C_6D_6$. The chemical shifts (δ) are reported as relative to the residual protium in the deuterated solvent at 7.15 ppm.

In still another aspect, the aluminum vinyl-transfer agent has less than 50 wt % dimer present, based upon the weight of the AVTA, preferably less than 40 wt %, preferably less than 30 wt %, preferably less than 20 wt %, preferably less than 15 wt %, preferably less than 10 wt %, preferably less than 5 wt %, preferably less than 2 wt %, preferably less than 1 wt %, preferably 0 wt % dimer. Alternately dimer is present at from 0.1 to 50 wt %, alternately 1 to 20 wt %, alternately at from 2 to 10 wt %. Dimer is the dimeric product of the alkyl diene used in the preparation of the AVTA. The dimer can be formed under certain reaction conditions, and is formed from the insertion of a molecule of diene into the Al—R bond of the AVTA, followed by beta-hydride elimination. For example, if the alkyl diene used is 1,7-octadiene, the dimer is 7-methylenepentadeca-1,14-diene. Similarly, if the alkyl diene is 1,9-decadiene, the dimer is 9-methylenenonadeca-1,18-diene.

Useful compounds can be prepared by combining an aluminum reagent (such as alkyl aluminum) having at least one secondary alkyl moiety (such as triisobutylaluminum) and/or at least one hydride, such as a dialkylaluminum hydride, a monoalkylaluminum dihydride or aluminum trihydride (aluminum hydride, $AlH_3$) with an alkyl diene and heating to a temperature that causes release of an alkylene byproduct. The use of solvent(s) is not required. However, non-polar solvents can be employed, such as, as hexane, pentane, toluene, benzene, xylenes, and the like, or combinations thereof.

In an embodiment of the invention, the AVTA is free of coordinating polar solvents such as tetrahydrofuran and diethylether.

After the reaction is complete, solvent if, present can be removed and the product can be used directly without further purification.

The AVTA to catalyst complex equivalence ratio can be from about 1:100 to 500,000:1. More preferably, the molar ratio of AVTA to catalyst complex is greater than 5, alternately greater than 10, alternately greater than 15, alternately greater than 20, alternately greater than 25, alternately greater than 30.

The metal hydrocarbenyl chain transfer agent may be represented by the formula: $E[Al(R')_{2-v}(R)_v]_2$ wherein E is a group 16 element (such as O or S, preferably O); each R', independently, is a $C_1$ to $C_{30}$ hydrocarbyl group (such as a $C_1$ to $C_{20}$ alkyl group, preferably methyl, ethyl, propyl, butyl, pentyl, hexyl, heptyl, octyl, nonyl, decyl, undecyl, dodecyl, or an isomer thereof); each R", independently, is a $C_4$ to $C_{20}$ hydrocarbenyl group having an allyl chain end (such as a $C_1$ to $C_{20}$ alkenyl group, preferably methenyl, ethenyl, propenyl, butenyl, pentenyl, heptenyl, octenyl, nonenyl, decenyl, undecenyl, dodecenyl, or an isomer thereof); v is from 0.01 to 3 (such as 1 or 2).

In another embodiment of the invention, the metal hydrocarbenyl chain transfer agent is an alumoxane formed from the hydrolysis of the AVTA. Alternatively, the alumoxane can be formed from the hydrolysis of the AVTA in combination with other aluminum alkyl(s). The alumoxane component is an oligomeric compound which is not well characterized, but can be represented by the general formula $(R—Al—O)_m$ which is a cyclic compound, or may be $R'(R—Al—O)_m—AlR'_2$ which is a linear compound where R' is as defined above and at least one R' is the same as R (as defined above), and m is from about 4 to 25, with a range of 13 to 25 being preferred. Most preferably all R' are R. An alumoxane is generally a mixture of both the linear and cyclic compounds.

Supports

The complexes described herein may be supported (with or without an activator and with or without a transfer agent) by any method effective to support other coordination catalyst systems, effectively meaning that the catalyst so prepared can be used for polymerizing olefin(s) in a heterogeneous process. The catalyst precursor, activator, optional transfer agent, co-activator if needed, suitable solvent, and support may be added in any order or simultaneously. Typically, the complex, activator, and optional transfer agent may be combined in solvent to form a solution. Then the support is added, and the mixture is stirred for 1 minute to 10 hours. The total solution volume may be greater than the pore volume of the support, but some embodiments limit the total solution volume below that needed to form a gel or slurry (about 90% to 400%, preferably about 100% to 200% of the pore volume). After stirring, the residual solvent is removed under vacuum, typically at ambient temperature and over 10-16 hours. But greater or lesser times and temperatures are possible.

The complex may also be supported absent the activator, and in that case, the activator (and co-activator if needed) is added to a polymerization process' liquid phase. Additionally, two or more different complexes may be placed on the same support. Likewise, two or more activators or an activator and co-activator may be placed on the same support. Likewise the transfer agent may be added to the polymerization reaction separately from the supported catalyst complex and/or activator.

Suitable solid particle supports are typically comprised of polymeric or refractory oxide materials, each being preferably porous. Preferably, any support material that has an average particle size greater than 10 µm is suitable for use in this invention. Various embodiments select a porous support material, such as for example, talc, inorganic oxides, inorganic chlorides, for example magnesium chloride and resinous support materials such as polystyrene polyolefin or polymeric compounds or any other organic support material and the like. Some embodiments select inorganic oxide materials as the support material including Group-2, -3, -4, -5, -13, or -14 metal or metalloid oxides. Some embodiments select the catalyst support materials to include silica, alumina, silica-alumina, and their mixtures. Other inorganic oxides may serve either alone or in combination with the silica, alumina, or silica-alumina. These are magnesia, titania, zirconia, and the like. The support can optionally double as the activator component; however, an additional activator may also be used.

The support material may be pre-treated by any number of methods. For example, inorganic oxides may be calcined, chemically treated with dehydroxylating agents such as aluminum alkyls and the like, or both.

As stated above, polymeric carriers will also be suitable in accordance with the invention, see, for example, the descriptions in WO 95/15815 and U.S. Pat. No. 5,427,991. The methods disclosed may be used with the catalyst complexes, activators or catalyst systems of this invention to adsorb or absorb them on the polymeric supports, particularly if made up of porous particles, or may be chemically bound through functional groups bound to or in the polymer chains.

Useful supports typically have a surface area of from 10-700 m²/g, a pore volume of 0.1-4.0 cc/g and an average particle size of 10-500 µm. Some embodiments select a surface area of 50-500 m2/g, a pore volume of 0.5-3.5 cc/g, or an average particle size of 20-200 µm. Other embodiments select a surface area of 100-400 m2/g, a pore volume of 0.8-3.0 cc/g, and an average particle size of 30-100 µm. Useful supports typically have a pore size of 10-1000 Angstroms, alternatively 50-500 Angstroms, or 75-350 Angstroms.

The catalyst complexes described herein are generally deposited on the support at a loading level of 10-100 micromoles of complex per gram of solid support; alternately 20-80 micromoles of complex per gram of solid support; or 40-60 micromoles of complex per gram of support. However, greater or lesser values may be used provided that the total amount of solid complex does not exceed the support's pore volume.

Polymerization

Invention catalyst complexes are useful in polymerizing unsaturated monomers conventionally known to undergo coordination-catalyzed polymerization such as solution, slurry, gas-phase, and high-pressure polymerization. Typically, one or more of the complexes described herein, one or more activators, one or more transfer agents (such as an aluminum vinyl transfer agent) and one or more monomers are contacted to produce polymer. The complexes may be supported and, as such, will be particularly useful in the known, fixed-bed, moving-bed, fluid-bed, slurry, gas phase, solution, or bulk operating modes conducted in single, series, or parallel reactors.

One or more reactors in series or in parallel may be used in the present invention.

The complexes, activator, transfer agent, and, when required, co-activator, may be delivered as a solution or slurry, either separately to the reactor, activated in-line just prior to the reactor, or pre-activated and pumped as an activated solution or slurry to the reactor. Polymerizations are carried out in either single reactor operation, in which monomer, comonomers, catalyst/activator/co-activator, optional scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to the first reaction and another component to other reactors. In one preferred embodiment, the complex is activated in the reactor in the presence of olefin and transfer agent.

In a particularly preferred embodiment, the polymerization process is a continuous process.

Polymerization process used herein typically comprises contacting one or more alkene monomers with the complexes, activators and transfer agents described herein. For purpose of this invention alkenes are defined to include multi-alkenes (such as dialkenes) and alkenes having just one double bond. Polymerization may be homogeneous (solution or bulk polymerization) or heterogeneous (slurry—in a liquid diluent, or gas phase—in a gaseous diluent). In the case of heterogeneous slurry or gas phase polymerization, the complex and activator may be supported. Silica is useful as a support herein. Chain transfer agents (such as hydrogen or diethyl zinc) may be used in the practice of this invention.

The present polymerization processes may be conducted under conditions preferably including a temperature of about 30° C. to about 200° C., preferably from 60° C. to 195° C., preferably from 75° C. to 190° C. The process may be conducted at a pressure of from 0.05 to 1500 MPa. In a preferred embodiment, the pressure is between 1.7 MPa and 30 MPa, or in another embodiment, especially under supercritical conditions, the pressure is between 15 MPa and 1500 MPa.

If branching (such a g'vis of less than 0.95) is desired in the polymer product, then, among other things, one may increase the moles of metal hydrocarbenyl chain transfer agent added to the reactor relative to the amount of polymer produced (such as grams of polymer/mols of AVTA being less than 500,000; 400,000 or less; 200,000 or less; 100,000 or less; 50,000 or less; 25,000 or less; 10,000 or less), and/or increase the temperature of the polymerization reaction (such as above 80° C.), and/or increase the solids content in the polymerization reaction mass (such as 10 weight % or more, based on the weight of the components entering the reactor), and/or increase the residence time of the polymerization (such as 10 minutes or more). Likewise, if a more linear polymer is desired (such as a g'vis of more than 0.95), then, among other things, one may reduce the moles of metal hydrocarbenyl chain transfer agent added to the reactor relative to the amount of polymer produced (such as grams of polymer/mols of AVTA being 500,000 or more), and/or reduce the temperature of the polymerization reaction (such as 80° C. or less), and/or reduce the solids content in the polymerization reaction mass such as 10 volume % or less), and/or reduce the residence time of the polymerization (such as 10 minutes or less). One of ordinary skill in the art will readily appreciate that 1, 2, 3 or 4 of the above conditions may be varied above or below the suggested conditions above to obtain a desired result. For example a lower catalyst/AVTA molar ratio can be used if the catalyst activity is higher.

Monomers

Monomers useful herein include olefins having from 2 to 40 carbon atoms, alternately 2 to 12 carbon atoms (preferably ethylene, propylene, butylene, pentene, hexene, heptene, octene, nonene, decene, and dodecene) and, optionally, also polyenes (such as dienes). Particularly preferred monomers include ethylene, and mixtures of $C_2$ to $C_{10}$ alpha olefins, such as ethylene-propylene, ethylene-hexene, ethylene-octene, propylene-hexene, and the like.

The catalyst systems described herein are also particularly effective for the polymerization of ethylene, either alone or in combination with at least one other olefinically unsaturated monomer, such as a $C_3$ to $C_{20}$ α-olefin, and particularly a $C_3$ to $C_{12}$ α-olefin. Likewise, the present complexes are also particularly effective for the polymerization of propylene, either alone or in combination with at least one other olefinically unsaturated monomer, such as ethylene or a $C_4$ to $C_{20}$ α-olefin, and particularly a $C_4$ to $C_{20}$ α-olefin. Examples of preferred α-olefins include ethylene, propylene, butene-1, pentene-1, hexene-1, heptene-1, octene-1, nonene-1, decene-1, dodecene-1, 4-methylpentene-1, 3-methylpentene-1, 3, 5, 5-trimethylhexene-1, and 5-ethylnonene-1.

In some embodiments, the monomer mixture may also comprise one or more dienes at up to 10 wt %, such as from 0.00001 to 1.0 wt %, for example from 0.002 to 0.5 wt %, such as from 0.003 to 0.2 wt %, based upon the monomer mixture. Non-limiting examples of useful dienes include, cyclopentadiene, norbornadiene, dicyclopentadiene, 5-ethylidene-2-norbornene, 5-vinyl-2-norbornene, 1,4-hexadiene, 1,5-hexadiene, 1,5-heptadiene, 1,6-heptadiene, 6-methyl-1,6-heptadiene, 1,7-octadiene, 7-methyl-1,7-octadiene, 1,9-decadiene, and 9-methyl-1,9-decadiene.

Where olefins are used that give rise to short chain branching, such as propylene, the catalyst systems may, under appropriate conditions, generate stereoregular polymers or polymers having stereoregular sequences in the polymer chains.

In a preferred embodiment, the catalyst systems described herein are used in any polymerization process described above to produce ethylene homopolymers or copolymers, or propylene homopolymers or copolymers.

Scavengers

In some embodiments, when using the complexes described herein, particularly when they are immobilized on a support, the catalyst system will additionally comprise one or more scavenging compounds. Here, the term scavenging compound means a compound that removes polar impurities from the reaction environment. These impurities adversely affect catalyst activity and stability. Typically, the scavenging compound will be an organometallic compound such as the Group-13 organometallic compounds of U.S. Pat. Nos. 5,153,157; 5,241,025; WO 1991/09882; WO 1994/03506; WO 1993/14132; and that of WO 1995/07941. Exemplary compounds include triethyl aluminum, triethyl borane, tri-iso-butyl aluminum, methyl alumoxane, iso-butyl alumoxane, tri-n-octyl aluminum, bis(diisobutylaluminum)oxide, modified methylalumoxane. (Useful modified methylalumoxane include cocatalyst type 3A (commercially available from Akzo Chemicals, Inc. under the trade name Modified Methylalumoxane type 3A) and those described in U.S. Pat. No. 5,041,584). Those scavenging compounds having bulky or $C_6$-$C_{20}$ linear hydrocarbyl substituents connected to the metal or metalloid center usually minimize adverse interaction with the active catalyst. Examples include triethylaluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, [Me$_2$HNPh]+[B(pfp)$_4$]- or B(pfp)$_3$ (perfluorophenyl=pfp=$C_6F_5$).

In embodiments, the transfer agent, such as the aluminum vinyl transfer agent, may also function as a scavenger.

In a preferred embodiment, two or more catalyst complexes as described herein are combined with a chain transfer agent, such as diethyl zinc or tri-n-octylaluminum, in the same reactor with monomer. Alternately, one or more complexes are combined with another catalyst (such as a metallocene) and a chain transfer agent, such as diethyl zinc and/or tri-n-octylaluminum, in the same reactor with monomer.

Polymer Products

While the molecular weight of the polymers produced herein is influenced by reactor conditions including temperature, monomer concentration and pressure, the presence of chain terminating agents and the like, the homopolymer and copolymer products produced by the present process may have an Mw of about 1,000 to about 2,000,000 g/mol, alternately of about 30,000 to about 600,000 g/mol, or alternately of about 100,000 to about 500,000 g/mol, as determined by Gel Permeation Chromatography. Preferred polymers produced herein may be homopolymers or copolymers. In a preferred embodiment, the comonomer(s) are present at up to 50 mol %, preferably from 0.01 to 40 mol %, preferably 1 to 30 mol %, preferably from 5 to 20 mol %.

The polymers produced by the process of the invention can be used in a wide variety of products and end-use applications. The polymers produced can be homo- and co-polymers of ethylene and propylene and include linear low density polyethylene, elastomers, plastomers, high-density polyethylenes, medium density polyethylenes, low density polyethylenes, polypropylene and polypropylene copolymers. Polymers, typically ethylene based copolymers, have a density of from 0.86 g/cc to 0.97 g/cc; density being measured in accordance with ASTM-D-1238. Propylene based polymers produced include isotactic polypropylene, atactic polypropylene and random, block or impact copolymers.

The polymers of embodiments of the invention may have an $M_n$ (number-average molecular weight) value from 300 to 1,000,000, or between from 700 to 300,000 g/mol. For low weight molecular weight applications, such as those copolymers useful in lubricating and fuel oil compositions, an $M_n$ of 300 to 20,000 is contemplated, or less than or equal to 10,000 g/mol. Additionally, copolymer of embodiments of the invention will comprise a molecular weight distribution (Mw/Mn) in the range of ≥1, or ≥1.5 or ≤6, or ≤4 or ≤3, preferably from greater than 1 to 40, alternatively from 1.5 to 20, alternatively from 1.5 to 10, alternatively from 1.6 to 6, alternatively from 1.5 to 4, or alternatively from 2 to 3.

Preferred propylene polymer, preferably homopolymer, produced herein has an Mw of 20,000 up to 2,000,000 g/mol.

For higher molecular weight applications, preferred polymer, preferably homopolymer, produced herein has an Mw of 20,000 up to 2,000,000 g/mol, alternately 50,000 to 1,500,000 g/mol, alternately 100,000 to 1,300,000 g/mol, alternately 300,000 to 1,300,000 g/mol, alternately 500,000 to 1,300,000 g/mol.

For higher molecular weight applications, preferred polymer, preferably homopolymer, produced herein has an Mw of 20,000 up to 2,000,000 g/mol and a g' of a g'vis of more than 0.90, alternately 0.95 or more, alternately 0.98 or more.

For lower molecular weight applications, preferred polymer, preferably homopolymer, produced herein has an Mw of less than 100,000 g/mol and a g'vis of 0.95 or less, alternately 0.90 or less, alternately 0.85 or less, alternately 0.80 or less, alternately 0.75 or less, alternately 0.70 or less, alternately 0.60 or less.

End Uses

The polymers of this invention may be blended and/or coextruded with any other polymer. Non-limiting examples of other polymers include linear low density polyethylenes, elastomers, plastomers, high pressure low density polyethylene, high density polyethylenes, isotactic polypropylene, ethylene propylene copolymers and the like.

Articles made using polymers produced herein may include, for example, molded articles (such as containers and bottles, e.g., household containers, industrial chemical containers, personal care bottles, medical containers, fuel tanks, and storageware, toys, sheets, pipes, tubing) films, non-wovens, and the like. It should be appreciated that the list of applications above is merely exemplary, and is not intended to be limiting.

In particular, polymers produced by the process of the invention and blends thereof are useful in such forming operations as film, sheet, and fiber extrusion and coextrusion as well as blow molding, injection molding, roto-molding. Films include blown or cast films formed by coextrusion or by lamination useful as shrink film, cling film, stretch film, sealing film or oriented films.

This invention further relates to:

1. A catalyst system comprising an activator; a metal hydrocarbenyl transfer agent, preferably an aluminum vinyl-transfer agent; and a transition metal complex represented by the formula:

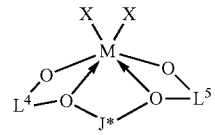

where: (1) J* is a divalent bridging group comprising C, Si, or both; (2) M is a group 4 metal, preferably hafnium and zirconium; (3) O is oxygen; (4) each X is independently a univalent anionic ligand, or two Xs are joined and bound to the metal atom to form a metallocycle ring, or two Xs are joined to form a chelating ligand, a diene ligand, or an alkylidene ligand; and (5) $L^4$ and $L^5$ are independently, a substituted monocyclic or polycyclic aromatic groups.

2. A catalyst system comprising an activator; a metal hydrocarbenyl chain transfer agent, preferably an aluminum vinyl-transfer agent; and a transition metal complex represented by the formula:

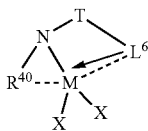

wherein (1) M is a group 4 metal, preferably hafnium; (2) $L^6$ is a $C_5$-$C_{20}$ heteroaryl group containing a Lewis base functionality, especially pyridine-2-yl or substituted pyridine-2-yl group or a divalent derivative thereof; (3) $R^{40}$ is selected from a $C_1$-$C_{30}$ alkyl, cycloalkyl, heteroalkyl, cycloheteroalkyl, aryl and substituted derivatives thereof or a divalent derivative thereof; (4) T is a divalent bridging group comprising carbon and or silicon, preferably a $C_1$-$C_{20}$ hydrocarbyl substituted methylene or silane group; (5) each X is independently a univalent anionic ligand, or two Xs are joined and bound to the metal atom to form a metallocycle ring, or two Xs are joined to form a chelating ligand, a diene ligand, or an alkylidene ligand; (6) N is nitrogen; and (7) bonds, optional bonds and dative bonds are represented by lines, dotted lines and arrows, respectively.

3. A catalyst system comprising an activator; a metal hydrocarbenyl chain transfer agent, preferably an aluminum vinyl-transfer agent; and a transition metal complex represented by the formula (5a):

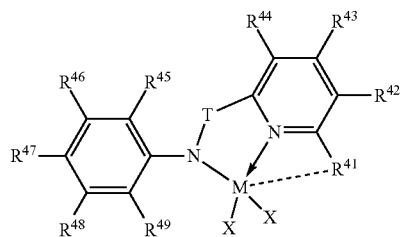

wherein M, T, N and X are as previously defined as in formula (5); each $R^{41}$, $R^{42}$, $R^{43}$, and $R^{44}$ are independently hydrogen, halo, or an alkyl, cycloalkyl, heteroalkyl, heterocycloalkyl, aryl or silyl group, or one or more adjacent $R^{41}$-$R^{44}$ may be joined together to form a fused ring derivative; $R^{45}$-$R^{49}$ are independently hydrogen, or $C_1$-$C_{10}$ alkyl, most preferably $R^{45}$ and $R^{49}$ are alkyl such as isopropyl or tert-butyl; T is preferably $CR'^{50}R'^{51}$ where $R'^{50}$ and $R'^{51}$ are independently hydrogen, halogen, a $C_1$-$C_{20}$ hydrocarbyl, most preferably, one of $R'^{50}$ and $R'^{51}$ is hydrogen and the other is a $C_6$-$C_{20}$ aryl group, especially 2-isopropyl, phenyl or a fused polycyclic aryl group, most preferably anthracenyl; and bonds, optional bonds and dative bonds are represented by lines, dotted lines and arrows, respectively.

4. A catalyst system comprising an activator; a metal hydrocarbenyl chain transfer agent, preferably an aluminum vinyl-transfer agent; and a transition metal complex represented by the formula (6):

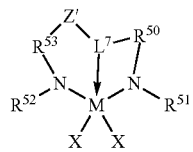

wherein (1) M is a group 4 metal, preferably hafnium; (2) N is nitrogen; (3) $L^7$ is a group that links $R^{50}$ to Z' by a three atom bridge with the central of the three atoms being a group 15 or 16 element that preferably forms a dative bond to M, and is a $C_5$-$C_{20}$ heteroaryl group containing a Lewis base functionality, especially a divalent pyridinyl or substituted pyridinyl group; (4) Z' is a divalent linker group, $(R^{56})_pC$—$C(R^{57})_q$, where $R^{56}$ and $R^{57}$ are independently selected from the group consisting of hydrogen, hydrocarbyls, substituted hydrocarbyls, and wherein adjacent $R^{56}$ and $R^{57}$ groups may be joined to form an aromatic or saturated, substituted or unsubstituted hydrocarbyl ring, wherein the ring has 5, 6, 7 or 8 ring carbon atoms and where the substituents on the ring can join to form additional rings, and p is 1 or 2 and q is 1 or 2; (5) $R^{50}$ and $R^{53}$ are each, independently, $ER^{54}R^{55}$ with E being carbon, silicon or germanium, and each $R^{54}$ and $R^{55}$ being independently selected from the group consisting of hydrogen, hydrocarbyls, substituted hydrocarbyls, alkoxy, silyl, amino, aryloxy, halogen and phosphino, and $R^{54}$ and $R^{55}$ may be joined to form a saturated heterocyclic ring, or a saturated substituted heterocyclic ring where substitutions on the ring can join to form additional rings; (6) $R^{51}$ and $R^{52}$ are independently selected from the group consisting of hydrocarbyls, substituted hydrocarbyls, silylcarbyls and substituted silylcarbyl groups; and (7) each X is independently a univalent anionic ligand, or two Xs are joined and bound to the metal atom to form a metallocycle ring, or two Xs are joined to form a chelating ligand, a diene ligand, or an alkylidene ligand.

5. A catalyst system comprising a pyridyldiamido transition metal complex represented by the formula:

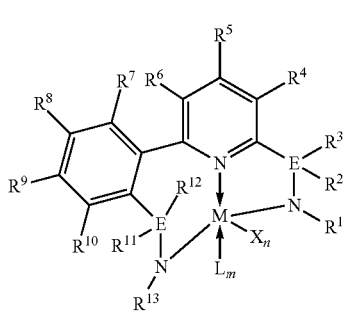

(I)

wherein:
M is a Group 3, 4, 5, 6, 7, 8, 9, 10, 11, or 12 metal;
E is selected from carbon, silicon, or germanium;
X is an anionic group;
L is a neutral Lewis base;
$R^1$ and $R^{13}$ are each independently selected from the group consisting of hydrocarbyls, substituted hydrocarbyls, and silyl groups;
$R^2$ through $R^{12}$ are each independently selected from the group consisting of hydrogen, hydrocarbyls, alkoxy, silyl, amino, aryloxy, substituted hydrocarbyls, halogen, and phosphino;
n is 1 or 2;
m is 0, 1, or 2; and
two X groups may be joined together to form a dianionic group;
two L groups may be joined together to form a bidentate Lewis base;
an X group may be joined to an L group to form a monoanionic bidentate group;

R⁷ and R⁸ may be joined to form a ring;
R¹⁰ and R¹¹ may be joined to form a ring;
an activator; and
a metal hydrocarbenyl chain transfer agent, preferably an aluminum vinyl-transfer agent.

6. The catalyst system of any of paragraphs 1 to 5, wherein M is Ti, Zr, or Hf.

7. The catalyst system of any of paragraphs 1 to 6, wherein E is carbon.

8. The catalyst system of any of paragraphs 1 to 7, wherein X or X* is an alkyl, aryl, hydride, alkylsilane, fluoride, chloride, bromide, iodide, triflate, carboxylate, or alkylsulfonate.

9. The catalyst system of paragraph 5, wherein L is an ether, amine, or thioether.

10. The catalyst system of any of paragraphs 1 through 9, wherein the activator comprises an alumoxane.

11. The catalyst system of any of paragraphs 1 through 10, wherein the activator comprises a non-coordinating anion.

12. The catalyst system of paragraph 11, wherein the activator comprises one or more of: trimethylammonium tetrakis(perfluoronaphthyl)borate, N,N-dimethylanilinium tetrakis(perfluoronaphthyl)borate, N,N-diethylanilinium tetrakis(perfluoronaphthyl)borate, triphenylcarbenium tetrakis(perfluoronaphthyl)borate, trimethylammonium tetrakis(perfluorobiphenyl)borate, N,N-dimethylanilinium tetrakis(perfluorobiphenyl)borate, triphenylcarbenium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Ph_3C^+][B(C_6F_5)_4^-]$, $[Me_3NH^+][B(C_6F_5)_4^-]$, 1-(4-(tris(pentafluorophenyl)borate)-2,3,5,6-tetrafluorophenyl)pyrrolidinium, tetrakis(pentafluorophenyl)borate, 4-(tris(pentafluorophenyl)borate)-2,3,5,6-tetrafluoropyridine, triphenylcarbenium tetraphenylborate, and triphenylcarbenium tetrakis-(2,3,4,6-tetrafluorophenyl)borate.

13. The catalyst system of any of paragraphs 1 through 11, wherein the metal hydrocarbenyl chain transfer agent is represented by the formula: $E[Al(R')_{2-y}(R'')_y]_2$ and the aluminum vinyl-transfer agent is represented by the formula: $Al(R')_{3-v}(R'')_v$; wherein each R', independently, is a $C_1$ to $C_{30}$ hydrocarbyl group; each R'', independently, is a $C_4$ to $C_{20}$ hydrocarbenyl group, having an end-vinyl group; E is a group 16 element; v is from 0.01 to 3 (preferably 0.1 to 3); and y is from 0.01 to 2.

14. The catalyst system of paragraph 13, wherein R'' is butenyl, pentenyl, heptenyl, or octenyl and or wherein R' is methyl, ethyl, propyl, isobutyl, or butyl.

15. The catalyst system of any of paragraphs 1 to 14, wherein the aluminum vinyl transfer agent comprises one or more of tri(but-3-en-1-yl)aluminum, tri(pent-4-en-1-yl)aluminum, tri(oct-7-en-1-yl)aluminum, tri(non-8-en-1-yl)aluminum, tri(dec-9-en-1-yl)aluminum, dimethyl(oct-7-en-1-yl)aluminum, diethyl(oct-7-en-1-yl)aluminum, dibutyl(oct-7-en-1-yl)aluminum, diisobutyl(oct-7-en-1-yl)aluminum, diisobutyl(non-8-en-1-yl)aluminum, diisobutyl(dec-8-en-1-yl)aluminum, and diisobutyl(dodec-10-en-1-yl)aluminum.

16. The catalyst system of any of paragraphs 13 through 15, wherein v=2.

17. A polymerization process comprising contacting one or more alkene monomers with the catalyst system of any of paragraphs 1 to 16.

18. The process of paragraph 17, wherein the activator comprises an alumoxane.

19. The process of paragraph 17 or 18, wherein the activator comprises a non-coordinating anion.

20. The process of paragraph 17, 18, or 19 wherein the monomer comprises ethylene or propylene.

21. The process of any of paragraphs 17 to 20, wherein the monomers comprise at least two of ethylene, propylene, and an alkyl diene.

22. The process of any of paragraphs 17 through 21, wherein the pyridyldiamido transition metal complex is supported.

23. The process of paragraph 22, wherein the support is silica.

24. The process of any of paragraphs 17 through 23, wherein the metal hydrocarbenyl chain transfer agent is represented by the formula: $E[Al(R')_{2-y}(R'')_y]_2$ and the aluminum vinyl-transfer agent is represented by the formula: $Al(R')_{3-v}(R'')_v$; wherein E is a group 16 element; y is 2; R'' is butenyl, pentenyl, heptenyl, or octenyl, R' is methyl, ethyl, propyl, isobutyl, or butyl; and v=2.

25. The process of any of paragraphs 17 through 24, further comprising the step of adding a metallocene catalyst in a second step.

26. The process of paragraph 25, wherein the second step of the process is conducted in a second reactor.

27. The process of either paragraphs 25 or 26, wherein the steps are performed in a continuous stirred tank reactor.

28. The process of any of paragraphs 17 to 24 wherein the transition metal complex is not a metallocene.

29. The polymerization process of any of paragraphs 17 to 28 wherein 1) the residence time is less than 10 minutes and/or the catalyst complex-to-aluminum vinyl transfer agent molar ratio is 1:50 or more, and 2) a polyolefin having allyl chain ends and a g'vis of 0.95 or more is obtained.

30. The polymerization process of any of paragraphs 17 to 28 wherein 1) the residence time is 10 minutes or more and/or the catalyst complex-to-aluminum vinyl transfer agent molar ratio is 1:50 or less, and 2) a polyolefin having a g'vis of 0.95 or less is obtained.

31. The polymerization process of any of paragraphs 17 to 28 wherein a polyolefin having allyl chain ends, and optionally a g'vis of 0.95 or more, is produced and wherein the moles of metal hydrocarbenyl chain transfer agent added to the reactor relative to the amount of polymer produced is 500,000 or more.

32. The polymerization process of any of paragraphs 17 to 28 wherein a polyolefin having having a g'vis of 0.95 or less is produced and wherein the moles of metal hydrocarbenyl chain transfer agent added to the reactor relative to the amount of polymer produced is less than 500,000.

EXPERIMENTAL

All manipulations were performed under an inert atmosphere using glove box techniques unless otherwise stated. Benzene-$d_6$ (Cambridge Isotopes) (Sigma Aldrich) was degassed and dried over 3 Å molecular sieves prior to use.

Diisobutylaluminum hydride (DIBAL-H) was purchased from Akzo Nobel Surface Chemistry LLC and used as received. Triisobutyl aluminum (TIBAL) was purchased from Akzo Nobel and was used as received. 1,7-octadiene were purchased from Sigma Aldrich and purified by the following procedure prior to use. The diene was purged under nitrogen for 30 minutes and then this was stored over 3 Å molecular sieves for overnight. Further this was stirred with NaK (sodium-potassium alloy) for overnight and then filtered through basic alumina column prior to use.

Preparation of 7-octenyldiisobutylaluminum (AVTA1)

Diisobutylaluminum hydride (8.54 g, 60 mmol) was added to 1,7-octadiene (39.7 g, 360 mmol) in a round bottomed flask. The mixture was heated to 50° C. for 16 hours. The volatiles were evaporated under a stream of nitrogen. Further removal of volatiles was done under reduced pressure. The product was isolated as a colorless oil. Yield 13.2 g. Evaluation of $^1$H-NMR spectroscopic data indicated a molar ratio of 1.8:1.2:1.1 for Al-$^i$Bu, Al—CH$_2$(CH$_2$)$_n$—, and vinyl groups, respectively. This indicates an approximate average composition of Al($^i$Bu)$_{1.8}$(oct-7-en-1-yl)$_{1.2}$. $^1$H NMR (Ds-toluene, 400 MHz): δ 5.78 (m, 1.05H, vinyl), 4.99 (m, 2.1H, vinyl), 1.9-2.03 (m, 3.9H), 1.55 (m, 2.4H), 1.34 (m, 6.9H), 1.04 (d, 10.6H), 0.49 (m, 2.37H, Al—CH$_2$(octenyl group)), 0.25 (3.63H, Al—CH$_2$(isobutyl group)).

Preparation of tri(oct-7-en-1-yl)aluminum (AVTA2)

The preparation was performed using the procedure described by Shiono and co-workers in JP2004-83772-A. $^1$H-NMR spectroscopic analysis indicated that the organoaluminum product was not pure tri(oct-7-en-1-yl)aluminum, but instead a mixture with an average composition of Al($^i$Bu)$_{0.45}$(oct-7-en-1-yl)$_{2.55}$. The ratio of octenyl to isobutyl groups is expected to be a function of reaction temperature, pressure, and time. The product was used as the isolated mixture.

Preparation of Al($^i$Bu)$_{0.73}$(oct-7-en-1-yl)$_{2.27}$ (AVTA3)

Triisobutylaluminum (6.02 g, 30.3 mmol) and 1,7-octadiene (66.9 g, 607 mmol) were combined in a thick walled glass bottle. This was sealed and the stirred mixture was heated in an oil bath to 150° C. After 15 minutes the flask was removed from the oil bath and allowed to cool to ambient temperature. The volatiles were removed by vacuum distillation at ambient temperature. $^1$H NMR spectroscopy of the crude product indicated an average composition of Al($^i$Bu)$_{0.80}$(octen-7-en-1-yl)$_{2.20}$ with 0.095 molar equivalents of byproduct CH$_2$=CH(CH$_2$)$_6$C(=CH$_2$)(CH$_2$)$_4$CH=CH$_2$. This mixture was subjected to further vacuum distillation at 70-90° C. for an hour using a Kugelrohr distillation apparatus in an attempt to remove the byproduct triene. $^1$H NMR spectroscopy of the remaining product indicated an average composition of Al($^i$Bu)$_{0.73}$(octen-7-en-1-yl)$_{2.27}$ with 0.067 molar equivalents of byproduct CH$_2$=CH(CH$_2$)$_6$C(=CH$_2$)(CH$_2$)$_4$CH=CH$_2$ remaining. Isolated yield ~6 g. $^1$H NMR (D$_8$-toluene, 400 MHz): δ 5.78 (m, 2.30H, vinyls), 4.99 (m, 4.78H, vinyls), 4.82 (m, 0.13H, vinylidene of byproduct triene), 1.9-2.1 (m, 5.88H), 1.2-1.8 (m, 22.81H), 1.10 (d, 2.37H), 0.45-0.60 (m, 4.50H, Al—CH$_2$(octenyl group)), 0.30 (d, 1.44H, Al—CH$_2$(isobutyl group)).

Preparation of Diisobutyl(oct-7-en-1-yl) aluminum, $^i$Bu$_2$Al(Oct=) (AVTA4)

A neat 1,7-octadiene (16.53 g, 150 mmol) was added drop wise to DIBAL-H (3.56 g, 25 mmol) at room temperature over a period of 5 minutes. The reaction mixture was either stirred at 45° C. for overnight or refluxed at 110° C. for 1 hour to form the title compound, as indicated below. The excess 1,7-octadiene from the reaction mixture was removed under the flow of dry nitrogen at room temperature. The residual 1,7-octadiene was then removed in vacuo for 30 min to obtain a colorless viscous oil of AVTA4 (5.713 g, 91%). The product formation was confirmed by $^1$H NMR spectroscopy and based on the relative integration the molecular formula was assigned as (C$_4$H$_9$)$_{2.1}$Al(C$_8$H$_{15}$)$_{0.9}$. $^1$H NMR (400 MHz, benzene-d$_6$): δ=5.78 (m, 1H, =CH), 5.01 (m, 2H, =CH$_2$), 1.95 (m, 4H, —CH$_2$), 1.54 (m, 2H, $^i$Bu-CH), 1.34 (m, 6H, —CH$_2$), 1.04 (d, 12H, $^i$Bu-CH$_3$), 0.49 (t, 2H, Al—CH$_2$), 0.27 (d, 4H, $^i$Bu-CH$_2$) ppm.

Preparation of Isobutyldi(oct-7-en-1-yl)aluminum, $^i$BuAl(Oct=)$_2$ (AVTA5)

A neat 1,7-octadiene (9.00 g, 81.8 mmol) was added drop wise to DIBAL-H (0.81 g, 7.2 mmol) at room temperature over 5 minutes. The resulting mixture was stirred under reflux at 110° C. for 60 minutes and then continuously stirred at 70° C. overnight. The excess 1,7-octadiene from the reaction mixture was removed under the flow of dry nitrogen at room temperature. The residual 1,7-octadiene was then removed in vacuo for 30 minutes to obtain a colorless viscous oil of AVTA5 (1.689 g, 79%). The product formation was confirmed by $^1$H NMR and based on the relative integration the molecular formula of was assigned as (C$_4$H$_9$)$_{1.15}$Al(C$_8$H$_5$)$_{1.85}$. $^1$H NMR (400 MHz, benzene-d$_6$): δ=5.81 (m, 2H, =CH), 5.05 (m, 4H, =CH$_2$), 2.03 (m, 8H, —CH$_2$), 1.59 (m, 1H, $^i$Bu-CH), 1.38 (m, 12H, —CH$_2$), 1.09 (d, 6H, $^i$Bu-CH$_3$), 0.51 (t, 4H, Al—CH$_2$), 0.31 (d, 2H, $^i$Bu-CH$_2$) ppm.

Preparation of Isobutyldi(oct-7-en-1-yl)aluminum, $^i$BuAl(Oct=)$_2$ (AVTA6)

A neat 1,7-octadiene (22.91 g, 207.92 mmol) was added drop wise to DIBAL-H (2.612 g, 18.4 mmol) at room temperature over 5 minutes. The resulting mixture was stirred under reflux at 110° C. for 60 minutes and then continuously stirred at 70° C. overnight. The excess 1,7-octadiene from the reaction mixture was removed under the flow of dry nitrogen at room temperature. The residual 1,7-octadiene was then removed in vacuo for 30 minutes to obtain a colorless viscous oil of AVTA6 (5.530 g, 97%). The product formation was confirmed by $^1$H NMR and based on the relative integration the molecular formula of was assigned as (C$_4$H$_9$)$_{0.95}$Al(C$_8$H$_{15}$)$_{2.05}$. $^1$H NMR (400 MHz, benzene-d$_6$): δ=5.81 (m, 2H, =CH), 5.05 (m, 4H, =CH$_2$), 2.03 (m, 8H, —CH$_2$), 1.59 (m, 1H, $^i$Bu-CH), 1.38 (m, 12H, —CH$_2$), 1.09 (d, 6H, $^i$Bu-CH$_3$), 0.51 (t, 4H, Al—CH$_2$), 0.31 (d, 2H, $^i$Bu-CH$_2$) ppm.

Figure 2:
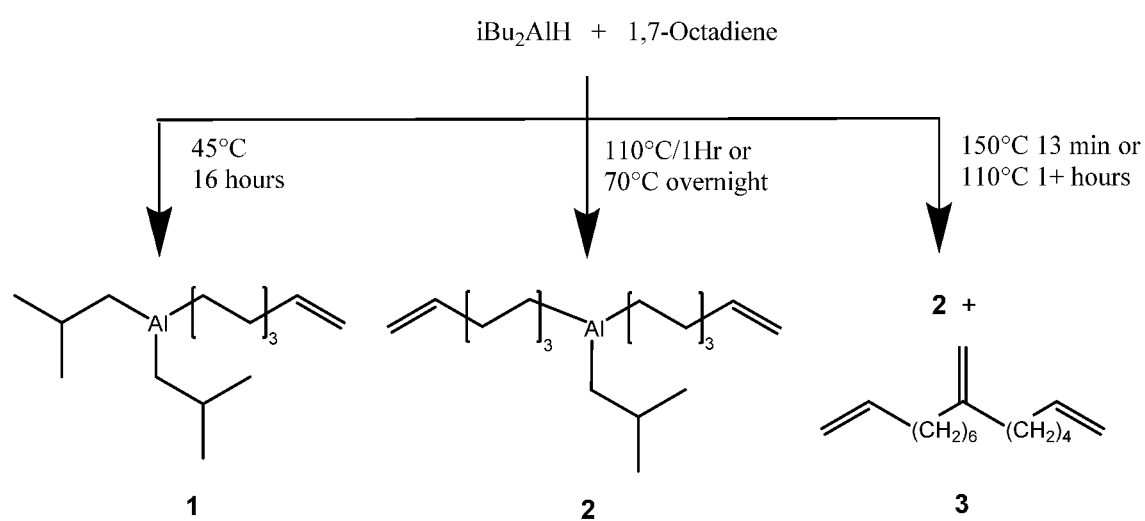
FIG. 2 is a drawing of a selection of species produced in the Experimental Section.

General considerations in the synthesis of AVTA's. Reaction of DIBAL-H with 1,7-octadiene (as shown in FIG. 2) under mild conditions produces the mono-alkenyl aluminum complex 1 (like AVTA4) without the formation of triene side product, 3. More robust reaction conditions were required to form the di-alkenyl aluminum complex 2 (like AVTA5), and care was taken to exclude the formation of the triene, 3. Intermediate temperatures such at 70° C. for overnight or 110° C. for 1 hr produced the di-alkenyl aluminum complex 2, without formation of the triene. Higher temperatures or prolonged heating at intermediate temperatures resulted in the formation of the triene.

Complex 3 was prepared as described in U.S. Pat. No. 9,290,519.

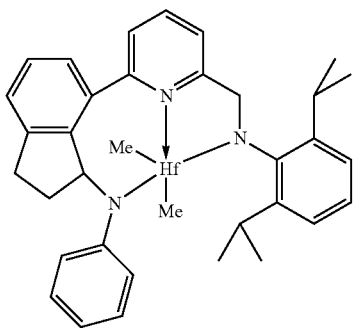

complex 3

Complexes 1, 2, and 4 are used for comparative purposes.

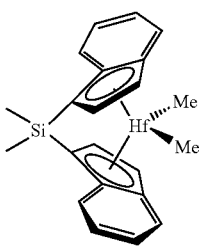

complex 1

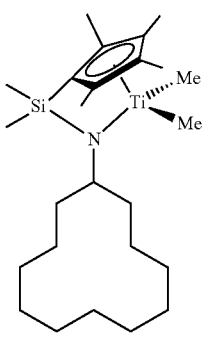

complex 2

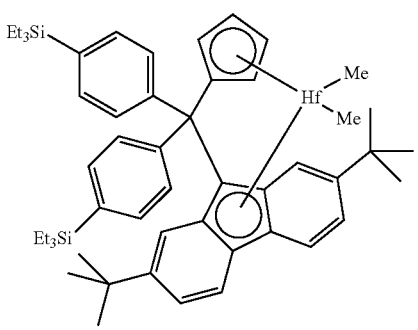

complex 4

Polymerization Examples

Solutions of the pre-catalysts (complexes 1-4) were made using toluene (ExxonMobil Chemical—anhydrous, stored under N2) (98%). Pre-catalyst solutions were typically 0.5 mmol/L.

Solvents, polymerization grade toluene and/or isohexanes were supplied by ExxonMobil Chemical Co. and are purified by passing through a series of columns: two 500 cc Oxyclear cylinders in series from Labclear (Oakland, Calif.), followed by two 500 cc columns in series packed with dried 3 Å mole sieves (8-12 mesh; Aldrich Chemical Company), and two 500 cc columns in series packed with dried 5 Å mole sieves (8-12 mesh; Aldrich Chemical Company).

1-octene (C8; 98%, Aldrich Chemical Company) was dried by stirring over NaK overnight followed by filtration through basic alumina (Aldrich Chemical Company, Brockman Basic 1).

Polymerization grade ethylene (C2) was used and further purified by passing it through a series of columns: 500 cc Oxyclear cylinder from Labclear (Oakland, Calif.) followed by a 500 cc column packed with dried 3 Å mole sieves (8-12 mesh; Aldrich Chemical Company), and a 500 cc column packed with dried 5 Å mole sieves (8-12 mesh; Aldrich Chemical Company).

Polymerization grade propylene (C3) was used and further purified by passing it through a series of columns: 2250 cc Oxiclear cylinder from Labclear followed by a 2250 cc column packed with 3 Å mole sieves (8-12 mesh; Aldrich Chemical Company), then two 500 cc columns in series packed with 5 Å mole sieves (8-12 mesh; Aldrich Chemical Company), then a 500 cc column packed with Selexsorb CD (BASF), and finally a 500 cc column packed with Selexsorb COS (BASF).

For polymerization runs collected in Tables 5 and 8, bis(diisobutylaluminum)oxide (DiBAl-O, AkzoNobel 0.92M in hexane) was used as a scavenger prior to introduction of the AVTA, activator and pre-catalyst into the reactor. Scavenger was typically used as a 5 mmol/L solution in toluene.

Tri-n-octyl aluminum (TnOAl, neat, AkzoNobel) was used as a comparative to the AVTA's in Tables 5 and 8 and was typically used as a 5 or 10 mmol/L solution in toluene. The AVTA's were typically also used as a 5 or 10 mmol/L solution in toluene. AVTA # in Tables 5 and 8, corresponds to the AVTA's prepared in the examples above.

Reactor Description and Preparation:

Polymerizations were conducted in an inert atmosphere ($N_2$) drybox using autoclaves equipped with an external heater for temperature control, glass inserts (internal volume of reactor=23.5 mL for C2 and C2/C8; 22.5 mL C2/C3 runs), septum inlets, regulated supply of nitrogen, ethylene and propylene, and equipped with disposable PEEK mechanical stirrers (800 RPM). The autoclaves were prepared by purging with dry nitrogen at 110° C. or 115° C. for 5 hours and then at 25° C. for 5 hours.

Ethylene Polymerization (PE) or Ethylene/1-octene Copolymerization (EO):

The reactor was prepared as described above, and then purged with ethylene. Isohexanes, 1-octene (50 µL when used in experiments in Table 5 and 100 uL in experiments in Table 1), and additional DiBAl-O scavenger (0.05 umol, used in experiments in Table 5 only) were added via syringe at room temperature and atmospheric pressure. The reactor was then brought to process temperature (values indicated below) and charged with ethylene to process pressure (100 psig=790.8 kPa for experiments in Table 5 and 50 psig=446 kPa for experiments in Table 1) while stirring at 800 RPM. The AVTA solution (or control TnOAl solution for experiments in Tables 5) was injected via syringe to the reactor at process conditions. Next, the activator solution, followed by the pre-catalyst solution, was injected via syringe to the reactor at process conditions. Ethylene was allowed to enter (through the use of computer controlled solenoid valves) the autoclaves during polymerization to maintain reactor gauge pressure (+/−2 psig). Reactor temperature was monitored and typically maintained within +/−1° C. Polymerizations were halted by addition of approximately 50 psi $P_2$/Ar (5 mole % $O_2$) gas mixture to the autoclave for approximately 30 seconds. The polymerizations were quenched after a predetermined cumulative amount of ethylene had been added (maximum quench value in psid) or for a maximum of 30 minutes polymerization time. Afterwards, the reactors were cooled and vented. Polymers were isolated after the solvent was removed in-vacuo. Yields reported include total weight of polymer and residual catalyst. Catalyst activity is reported as grams of polymer per mmol transition metal compound per hour of reaction time (g/mmol*hr). Ethylene homopolymerization runs and ethylene/1-octene copolymerization runs are summarized in Tables 1 and 5. Additional reaction details can be found above Tables 1 and 5.

Ethylene-Propylene Copolymerization (EP):

The reactor was prepared as described above, then heated to 40° C. and then purged with ethylene gas at atmospheric pressure. Ethylene was then added at 125 psid (790.8 kPa) to the reactor. Isohexanes and scavenger (DiBAl-O, 0.5 µmol) were added via syringe. The stirrers were then started and maintained at 800 RPM. Liquid propylene (0.5 ml) was then injected into the reactor. The reactor was then brought to process temperature (100° C.). The AVTA or control TnOAl solutions were next injected into the reactor at process temperature. Next, the activator solution, followed by the pre-catalyst solution, was injected via syringe to the reactor at process conditions. Reactor temperature was monitored and typically maintained within +/−1° C. Polymerizations were halted by addition of approximately 50 psi 02/Ar (5 mole % 02) gas mixture to the autoclaves for approximately 30 seconds. The polymerizations were quenched based on a predetermined pressure loss (quench value) of approximately 4 psid pressure loss or for a maximum of 30 minutes polymerization time. The reactors were cooled and vented. The polymer was isolated after the solvent was removed in-vacuo. The quench times are reported in Table 8 for each run. Yields reported include total weight of polymer and residual catalyst. Catalyst activity is reported as grams of polymer per mmol transition metal compound per hour of reaction time (g/mmol·hr). Ethylene/propylene copolymerization examples are collected in Table 8 and additional information is located above the table.

Polymer Characterization

For analytical testing, polymer sample solutions were prepared by dissolving polymer in 1,2,4-trichlorobenzene (TCB, 99+% purity from Sigma-Aldrich) containing 2,6-di-tert-butyl-4-methylphenol (BHT, 99% from Aldrich) at 165° C. in a shaker oven for approximately 3 hours. The typical concentration of polymer in solution was between 0.1 to 0.9 mg/mL with a BHT concentration of 1.25 mg BHT/mL of TCB. Samples were cooled to 135° C. for testing.

High temperature size exclusion chromatography was performed using an automated "Rapid GPC" system as described in U.S. Pat. Nos. 6,491,816; 6,491,823; 6,475,391; 6,461,515; 6,436,292; 6,406,632; 6,175,409; 6,454,947; 6,260,407; and 6,294,388; each of which is incorporated herein by reference. Molecular weights (weight average molecular weight (Mw) and number average molecular weight (Mn)) and molecular weight distribution (MWD=Mw/Mn), which is also sometimes referred to as the polydispersity (PDI) of the polymer, were measured by Gel Permeation Chromatography using a Symyx Technology GPC equipped with dual wavelength infrared detector and calibrated using polystyrene standards (Polymer Laboratories: Polystyrene Calibration Kit S-M-10: Mp (peak Mw) between 580 and 3,039,000). Samples (250 µL of a polymer solution in TCB were injected into the system) were run at an eluent flow rate of 2.0 mL/minute (135° C. sample temperatures, 165° C. oven/columns) using three Polymer Laboratories: PLgel 10 µm Mixed-B 300×7.5 mm columns in series. No column spreading corrections were employed. Numerical analyses were performed using Epoch® software available from Symyx Technologies or Automation Studio software available from Freeslate. The molecular weights obtained are relative to linear polystyrene standards. Molecular weight data is reported in Tables 1, 5 and 8 under the headings Mn, Mw and PDI (or Mw/Mn) as defined above.

Differential Scanning Calorimetry (DSC) measurements were performed on a TA-Q100 instrument to determine the melting point of the polymers. Samples were pre-annealed at 220° C. for 15 minutes and then allowed to cool to room temperature overnight. The samples were then heated to 220° C. at a rate of 100° C./minute and then cooled at a rate of 50° C./minute. Melting points were collected during the heating period. The results are reported in the Tables 5 and 8 under the heading, Tm (° C.).

Samples for infrared analysis were prepared by depositing the stabilized polymer solution onto a silanized wafer (Part number S10860, Symyx). By this method, approximately between 0.12 and 0.24 mg of polymer is deposited on the wafer cell. The samples were subsequently analyzed on a Brucker Equinox 55 FTIR spectrometer equipped with Pikes' MappIR specular reflectance sample accessory. Spectra, covering a spectral range of 5000 $cm^{-1}$ to 500 $cm^{-1}$, were collected at a 2 $cm^{-1}$ resolution with 32 scans.

For ethylene-1-octene copolymers, the wt % octene in the copolymer was determined via measurement of the methyl deformation band at ~1375 $cm^{-1}$. The peak height of this band was normalized by the combination and overtone band at ~4321 $cm^{-1}$, which corrects for path length differences. The normalized peak height was correlated to individual calibration curves from $^1$H NMR data to predict the wt % octene content within a concentration range of ~2 to 35 wt % for octene. Typically, $R^2$ correlations of 0.98 or greater are achieved. These numbers are reported in Table 5 under the heading C8 wt %).

Unless otherwise indicated, proton NMR spectra are collected using a 400 MHz Varian pulsed fourier transform NMR spectrometer equipped with a variable temperature proton detection probe operating at 120° C. The polymer sample is dissolved in 1,1,2,2-tetrachloroethane-d2 (TCE-d2) and transferred into a 5 mm glass NMR tube. Typical acquisition parameters are sweep width=10 KHz, pulse width=30 degrees, acquisition time=2 s, acquisition delay=5 s and number of scans=120. Chemical shifts are determined relative to the TCE-d2 signal which is set to 5.98 ppm.

The chain end unsaturations are determined as follows. The vinyl resonances of interest are between from about 5.0 to 5.1 ppm (VRA), the vinylidene resonances between from about 4.65 to 4.85 ppm (VDRA), the vinylene resonances from about 5.31 to 5.55 ppm (VYRA), the tri-substituted unsaturated species from about 5.11 to 5.30 ppm (TSRA) and the aliphatic region of interest between from about 0 to 2.1 ppm (IA). The number of vinyl groups/1000 Carbons is determined from the formula: (VRA*500)/((IA+VRA+VYRA+VDRA)/2)+TSRA). Likewise, the number of vinylidene groups/1000 Carbons is determined from the formula: (VDRA*500)/((IA+VRA+VYRA+VDRA)/2)+TSRA), the number of vinylene groups/1000 Carbons from the formula (VYRA*500)/((IA+VRA+VYRA+VDRA)/2)+TSRA) and the number of tri-substituted groups from the formula (TSRA*1000)/((IA+VRA+VYRA+VDRA)/2)+TSRA). VRA, VDRA, VYRA, TSRA and IA are the integrated normalized signal intensities in the chemical shift regions defined above. Proton NMR data is reported in Tables 1, 6 and 9. For many examples, end-group unsaturation was below the detection limit, or noise level, and could not be determined.

GPC3D data is reported in Tables 4, 7 and 10 and is described below after the small scale polymerization experiments.

For the polymerization results collected in Tables 5-10 below, "Ex #" stands for example number. Under the Ex # column heading, the following abbreviations are defined: PE=polyethylene, EO=ethylene-1-octene copolymer, and EP=ethylene-propylene copolymer, T(° C.) is the polymerization temperature which was typically maintained within +/−1° C. "Yield" is polymer yield, and is not corrected for catalyst residue. "Quench time (s)" is the actual duration of the polymerization run in seconds. "Quench Value (psid)" for ethylene based polymerization runs (no propylene) is the set maximum amount of ethylene uptake (conversion) for the experiment. If a polymerization quench time is less than the maximum time set, then the polymerization ran until the set maximum value of ethylene uptake was reached. For ethylene-propylene copolymerization runs, quench value indicates the maximum set pressure loss (conversion) of ethylene and propylene combined during the polymerization. Activity is reported at grams polymer per mmol of catalyst per hour.

High-Throughput Ethylene-Octene Copolymerization.

The copolymerization of ethylene and 1-octene using four different catalyst systems in the presence of ATVA1 was performed using the parallel polymerization reactor. Specifics of run conditions are collected in Table 1 and in the description below Characterization data for the polymers produced are shown in Tables 1 and 3. Four different complexes were evaluated, with complex 3 being inventive. The catalyst formed by the activation of complex 3 was found to readily undergo chain transfer with AVTA1 under the conditions explored. This is best observed in the plot of 100,000/Mn vs nmols of AVTA1 (FIG. 1). In this plot it is seen that the runs performed using complex 3 (runs 9-12) demonstrate an inverse relationship between number average molecular weight and the amount of AVTA1 added. The runs performed using complexes 1, 2, and 4 do not demonstrate a dependence of molecular weight on the amount of AVTA1 used (runs 1-8 and 13-15), so are less effective at transferring the octenyl group (or other alkyl groups) from the AVTA1 to a growing polymer chain. $^1$H-NMR spectroscopic analysis of the polymer from runs 9, 10, 11 and 12 indicate the presence of 0.02, 0.06. 0.20 and 0.41 vinyls/1000 carbon atoms, respectively (Table 3). This provides additional evidence that the octenyl group is being transferred from the added AVTA1 to the polymer chains (via the catalyst formed from complex 3).

TABLE 1

High-throughput copolymerization of ethylene and 1-octene. Conditions: 80° C., 5 mL volume, 0.1 mL 1-octene, 50 psi ethylene, isohexane solvent, 20 nmol complex, 20 nmol [PhNMe$_2$H]B(C$_6$F$_5$)$_4$ activator. Reaction was quenched after 18 psi of ethylene uptake.

| run | complex | AVTA1 (nmol) | time (s) | yield (mg) | Rapid GPC Mw (g/mol) | Rapid GPC Mn (g/mol) | Mw/Mn |
|---|---|---|---|---|---|---|---|
| 1* | 1 | 500 | 36 | 80 | 231553 | 91702 | 2.5 |
| 2* | 1 | 1000 | 45 | 74 | 285113 | 139647 | 2.0 |
| 3* | 1 | 2000 | 64 | 69 | 328360 | 158189 | 2.1 |
| 4* | 1 | 4000 | 78 | 57 | 331039 | 159898 | 2.1 |
| 5* | 2 | 500 | 63 | 92 | 390539 | 146644 | 2.7 |
| 6* | 2 | 1000 | 62 | 91 | 407889 | 181015 | 2.3 |
| 7* | 2 | 2000 | 58 | 82 | 442646 | 202590 | 2.2 |
| 8* | 2 | 4000 | 96 | 71 | 443012 | 197328 | 2.2 |
| 9 | 3 | 500 | 33 | 75 | 260282 | 157236 | 1.7 |
| 10 | 3 | 1000 | 27 | 69 | 126433 | 81244 | 1.6 |
| 11 | 3 | 2000 | 28 | 58 | 66661 | 40379 | 1.7 |
| 12 | 3 | 4000 | 30 | 55 | 32547 | 19279 | 1.7 |
| 13* | 4 | 500 | 118 | 88 | 1228247 | 623589 | 2.0 |
| 14* | 4 | 1000 | 133 | 89 | 1276615 | 514084 | 2.5 |
| 15* | 4 | 2000 | 125 | 85 | 1534274 | 734052 | 2.1 |

*denotes data for comparative purposes

Small Scale Batch Polymerizations.

Olefin polymerizations were performed in a thick walled glass reactor. Details of polymerization conditions and the products formed are described in Tables 2, 3, and 4. All solvents, reactants, and gases were purified by passing through multiple columns containing 3 angstrom molecular sieves and oxygen scavenger. Typically, the solvent was added to the reactor and the reactor was allowed to equilibrate to the targeted temperature. Then, optional comonomer was added followed by optional scavenger and AVTA2. Then N,N-dimethylanilinium tetrakis(pentafluorophenyl) borate activator (1.1 molar equivalents relative to transition metal complex) was added as a toluene solution followed by a toluene solution of the transition metal complex. Immediately, the reactor was pressurized with ethylene to the desired pressure and the mixture was rapidly stirred. At the indicated time the pressure was vented and the polymer solution was poured into a large excess of acidic methanol (typically a 80:1 mixture of methanol and concentrated hydrochloric acid, by volumes) to precipitate the polymer product. The resulting solid was collected by filtration and washed thoroughly with water and methanol before being dried in a vacuum oven at 60° C.

TABLE 2

Polymerization Conditions and Results.

| Run | complex | complex (nmol) | 1-hexene (mL) | ethylene (psi) | toluene (mL) | AVTA2 (mmol) | $T_{polym}$ (° C.) | time (min) | yield (g) |
|---|---|---|---|---|---|---|---|---|---|
| 196 | 3 | 1500 | 0 | 50 | 75 | 0.18 | 90 | 10 | 2.5 |
| 197 | 3 | 1500 | 0 | 35 | 100 | 0.12 | 90 | 30 | 2.6 |
| 198 | 3 | 1500 | 0 | 50 | 100 | 0.06 | 90 | 7 | 0.2 |

TABLE 3

Characterization of polymers produced.

| run | Me per 1000 C (HNMR) | vinyls per 1000 C (HNMR) | vinylenes per 1000 C (HNMR) | vinylidenes per 1000 C (HNMR) | trisubs per 1000 C (HNMR) |
|---|---|---|---|---|---|
| 9 | 39.8 | 0.02 | 0.00 | 0.00 | 0.00 |
| 10 | 32.1 | 0.06 | 0.00 | 0.01 | 0.01 |
| 11 | 27.1 | 0.20 | 0.01 | 0.00 | 0.02 |
| 12 | 28.5 | 0.41 | 0.00 | 0.00 | 0.00 |
| 196 | 2.7 | 0.50 | none det. | 0.08 | none det. |
| 197 | 1.6 | 0.41 | none det. | none det. | none det. |
| 198 | 1.8 | 0.78 | none det. | 0.10 | none det. |

TABLE 4

Characterization of polymers produced. GPC data are relative to linear PE.

| Run | Mn_LS (kg/mol) | Mw_LS (kg/mol) | Mz_LS (kg/mol) | g'vis | Mn_DRI (kg/mol) | Mw_DRI (kg/mol) | Mz_DRI (kg/mol) | Mw/Mn (DRI) |
|---|---|---|---|---|---|---|---|---|
| 196 | 10.0 | 28.6 | 390.5 | 0.87 | 11.2 | 26.4 | 68.8 | 2.4 |
| 197 | 18.6 | 46.8 | 381.9 | 0.98 | 17.7 | 41.8 | 115.2 | 2.4 |
| 198 | 17.0 | 37.5 | 205.2 | 0.99 | 14.0 | 37.2 | 95.9 | 2.7 |

TABLE 5

High throughput ethylene (PE) and ethylene-octene (EO) runs comparing tri-n-octyl aluminum (TNOAl) vs. AVTA's. Conditions: For all examples in Table 5, 0.025 umol of catalyst 3 was used and activated with 1.1 molar equivalents of dimethylanilinium tetrakis(pentafluorophenyl)borane. For all EO runs, 50 ul of 1-octene was added, and the total reagent and solvent volume in the reactor was 5 ml. All runs utilized 0.05 umol of bis(diisobutyl aluminum)oxide as scavenger. Ethylene (100 psid) was added before catalyst injection and was added to maintain reactor pressure. The run was quenched after 20 psi of ethylene uptake.

| Type of Run | AVTA or TnOAl | AVTA or TnOAl (umol) | AVTA/Cat or TnOAl/Cat (molar ratio) | Iso-hexane (uL) | Toluene (uL) | T (C.) | yield (g) | quench time (s) | Activity (g P/mmol cat · hr) | Rapid Mn | Rapid Mw | Rapid Mz | Rapid PDI | FTIR C8 (wt %) | Tm (° C.) |
|---|---|---|---|---|---|---|---|---|---|---|---|---|---|---|---|
| PE-1 | TnOAl | 0.05 | 2 | 4895 | 105 | 70 | 0.117 | 29 | 580,966 | 611,234 | 1,534,783 | 5,704,318 | 2.51 | | 137.0 |
| PE-2 | TnOAl | 0.05 | 2 | 4895 | 105 | 70 | 0.115 | 27 | 613,333 | 821,401 | 1,434,952 | 4,150,523 | 1.75 | | 137.1 |
| PE-3 | AVTA3 | 0.25 | 10 | 4845 | 155 | 70 | 0.114 | 20 | 820,800 | 723,037 | 2,178,739 | 5,414,428 | 3.01 | | 136.1 |
| PE-4 | AVTA3 | 0.25 | 10 | 4845 | 155 | 70 | 0.108 | 22 | 706,909 | 690,424 | 1,961,751 | 5,448,407 | 2.84 | | 136.1 |
| PE-5 | AVTA3 | 0.50 | 20 | 4795 | 205 | 70 | 0.103 | 74 | 200,432 | 365,061 | 995,570 | 4,396,542 | 2.73 | | 135.3 |
| PE-6 | AVTA3 | 0.50 | 20 | 4795 | 205 | 70 | 0.072 | 49 | 211,592 | 250,659 | 1,369,867 | 5,097,079 | 5.47 | | 134.9 |
| PE-7 | AVTA3 | 1.00 | 40 | 4695 | 305 | 70 | 0.103 | 30 | 494,400 | 150,570 | 417,288 | 1,427,135 | 2.77 | | 134.7 |
| PE-8 | AVTA3 | 1.00 | 40 | 4695 | 305 | 70 | 0.088 | 52 | 243,692 | 123,782 | 738,015 | 4,136,405 | 5.96 | | 134.7 |
| PE-9 | TnOAl | 0.05 | 2 | 4895 | 105 | 85 | 0.094 | 87 | 155,586 | 612,982 | 965,485 | 3,429,422 | 1.58 | | 137.2 |
| PE-10 | AVTA3 | 0.25 | 10 | 4845 | 155 | 85 | 0.086 | 38 | 325,895 | 639,484 | 1,228,787 | 3,486,337 | 1.92 | | 135.5 |
| PE-11 | AVTA3 | 0.25 | 10 | 4845 | 155 | 85 | 0.090 | 31 | 418,065 | 619,083 | 1,056,722 | 2,432,250 | 1.71 | | 134.8 |
| PE-12 | AVTA3 | 0.50 | 20 | 4795 | 205 | 85 | 0.088 | 56 | 226,224 | 299,624 | 598,659 | 1,736,395 | 2.00 | | 133.8 |
| PE-13 | AVTA3 | 0.50 | 20 | 4795 | 205 | 85 | 0.096 | 33 | 418,909 | 355,564 | 720,242 | 2,189,863 | 2.03 | | 133.9 |
| PE-14 | AVTA3 | 1.00 | 40 | 4695 | 305 | 85 | 0.080 | 26 | 443,077 | 106,172 | 159,543 | 334,736 | 1.50 | | 135.6 |
| PE-15 | AVTA3 | 1.00 | 40 | 4695 | 305 | 85 | 0.087 | 27 | 464,000 | 130,138 | 197,198 | 395,835 | 1.52 | | 134.1 |
| PE-16 | TnOAl | 0.05 | 2 | 4895 | 105 | 100 | 0.079 | 293 | 38,826 | 563,425 | 760,348 | 1,262,358 | 1.35 | | 136.8 |
| PE-17 | TnOAl | 0.05 | 2 | 4895 | 105 | 100 | 0.076 | 78 | 140,308 | 519,070 | 687,477 | 1,018,897 | 1.32 | | 136.7 |
| PE-18 | AVTA3 | 0.25 | 10 | 4845 | 155 | 100 | 0.058 | 70 | 119,314 | 537,961 | 1,052,060 | 3,050,242 | 1.96 | | 134.2 |
| PE-19 | AVTA3 | 0.25 | 10 | 4845 | 155 | 100 | 0.074 | 56 | 190,286 | 435,578 | 741,860 | 1,855,071 | 1.70 | | 134.3 |
| PE-20 | AVTA3 | 0.50 | 20 | 4795 | 205 | 100 | 0.070 | 36 | 280,000 | 202,235 | 315,204 | 756,177 | 1.56 | | 134.9 |
| PE-21 | AVTA3 | 0.50 | 20 | 4795 | 205 | 100 | 0.067 | 35 | 275,657 | 181,659 | 268,361 | 554,715 | 1.48 | | 135.4 |
| PE-22 | AVTA3 | 1.00 | 40 | 4695 | 305 | 100 | 0.067 | 28 | 344,571 | 97,996 | 137,432 | 259,885 | 1.40 | | 135.2 |
| PE-23 | AVTA3 | 1.00 | 40 | 4695 | 305 | 100 | 0.069 | 29 | 342,621 | 98,229 | 147,216 | 343,123 | 1.50 | | 135.2 |
| EO-1 | TnOAl | 0.05 | 2 | 4845 | 105 | 70 | 0.140 | 101 | 199,604 | 699,239 | 1,000,073 | 1,890,093 | 1.43 | 16.7 | 112.9 |
| EO-2 | AVTA3 | 0.25 | 10 | 4795 | 155 | 70 | 0.130 | 24 | 780,000 | 613,941 | 1,225,435 | 3,009,709 | 2.00 | 14.0 | 111.2 |
| EO-3 | AVTA3 | 0.25 | 10 | 4795 | 155 | 70 | 0.120 | 56 | 308,571 | 621,889 | 1,170,603 | 3,058,089 | 1.88 | 16.1 | 112.4 |
| EO-4 | AVTA3 | 0.50 | 20 | 4745 | 205 | 70 | 0.115 | 82 | 201,951 | 335,885 | 755,194 | 2,943,167 | 2.25 | 14.4 | 113.2 |
| EO-5 | AVTA3 | 0.50 | 20 | 4745 | 205 | 70 | 0.052 | 38 | 197,053 | 177,525 | 303,355 | 760,585 | 1.71 | 4.7 | 119.5 |
| EO-6 | AVTA3 | 1.00 | 40 | 4645 | 305 | 70 | 0.114 | 37 | 443,676 | 177,501 | 300,150 | 669,686 | 1.69 | 8.9 | 115.0 |
| EO-7 | AVTA3 | 1.00 | 40 | 4645 | 305 | 70 | 0.082 | 25 | 472,320 | 134,329 | 242,503 | 550,753 | 1.81 | 6.2 | 117.6 |
| EO-8 | TnOAl | 0.05 | 2 | 4845 | 105 | 85 | 0.120 | 181 | 95,470 | 549,028 | 808,311 | 1,315,964 | 1.47 | 20.8 | 110.3 |
| EO-9 | TnOAl | 0.05 | 2 | 4845 | 105 | 85 | 0.115 | 130 | 127,385 | 443,501 | 1,052,865 | 3,999,023 | 2.37 | 19.3 | 110.5 |
| EO-10 | AVTA3 | 0.25 | 10 | 4795 | 155 | 85 | 0.113 | 96 | 169,500 | 395,938 | 1,213,520 | 4,905,773 | 3.06 | 24.5 | 110.3 |
| EO-11 | AVTA3 | 0.25 | 10 | 4795 | 155 | 85 | 0.104 | 33 | 453,818 | 450,414 | 849,932 | 2,049,791 | 1.89 | 23.6 | 108.3 |
| EO-12 | TnOAl | 0.25 | 10 | 4810 | 140 | 85 | 0.121 | 71 | 245,408 | 205,259 | 316,386 | 558,997 | 1.54 | 18.0 | 112.4 |
| EO-13 | AVTA4 | 0.25 | 10 | 4760 | 190 | 85 | 0.122 | 124 | 141,677 | 165,770 | 402,164 | 944,496 | 2.43 | 19.8 | 111.7 |
| EO-14 | AVTA5 | 0.25 | 10 | 4760 | 190 | 85 | 0.110 | 47 | 337,021 | 219,643 | 426,475 | 930,346 | 1.94 | 15.7 | 111.2 |

TABLE 5-continued

High throughput ethylene (PE) and ethylene-octene (EO) runs comparing tri-n-octyl aluminum (TNOAl) vs. AVTA's. Conditions: For all examples in Table 5, 0.025 umol of catalyst 3 was used and activated with 1.1 molar equivalents of dimethylanilinium tetrakis(pentafluorophenyl)borane. For all EO runs, 50 ul of 1-octene was added, and the total reagent and solvent volume in the reactor was 5 ml. All runs utilized 0.05 umol of bis(diisobutyl aluminum)oxide as scavenger. Ethylene (100 psid) was added before catalyst injection and was added to maintain reactor pressure. The run was quenched after 20 psi of ethylene uptake.

| Type of Run | AVTA or TnOAl | AVTA or TnOAl (umol) | AVTA/Cat or TnOAl/Cat (molar ratio) | Iso-hexane (uL) | Toluene (uL) | T (C.) | yield (g) | quench time (s) | Activity (g P/mmol cat · hr) | Rapid Mn | Rapid Mw | Rapid Mz | Rapid PDI | FTIR C8 (wt %) | Tm (° C.) |
|---|---|---|---|---|---|---|---|---|---|---|---|---|---|---|---|
| EO-15 | AVTA3 | 0.50 | 20 | 4745 | 205 | 85 | 0.107 | 65 | 237,046 | 298,521 | 562,949 | 1,375,210 | 1.89 | 16.9 | 109.0 |
| EO-16 | AVTA3 | 0.50 | 20 | 4745 | 205 | 85 | 0.101 | 28 | 519,429 | 259,826 | 527,495 | 1,377,606 | 2.03 | 16.3 | 109.0 |
| EO-17 | TnOAl | 0.50 | 20 | 4810 | 140 | 85 | 0.125 | 37 | 486,486 | 160,324 | 220,213 | 369,105 | 1.37 | 15.4 | 113.5 |
| EO-18 | AVTA4 | 0.50 | 20 | 4710 | 240 | 85 | 0.117 | 51 | 330,353 | 163,071 | 301,301 | 596,389 | 1.85 | 18.4 | 111.9 |
| EO-19 | AVTA5 | 0.50 | 20 | 4710 | 240 | 85 | 0.112 | 49 | 329,143 | 183,979 | 323,797 | 719,084 | 1.76 | 16.2 | 111.2 |
| EO-20 | AVTA3 | 1.00 | 40 | 4645 | 305 | 85 | 0.098 | 23 | 613,565 | 156,718 | 253,205 | 557,359 | 1.62 | 9.7 | 112.8 |
| EO-21 | AVTA3 | 1.00 | 40 | 4645 | 305 | 85 | 0.087 | 26 | 481,846 | 122,922 | 200,078 | 459,467 | 1.63 | 5.8 | 117.9 |
| EO-22 | TnOAl | 1.00 | 40 | 4809 | 140 | 85 | 0.117 | 23 | 732,522 | 100,600 | 127,448 | 185,123 | 1.27 | 11.5 | 114.0 |
| EO-23 | AVTA4 | 1.00 | 40 | 4610 | 340 | 85 | 0.114 | 32 | 513,000 | 118,903 | 215,431 | 473,078 | 1.81 | 20.6 | 112.4 |
| EO-24 | AVTA5 | 1.00 | 40 | 4610 | 340 | 85 | 0.107 | 28 | 550,286 | 125,780 | 215,005 | 467,360 | 1.71 | 16.2 | 111.7 |
| EO-25 | TnOAl | 1.50 | 60 | 4809 | 140 | 85 | 0.115 | 17 | 974,118 | 70,613 | 91,660 | 137,710 | 1.30 | 13.6 | 116.7 |
| EO-26 | AVTA4 | 1.50 | 60 | 4510 | 439 | 85 | 0.113 | 26 | 625,846 | 100,956 | 171,649 | 373,815 | 1.70 | 14.1 | 113.8 |
| EO-27 | AVTA5 | 1.50 | 60 | 4510 | 439 | 85 | 0.109 | 23 | 682,435 | 98,506 | 170,689 | 376,878 | 1.73 | 11.0 | 114.4 |
| EO-28 | TnOAl | 2.00 | 80 | 4809 | 140 | 85 | 0.116 | 14 | 1,193,143 | 58,901 | 76,808 | 115,693 | 1.30 | 8.6 | 118.5 |
| EO-29 | AVTA4 | 2.00 | 80 | 4410 | 539 | 85 | 0.107 | 22 | 700,364 | 80,193 | 133,598 | 278,338 | 1.67 | 11.2 | 115.6 |
| EO-30 | AVTA5 | 2.00 | 80 | 4410 | 539 | 85 | 0.107 | 20 | 770,400 | 87,528 | 133,709 | 262,177 | 1.53 | 10.6 | 115.0 |
| EO-31 | TnOAl | 2.50 | 100 | 4809 | 140 | 85 | 0.112 | 14 | 1,152,000 | 50,989 | 65,163 | 97,643 | 1.28 | 7.4 | 118.8 |
| EO-32 | AVTA4 | 2.50 | 100 | 4310 | 639 | 85 | 0.108 | 19 | 818,526 | 68,664 | 119,550 | 246,617 | 1.74 | 8.5 | 116.6 |
| EO-33 | AVTA5 | 2.50 | 100 | 4310 | 639 | 85 | 0.106 | 21 | 726,857 | 78,826 | 120,684 | 238,990 | 1.53 | 7.0 | 116.7 |
| EO-34 | TnOAl | 0.05 | 2 | 4845 | 105 | 100 | 0.100 | 58 | 248,276 | 308,415 | 557,381 | 1,042,967 | 1.81 | 21.6 | 107.2 |
| EO-35 | TnOAl | 0.05 | 2 | 4845 | 105 | 100 | 0.075 | 73 | 147,945 | 527,364 | 717,343 | 1,108,191 | 1.36 | 11.2 | 107.3 |
| EO-36 | AVTA3 | 0.25 | 10 | 4795 | 155 | 100 | 0.094 | 76 | 178,105 | 320,792 | 601,663 | 1,312,737 | 1.88 | 19.2 | 107.6 |
| EO-37 | AVTA3 | 0.25 | 10 | 4795 | 155 | 100 | 0.090 | 47 | 275,745 | 335,360 | 638,845 | 1,610,188 | 1.90 | 18.0 | 107.1 |
| EO-38 | TnOAl | 0.25 | 10 | 4810 | 140 | 100 | 0.094 | 35 | 386,743 | 173,587 | 246,764 | 398,728 | 1.42 | 15.9 | 109.4 |
| EO-39 | AVTA4 | 0.25 | 10 | 4760 | 190 | 100 | 0.091 | 32 | 409,500 | 161,234 | 282,821 | 607,487 | 1.75 | 18.2 | 108.7 |
| EO-40 | AVTA5 | 0.25 | 10 | 4760 | 190 | 100 | 0.088 | 32 | 396,000 | 167,509 | 284,855 | 601,720 | 1.70 | 13.1 | 110.2 |
| EO-41 | AVTA3 | 0.50 | 20 | 4745 | 205 | 100 | 0.084 | 44 | 274,909 | 200,438 | 317,900 | 650,430 | 1.59 | 10.7 | 108.5 |
| EO-42 | AVTA3 | 0.50 | 20 | 4745 | 205 | 100 | 0.088 | 39 | 324,923 | 240,124 | 414,829 | 1,002,897 | 1.73 | 15.2 | 107.5 |
| EO-43 | TnOAl | 0.50 | 20 | 4810 | 140 | 100 | 0.100 | 24 | 600,000 | 122,961 | 172,818 | 285,387 | 1.41 | 12.7 | 111.5 |
| EO-44 | AVTA4 | 0.50 | 20 | 4710 | 240 | 100 | 0.090 | 26 | 498,462 | 114,065 | 213,077 | 462,835 | 1.87 | 14.9 | 110.5 |
| EO-45 | AVTA5 | 0.50 | 20 | 4710 | 240 | 100 | 0.091 | 27 | 485,333 | 142,588 | 228,232 | 455,435 | 1.60 | 11.6 | 112.4 |
| EO-46 | AVTA3 | 1.00 | 40 | 4645 | 305 | 100 | 0.078 | 25 | 449,280 | 109,700 | 173,250 | 419,808 | 1.58 | 7.9 | 114.5 |
| EO-47 | AVTA3 | 1.00 | 40 | 4645 | 305 | 100 | 0.079 | 25 | 455,040 | 119,665 | 179,796 | 375,746 | 1.50 | 5.8 | 118.5 |
| EO-48 | TnOAl | 1.00 | 40 | 4809 | 140 | 100 | 0.098 | 19 | 742,737 | 79,958 | 103,513 | 152,564 | 1.29 | 13.7 | 113.7 |
| EO-49 | AVTA4 | 1.00 | 40 | 4610 | 340 | 100 | 0.090 | 24 | 540,000 | 100,060 | 156,084 | 312,138 | 1.56 | 12.5 | 111.5 |
| EO-50 | AVTA5 | 1.00 | 40 | 4610 | 340 | 100 | 0.087 | 24 | 522,000 | 106,284 | 159,047 | 304,708 | 1.50 | 10.8 | 112.4 |
| EO-51 | TnOAl | 1.50 | 60 | 4809 | 140 | 100 | 0.092 | 15 | 883,200 | 57,647 | 72,663 | 105,827 | 1.26 | 11.0 | 116.2 |
| EO-52 | AVTA4 | 1.50 | 60 | 4510 | 439 | 100 | 0.087 | 21 | 596,571 | 76,639 | 119,797 | 232,047 | 1.56 | 12.2 | 114.5 |
| EO-53 | AVTA5 | 1.50 | 60 | 4510 | 439 | 100 | 0.083 | 22 | 543,273 | 76,289 | 119,640 | 248,097 | 1.57 | 7.6 | 116.8 |
| EO-54 | TnOAl | 2.00 | 80 | 4809 | 140 | 100 | 0.087 | 15 | 835,200 | 44,450 | 56,907 | 84,988 | 1.28 | 8.0 | 116.5 |
| EO-55 | AVTA4 | 2.00 | 80 | 4410 | 539 | 100 | 0.085 | 18 | 680,000 | 65,794 | 99,659 | 186,703 | 1.51 | 11.3 | 117.1 |
| EO-56 | AVTA5 | 2.00 | 80 | 4410 | 539 | 100 | 0.082 | 18 | 656,000 | 64,297 | 99,337 | 207,970 | 1.54 | 10.2 | 118.1 |
| EO-57 | TnOAl | 2.50 | 100 | 4809 | 140 | 100 | 0.087 | 14 | 894,857 | 37,830 | 49,843 | 80,904 | 1.32 | 13.1 | 117.3 |
| EO-58 | AVTA4 | 2.50 | 100 | 4310 | 639 | 100 | 0.086 | 17 | 728,471 | 54,455 | 89,639 | 174,200 | 1.65 | 7.7 | 118.4 |
| EO-59 | AVTA5 | 2.50 | 100 | 4310 | 639 | 100 | 0.083 | 20 | 597,600 | 56,310 | 87,178 | 181,313 | 1.55 | 10.6 | 118.7 |

TABLE 6

Additional characterization of high throughput PE and EO runs comparing tri-n-octyl aluminum (TNOAl) vs. AVTA's.

| Type of Run | 1H NMR mol % C8 | 1H NMR Wt % C8 | 1H NMR vinylenes/ 1000 C. | 1H NMR trisubs/ 1000 C. | 1H NMR vinyls/ 1000 C. | 1H NMR vinylidenes/ 1000 C. | 1H NMR % vinyl |
|---|---|---|---|---|---|---|---|
| PE-15 | | | 0.05 | 0 | 0.11 | 0 | 69 |
| PE-23 | | | 0.04 | 0 | 0.12 | 0 | 75 |
| EO-2 | 3.0 | 11.1 | | | | | |
| EO-6 | 1.8 | 6.7 | 0.07 | 0.05 | 0.15 | 0.01 | 54 |
| EO-9 | 5.4 | 18.6 | | | | | |
| EO-11 | 3.7 | 13.3 | | | | | |

TABLE 6-continued

Additional characterization of high throughput PE and EO runs comparing tri-n-octyl aluminum (TNOAl) vs. AVTA's.

| Type of Run | 1H NMR mol % C8 | 1H NMR Wt % C8 | 1H NMR vinylenes/ 1000 C. | 1H NMR trisubs/ 1000 C. | 1H NMR vinyls/ 1000 C. | 1H NMR vinylidenes/ 1000 C. | 1H NMR % vinyl |
|---|---|---|---|---|---|---|---|
| EO-15 | 3.5 | 12.8 | | | | | |
| EO-17 | 4.2 | 14.9 | | | | | |
| EO-18 | 4.8 | 16.7 | | | | | |
| EO-19 | 4.7 | 16.6 | | | | | |
| EO-20 | 2.1 | 8.0 | 0.02 | 0 | 0.05 | 0 | 71 |
| EO-22 | 3.8 | 13.5 | | | | | |
| EO-23 | 4.0 | 14.3 | | | | | |
| EO-24 | 3.4 | 12.2 | | | | | |
| EO-28 | 2.6 | 9.8 | | | | | |
| EO-29 | 3.1 | 11.4 | | | | | |
| EO-30 | 2.7 | 10.1 | 0.01 | 0.01 | 0.08 | 0 | 80 |
| EO-31 | 2.7 | 10.0 | | | | | |
| EO-32 | 2.8 | 10.5 | | | | | |
| EO-33 | 2.1 | 8.0 | | | | | |
| EO-34 | 5.6 | 19.2 | | | | | |
| EO-36 | 4.1 | 14.6 | | | | | |
| EO-42 | 2.9 | 10.7 | | | | | |
| EO-43 | 3.9 | 13.9 | | | | | |
| EO-44 | 4.0 | 14.3 | | | | | |
| EO-45 | 2.8 | 10.4 | | | | | |
| EO-47 | 1.3 | 5.0 | 0.02 | 0 | 0.1 | 0 | 83 |
| EO-48 | 3.7 | 13.3 | | | | | |
| EO-49 | 3.5 | 12.6 | | | | | |
| EO-50 | 2.7 | 10.2 | | | | | |
| EO-54 | 3.0 | 11.1 | | | | | |
| EO-55 | 2.4 | 8.9 | | | | | |
| EO-56 | 1.8 | 6.8 | 0.01 | 0 | 0.11 | 0 | 92 |
| EO-57 | 2.9 | 10.6 | | | | | |
| EO-58 | 2.2 | 8.4 | | | | | |
| EO-59 | 1.7 | 6.6 | 0.02 | 0 | 0.13 | 0 | 87 |

TABLE 7

Additional characterization of high throughput PE and EO runs comparing tri-n-octyl aluminum (TNOAl) vs. AVTA's.

| Type of Run | GPC3D Malls Mn | GPC3D Malls Mw | GPC3D Malls Mz | GPC3D Malls Mv | GPC3D Malls Mw/Mn | GPC3D Malls g'(vis) | GPC DRI Mn | GPC DRI Mw | GPC DRI Mz | GPC DRI Mw/Mn |
|---|---|---|---|---|---|---|---|---|---|---|
| PE-9 | 269,178 | 338,477 | 398,608 | 329,351 | 1.26 | 1.03 | 185,665 | 275,765 | 393,243 | 1.49 |
| PE-11 | 310,636 | 619,218 | 1,191,134 | 555,911 | 1.99 | 0.853 | 207,539 | 435,813 | 901,992 | 2.10 |
| PE-13 | 180,217 | 362,977 | 736,974 | 323,882 | 2.01 | 0.851 | 146,397 | 289,819 | 551,116 | 1.98 |
| PE-15 | 59,181 | 91,274 | 143,068 | 85,152 | 1.54 | 0.906 | 54,249 | 89,616 | 149,486 | 1.65 |
| EO-9 | 201,715 | 332,847 | 435,524 | 316,952 | 1.65 | 1.053 | 142,147 | 295,436 | 458,476 | 2.08 |
| EO-11 | 210,890 | 475,673 | 892,771 | 426,204 | 2.26 | 0.893 | 157,214 | 386,919 | 744,042 | 2.46 |
| EO-15 | 155,773 | 313,479 | 586,661 | 282,195 | 2.01 | 0.863 | 123,650 | 265,499 | 514,517 | 2.15 |
| EO-20 | 71,054 | 119,356 | 207,320 | 109,664 | 1.68 | 0.879 | 60,770 | 111,813 | 195,614 | 1.84 |
| EO-22 | 41,978 | 50,836 | 59,683 | 49,529 | 1.21 | 0.99 | 36,186 | 49,322 | 62,820 | 1.36 |
| EO-23 | 53,014 | 93,185 | 138,500 | 86,769 | 1.76 | 0.98 | 43,265 | 92,101 | 129,497 | 2.13 |
| EO-24 | 64,906 | 112,463 | 177,004 | 104,127 | 1.73 | 0.916 | 52,225 | 105,237 | 184,784 | 2.02 |
| EO-29 | 33,442 | 56,228 | 86,569 | 52,325 | 1.68 | 0.976 | 28,258 | 54,308 | 88,618 | 1.92 |
| EO-30 | 35,778 | 59,345 | 95,959 | 55,023 | 1.66 | 0.925 | 29,143 | 55,352 | 93,047 | 1.90 |
| EO-32 | 30,245 | 49,759 | 73,249 | 46,514 | 1.65 | 0.959 | 25,648 | 49,378 | 81,342 | 1.93 |
| EO-33 | 29,738 | 50,351 | 84,155 | 46,486 | 1.69 | 0.913 | 24,314 | 46,758 | 78,289 | 1.92 |
| EO-48 | 34,535 | 42,379 | 50,451 | 41,207 | 1.23 | 0.981 | 29,745 | 41,519 | 53,399 | 1.40 |
| EO-49 | 41,380 | 64,626 | 93,670 | 60,751 | 1.56 | 0.968 | 34,611 | 62,946 | 100,836 | 1.82 |
| EO-50 | 41,429 | 69,968 | 111,177 | 64,917 | 1.69 | 0.928 | 35,247 | 66,489 | 113,186 | 1.89 |
| EO-55 | 26,239 | 40,908 | 60,500 | 38,373 | 1.56 | 0.965 | 22,391 | 39,289 | 61,725 | 1.75 |
| EO-56 | 25,391 | 40,801 | 64,127 | 38,011 | 1.61 | 0.924 | 22,023 | 38,657 | 61,980 | 1.76 |
| EO-58 | 22,944 | 36,453 | 53,146 | 34,170 | 1.59 | 0.952 | 19,189 | 36,130 | 59,305 | 1.88 |
| EO-59 | 23,465 | 36,442 | 56,964 | 34,006 | 1.55 | 0.912 | 19,426 | 34,280 | 55,905 | 1.76 |

TABLE 8

High throughput ethylene-propylene (EP) runs comparing tri-n-octyl aluminum (TNOAl) vs. AVTA's.
Conditions: For all examples in Table 8, 0.025 umol of catalyst 3 was used and activated with 1.1 molar equivalents of dimethylanilinium tetrakis(pentafluorophenyl)borane. Propylene (0.5 ml) was added, and the total reagent and solvent volume in the reactor was 5 ml. All runs utilized 0.05 umol of bis(diisobutyl aluminum)oxide as scavenger. Ethylene (125 psid) was added before catalyst injection and no further ethylene was added to the reactor. The run was quenched after 4 psi of reactor pressure loss.

| Type of Run | AVTA or TnOAl | AVTA or TnOAl (umol) | AVTA/Cat or TnOAl/Cat (molar ratio) | Iso-hexane (uL) | Toluene (uL) | T (C.) | yield (g) | actual quench time (s) | Activity (g P/mmol cat · hr) | Rapid Mn | Rapid Mw | Rapid Mz | Rapid PDI | Tm (° C.) |
|---|---|---|---|---|---|---|---|---|---|---|---|---|---|---|
| EP-1 | TnOAl | 0.25 | 10 | 4153 | 222 | 85 | 0.1043 | 7 | 2,145,600 | 67,972 | 109,049 | 211,680 | 1.60 | 81.8 |
| EP-2 | TnOAl | 1.00 | 40 | 4152 | 222 | 85 | 0.1031 | 5 | 2,969,280 | 43,729 | 64,884 | 113,563 | 1.48 | 58.2 |
| EP-3 | TnOAl | 2.00 | 80 | 4152 | 222 | 85 | 0.1089 | 4 | 3,920,400 | 33,502 | 48,176 | 82,267 | 1.44 | 57.7 |
| EP-4 | TnOAl | 2.50 | 100 | 3903 | 471 | 85 | 0.0960 | 5 | 2,764,800 | 26,660 | 37,702 | 62,821 | 1.41 | 58.0 |
| EP-5 | TnOAl | 3.50 | 140 | 3802 | 571 | 85 | 0.0965 | 5 | 2,779,200 | 18,816 | 28,340 | 47,578 | 1.51 | 56.8 |
| EP-6 | TnOAl | 4.00 | 160 | 3752 | 621 | 85 | 0.0914 | 6 | 2,193,600 | 16,654 | 27,031 | 50,643 | 1.62 | 59.2 |
| EP-7 | TnOAl | 0.25 | 10 | 4153 | 222 | 100 | 0.0735 | 6 | 1,764,000 | 64,713 | 103,324 | 193,061 | 1.60 | 64.8 |
| EP-8 | TnOAl | 1.00 | 40 | 4152 | 222 | 100 | 0.0747 | 6 | 1,792,800 | 41,146 | 59,708 | 104,014 | 1.45 | 64.1 |
| EP-9 | TnOAl | 2.00 | 80 | 4152 | 222 | 100 | 0.0846 | 5 | 2,436,480 | 29,388 | 42,600 | 72,764 | 1.45 | 59.7 |
| EP-10 | TnOAl | 2.50 | 100 | 3903 | 471 | 100 | 0.0723 | 8 | 1,301,400 | 21,546 | 31,559 | 52,878 | 1.46 | 61.5 |
| EP-11 | TnOAl | 3.50 | 140 | 3802 | 571 | 100 | 0.0733 | 6 | 1,759,200 | 16,987 | 25,780 | 45,518 | 1.52 | 62.0 |
| EP-12 | TnOAl | 4.00 | 160 | 3752 | 621 | 100 | 0.0800 | 6 | 1,920,000 | 16,001 | 23,216 | 37,792 | 1.45 | 61.3 |
| EP-13 | AVTA6 | 0.25 | 10 | 4103 | 272 | 85 | 0.1204 | 6 | 2,889,600 | 78,151 | 127,911 | 253,188 | 1.64 | 77.7 |
| EP-14 | AVTA6 | 0.25 | 10 | 4103 | 272 | 85 | 0.1183 | 6 | 2,839,200 | 71,587 | 125,152 | 261,760 | 1.75 | 77.8 |
| EP-15 | AVTA6 | 0.50 | 20 | 4053 | 322 | 85 | 0.1133 | 5 | 3,263,040 | 59,429 | 105,051 | 232,175 | 1.77 | 51.1 |
| EP-16 | AVTA6 | 0.50 | 20 | 4053 | 322 | 85 | 0.1114 | 5 | 3,208,320 | 75,246 | 117,984 | 221,817 | 1.57 | 77.5 |
| EP-17 | AVTA6 | 1.00 | 40 | 3953 | 422 | 85 | 0.1137 | 6 | 2,728,800 | 61,453 | 95,950 | 179,986 | 1.56 | 76.2 |
| EP-18 | AVTA6 | 1.00 | 40 | 3953 | 422 | 85 | 0.1055 | 5 | 3,038,400 | 66,359 | 101,981 | 187,782 | 1.54 | 76.5 |
| EP-19 | AVTA6 | 1.50 | 60 | 3852 | 522 | 85 | 0.1124 | 4 | 4,046,400 | 52,308 | 82,508 | 151,749 | 1.58 | 78.2 |
| EP-20 | AVTA6 | 1.50 | 60 | 3852 | 522 | 85 | 0.1100 | 5 | 3,168,000 | 51,255 | 80,957 | 158,041 | 1.58 | 77.3 |
| EP-21 | AVTA6 | 2.00 | 80 | 3752 | 622 | 85 | 0.1094 | 4 | 3,938,400 | 47,065 | 76,384 | 142,407 | 1.62 | 77.6 |
| EP-22 | AVTA6 | 2.00 | 80 | 3752 | 622 | 85 | 0.1096 | 4 | 3,945,600 | 45,201 | 72,630 | 133,617 | 1.61 | 78.5 |
| EP-23 | AVTA6 | 2.50 | 100 | 3902 | 472 | 85 | 0.1266 | 12 | 1,519,200 | 42,865 | 64,749 | 114,193 | 1.51 | 79.5 |
| EP-24 | AVTA6 | 2.50 | 100 | 3902 | 472 | 85 | 0.1090 | 6 | 2,616,000 | 37,994 | 63,475 | 123,530 | 1.67 | 48.5 |
| EP-25 | AVTA6 | 3.00 | 120 | 3853 | 521 | 85 | 0.1016 | 6 | 2,438,400 | 36,321 | 55,951 | 103,929 | 1.54 | 48.2 |
| EP-26 | AVTA6 | 3.00 | 120 | 3853 | 521 | 85 | 0.0858 | 4 | 3,088,800 | 29,387 | 46,845 | 90,026 | 1.59 | 48.7 |
| EP-27 | AVTA6 | 3.50 | 140 | 3803 | 571 | 85 | 0.0977 | 4 | 3,517,200 | 33,698 | 50,951 | 90,871 | 1.51 | 49.6 |
| EP-28 | AVTA6 | 3.50 | 140 | 3803 | 571 | 85 | 0.0913 | 8 | 1,643,400 | 31,413 | 49,244 | 95,948 | 1.57 | 50.4 |
| EP-29 | AVTA6 | 4.00 | 160 | 3752 | 621 | 85 | 0.1030 | 5 | 2,966,400 | 31,398 | 47,632 | 88,667 | 1.52 | 49.2 |
| EP-30 | AVTA6 | 4.00 | 160 | 3752 | 621 | 85 | 0.0855 | 8 | 1,539,000 | 27,437 | 42,519 | 75,933 | 1.55 | 53.6 |
| EP-31 | AVTA6 | 0.25 | 10 | 4103 | 272 | 100 | 0.0752 | 4 | 2,707,200 | 63,687 | 110,219 | 217,194 | 1.73 | 76.8 |
| EP-32 | AVTA6 | 0.25 | 10 | 4103 | 272 | 100 | 0.0743 | 8 | 1,337,400 | 79,827 | 127,045 | 239,886 | 1.59 | 77.0 |
| EP-33 | AVTA6 | 0.50 | 20 | 4053 | 322 | 100 | 0.0807 | 6 | 1,936,800 | 74,873 | 112,536 | 214,498 | 1.50 | 77.0 |
| EP-34 | AVTA6 | 0.50 | 20 | 4053 | 322 | 100 | 0.0740 | 8 | 1,332,000 | 75,379 | 117,122 | 225,050 | 1.55 | 77.2 |
| EP-35 | AVTA6 | 1.00 | 40 | 3953 | 422 | 100 | 0.0958 | 4 | 3,448,800 | 50,724 | 91,423 | 210,433 | 1.80 | 78.0 |
| EP-36 | AVTA6 | 1.00 | 40 | 3953 | 422 | 100 | 0.0747 | 6 | 1,792,800 | 61,174 | 95,596 | 199,242 | 1.56 | 77.3 |
| EP-37 | AVTA6 | 1.50 | 60 | 3852 | 522 | 100 | 0.0827 | 6 | 1,984,800 | 52,151 | 76,520 | 134,291 | 1.47 | 54.8 |
| EP-38 | AVTA6 | 1.50 | 60 | 3852 | 522 | 100 | 0.0770 | 5 | 2,217,600 | 48,206 | 74,533 | 136,323 | 1.55 | 79.5 |
| EP-39 | AVTA6 | 2.00 | 80 | 3752 | 622 | 100 | 0.0815 | 4 | 2,934,000 | 43,859 | 64,594 | 108,492 | 1.47 | 54.3 |
| EP-40 | AVTA6 | 2.00 | 80 | 3752 | 622 | 100 | 0.0724 | 5 | 2,085,120 | 41,366 | 66,139 | 122,413 | 1.60 | 81.0 |
| EP-41 | AVTA6 | 2.50 | 100 | 3902 | 472 | 100 | 0.0816 | 4 | 2,937,600 | 35,439 | 54,230 | 95,042 | 1.53 | 64.9 |
| EP-42 | AVTA6 | 2.50 | 100 | 3902 | 472 | 100 | 0.0827 | 6 | 1,984,800 | 36,506 | 56,256 | 102,928 | 1.54 | 52.1 |
| EP-43 | AVTA6 | 3.00 | 120 | 3853 | 521 | 100 | 0.0706 | 6 | 1,694,400 | 29,872 | 47,713 | 93,343 | 1.60 | 61.5 |
| EP-44 | AVTA6 | 3.00 | 120 | 3853 | 521 | 100 | 0.0589 | 6 | 1,413,600 | 24,302 | 39,721 | 74,548 | 1.63 | 59.0 |
| EP-45 | AVTA6 | 3.50 | 140 | 3803 | 571 | 100 | 0.0758 | 4 | 2,728,800 | 27,566 | 42,196 | 75,991 | 1.53 | 55.1 |
| EP-46 | AVTA6 | 3.50 | 140 | 3803 | 571 | 100 | 0.0687 | 5 | 1,978,560 | 24,509 | 39,219 | 79,688 | 1.60 | 54.4 |
| EP-47 | AVTA6 | 4.00 | 160 | 3752 | 621 | 100 | 0.0863 | 6 | 2,071,200 | 26,086 | 41,385 | 75,097 | 1.59 | 50.6 |
| EP-48 | AVTA6 | 4.00 | 160 | 3752 | 621 | 100 | 0.0736 | 6 | 1,766,400 | 25,416 | 39,211 | 71,108 | 1.54 | 60.2 |

TABLE 9

Additional characterization of high throughput EP runs comparing tri-n-octyl aluminum (TNOAl) vs. AVTA's.

| Type of Run | 1H NMR mol % C3 | 1H NMR Wt % C3 | 1H NMR vinylenes/ 1000 C. | 1H NMR trisubs/ 1000 C. | 1H NMR vinyls/ 1000 C. | 1H NMR vinylidene/ 1000 C. | 1H NMR % vinyl |
|---|---|---|---|---|---|---|---|
| EP-2 | 15.9 | 22.1 | | | | | |
| EP-6 | 14.8 | 20.6 | | | | | |
| EP-13 | 16.2 | 22.5 | | | | | |
| EP-15 | 16.4 | 22.7 | | | | | |
| EP-17 | 16.0 | 22.2 | | | | | |

TABLE 9-continued

Additional characterization of high throughput EP runs comparing tri-n-octyl aluminum (TNOAl) vs. AVTA's.

| Type of Run | 1H NMR mol % C3 | 1H NMRW t % C3 | 1H NMR vinylenes/ 1000 C. | 1H NMR trisubs/ 1000 C. | 1H NMR vinyls/ 1000 C. | 1H NMR vinylidene/ 1000 C. | 1H NMR % vinyl |
|---|---|---|---|---|---|---|---|
| EP-19 | 16.1 | 22.4 | 0.00 | 0.00 | 0.22 | 0.02 | 92 |
| EP-22 | 16.2 | 22.5 | 0.00 | 0.01 | 0.32 | 0.02 | 91 |
| EP-23 | 20.5 | 27.8 | 0.03 | 0.09 | 0.36 | 0.03 | 71 |
| EP-25 | 16.2 | 22.5 | 0.00 | 0.01 | 0.59 | 0.01 | 97 |
| EP-27 | 15.5 | 21.6 | 0.00 | 0.02 | 0.69 | 0.02 | 90 |
| EP-29 | 16.7 | 23.1 | 0.00 | 0.14 | 0.85 | 0.12 | 77 |
| EP-35 | 15.5 | 21.5 | 0.02 | 0.00 | 0.16 | 0.00 | 89 |
| EP-39 | 14.5 | 20.3 | 0.00 | 0.00 | 0.40 | 0.01 | 98 |
| EP-43 | 14.0 | 19.6 | 0.05 | 0.07 | 0.94 | 0.02 | 87 |
| EP-45 | 14.8 | 20.6 | 0.00 | 0.05 | 1.11 | 0.07 | 90 |

TABLE 10

Additional characterization of high throughput EP runs comparing tri-n-octyl aluminum (TNOAl) vs. AVTA's.

| Type of Run | GPC3D Malls Mn | GPC3D Malls Mw | GPC3D Malls Mz | GPC3D Malls Mv | GPC3D Malls Mw/Mn | GPC3D Malls g'(vis) | GPC DRI Mn | GPC DRI Mw | GPC DRI Mz | GPC DRI Mw/Mn |
|---|---|---|---|---|---|---|---|---|---|---|
| EP-2 | 14,489 | 22,885 | 32,096 | 21,453 | 1.58 | 1.008 | 14,281 | 26,613 | 39,609 | 1.86 |
| EP-6 | 7,297 | 9,962 | 14,592 | 9,361 | 1.37 | 0.924 | 6,289 | 15,722 | 194,650 | 2.50 |
| EP-15 | 26,294 | 45,960 | 71,298 | 42,534 | 1.75 | 1.01 | 25,456 | 48,885 | 76,945 | 1.92 |
| EP-17 | 24,575 | 39,981 | 59,048 | 37,257 | 1.63 | 0.993 | 21,352 | 44,047 | 70,220 | 2.06 |
| EP-19 | 19,973 | 32,240 | 48,552 | 29,971 | 1.61 | 0.982 | 18,642 | 35,173 | 54,576 | 1.89 |
| EP-22 | 16,907 | 28,253 | 41,941 | 26,274 | 1.67 | 0.97 | 16,225 | 31,332 | 49,800 | 1.93 |
| EP-23 | 18,364 | 24,235 | 35,861 | 22,514 | 1.32 | 0.988 | 13,362 | 27,525 | 44,982 | 2.06 |
| EP-25 | 12,927 | 19,373 | 27,632 | 18,061 | 1.50 | 0.968 | 11,163 | 22,696 | 37,230 | 2.03 |
| EP-27 | 11,643 | 17,388 | 25,818 | 16,001 | 1.49 | 0.997 | 10,721 | 20,825 | 33,102 | 1.94 |
| EP-29 | 10,897 | 17,203 | 24,844 | 16,066 | 1.58 | 0.957 | 10,645 | 19,239 | 29,507 | 1.81 |
| EP-35 | 23,038 | 34,891 | 50,878 | 32,530 | 1.51 | 0.989 | 20,759 | 39,299 | 64,023 | 1.89 |
| EP-39 | 16,047 | 25,018 | 37,105 | 23,167 | 1.56 | 0.993 | 14,304 | 28,148 | 43,491 | 1.97 |
| EP-43 | 11,529 | 16,828 | 23,965 | 15,738 | 1.46 | 0.955 | 9,072 | 19,065 | 30,144 | 2.10 |
| EP-45 | 9,906 | 14,955 | 22,297 | 13,866 | 1.51 | 0.978 | 9,068 | 17,299 | 26,908 | 1.91 |

Unless otherwise indicated, molecular weight (weight-average molecular weight, $M_w$, number-average molecular weight, $M_n$, and molecular weight distribution, $M_w/M_n$ or MWD, and branching index (g'vis)) are determined using a High Temperature Size Exclusion Chromatograph (either from Waters Corporation or Polymer Laboratories), equipped with a differential refractive index detector (DRI), an online light scattering (LS) detector, and a viscometer. Experimental details not described below, including how the detectors are calibrated, are described in: T. Sun, P. Brant, R. R. Chance, and W. W. Graessley, Macromolecules, Volume 34, Number 19, 6812-6820, (2001).

Three Polymer Laboratories PLgel 10 mm Mixed-B columns are used. The nominal flow rate was 0.5 cm³/min, and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of Aldrich reagent grade 1, 2, 4 trichlorobenzene (TCB). The TCB mixture is then filtered through a 0.7 μm glass pre-filter and subsequently through a 0.1 μm Teflon filter. The TCB is then degassed with an online degasser before entering the SEC. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 135° C. The injection concentration ranges from 1.0 to 2.0 mg/ml, with lower concentrations being used for higher molecular weight samples. Prior to running each sample the DRI detector and the injector are purged. Flow rate in the apparatus is then increased to 0.5 ml/minute, and the DRI is allowed to stabilize for 8-9 hours before injecting the first sample. The LS laser is turned on 1 to 1.5 hours before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the same as described below for the light scattering (LS) analysis. Units on parameters throughout this description of the SEC method are such that concentration is expressed in g/cm³, molecular weight is expressed in g/mole, and intrinsic viscosity is expressed in dL/g.

The light scattering detector used is a Wyatt Technology High Temperature mini-DAWN. The polymer molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle $\theta$, c is the polymer concentration determined from the DRI analysis, $A_2$ is the second virial coefficient [for purposes of this invention and the claims thereto, $A_2$=0.0006 for propylene polymers and 0.001 otherwise], $P(\theta)$ is the form factor for a monodisperse random coil (M. B. Huglin, LIGHT SCATTERING FROM POLYMER SOLUTIONS, Academic Press, 1971), and $K_O$ is the optical constant for the system:

$$K_o = \frac{4\pi^2 n^2 (dn/dc)^2}{\lambda^4 N_A}$$

in which $N_A$ is Avogadro's number, and (dn/dc) is the refractive index increment for the system. The refractive index, n=1.500 for TCB at 135° C. and $\lambda$=690 nm. For purposes of this invention and the claims thereto (dn/dc) =0.104 for propylene polymers and 0.1 otherwise.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the following equation:

$$\eta_s = c[\eta] + 0.3(c[\eta])^2$$

where c is concentration and is determined from the DRI output.

The branching index, g' (also referred to as g'vis), is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index g'vis is defined as:

$$g' = \frac{[\eta]_{avg}}{kM_v^\alpha}$$

where, for purpose of this invention and claims thereto, $\alpha$=0.695 for ethylene, propylene, and butene polymers; and k=0.000579 for ethylene polymers, k=0.000262 for propylene polymers, and k=0.000181 for butene polymers. $M_v$ is the viscosity-average molecular weight based on molecular weights determined by LS analysis.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

What is claimed is:

1. A catalyst system comprising a pyridyldiamido transition metal complex represented by the formula:

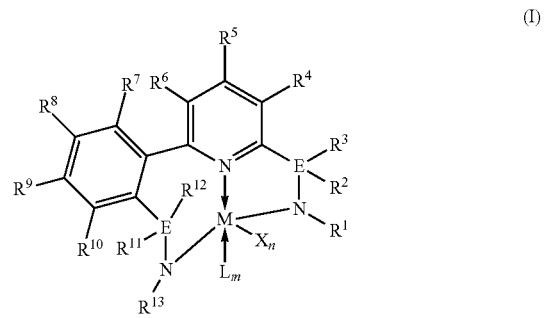

wherein:
M is a Group 3, 4, 5, 6, 7, 8, or metal;
E is selected from carbon, silicon, or germanium;
X is an anionic leaving group;
L is a neutral Lewis base;
$R^1$ and $R^{13}$ are each independently selected from the group consisting of hydrocarbyls, substituted hydrocarbyls, and silyl groups;
$R^2$, $R^3$, $R^4$, $R^5$, $R^6$, $R^7$, $R^8$, $R^9$, $R^{10}$, $R^{11}$, and $R^{12}$ are each independently selected from the group consisting of hydrogen, hydrocarbyls, alkoxy, silyl, amino, aryloxy, substituted hydrocarbyls, halogen, and phosphino;
n is 1 or 2;
m is 0, 1, or 2; and
two X groups may be joined together to form a dianionic group;
two L groups may be joined together to form a bidentate Lewis base;
an X group may be joined to an L group to form a monoanionic bidentate group;
$R^7$ and $R^8$ may be joined to form a ring;
$R^{10}$ and $R^{11}$ are joined to form a ring;
an activator; and
a metal hydrocarbenyl chain transfer agent.

2. The catalyst system of claim 1, wherein the metal hydrocarbenyl chain transfer agent is an aluminum vinyl transfer agent, AVTA.

3. The catalyst system of claim 1, wherein M is Ti, Zr, or Hf.

4. The catalyst system of claim 1, wherein E is carbon.

5. The catalyst system of claim 1, wherein X is an alkyl, aryl, hydride, alkylsilane, fluoride, chloride, bromide, iodide, triflate, carboxylate, or alkylsulfonate.

6. The catalyst system of claim 1, wherein L is an ether, amine, or thioether.

7. The catalyst system of claim 1, wherein the activator comprises an alumoxane and or a non-coordinating anion.

8. The catalyst system of claim 7, wherein the activator comprises one or more of:
trimethylammonium tetrakis(perfluoronaphthyl)borate, N,N-dimethylanilinium tetrakis(perfluoronaphthyl)borate, N,N-diethylanilinium tetrakis(perfluoronaphthyl)borate, triphenylcarbenium tetrakis(perfluoronaphthyl)borate, trimethylammonium tetrakis(perfluorobiphenyl)borate, N,N-dimethylanilinium tetrakis(perfluorobiphenyl)borate, triphenylcarbenium tetrakis(perfluorobiphenyl)borate, N,N-dimethylanilinium tetrakis(3,5-bis(trifluoromethyl)phenyl)borate, triphenylcarbenium tetrakis(3,5-bis(trifluoromethyl)phenyl)borate, triphenylcarbenium tetrakis(perfluorophenyl)borate, $[Me_3NH^+][B(C_6F_5)_4^-]$, 1-(4-(tris(pentafluorophenyl)borate)-2,3,5,6-tetrafluorophenyl)pyrrolidinium, 4-(tris(pentafluorophenyl)borate)-2,3,5,6-tetrafluoropyridinium, triphenylcarbenium tetraphenylborate, and triphenylcarbenium tetrakis-(2,3,4,6-tetrafluorophenyl)borate.

9. The catalyst system of claim 1, wherein the metal hydrocarbenyl chain transfer agent is represented by the formula:

$$Al(R')_{3-y}(R'')_y \text{ or } E[Al(R')_{2-y}(R'')_y]_2$$

wherein each R', independently, is a $C_1$-$C_{30}$ hydrocarbyl group;
each R'', independently, is a $C_4$-$C_{20}$ hydrocarbenyl group having an allyl chain end;
E is a group 16 element;
v is from 0.01 to 3; and
y is from 0.01 to 2.

10. The catalyst system of claim 9, wherein R'' is butenyl, pentenyl, heptenyl, or octenyl and or R' is methyl, ethyl, propyl, isobutyl, or butyl.

11. The catalyst system of claim 1, wherein the catalyst system does not comprise a metallocene.

12. The catalyst system of claim 9, wherein v=2.

13. A polymerization process comprising contacting one or more alkene monomers with the catalyst system of claim 1.

14. The process of claim 13, wherein the activator comprises an alumoxane.

15. The process of claim 13, wherein the activator comprises a non-coordinating anion.

16. The process of claim 13, wherein the one or more monomers comprises ethylene or propylene.

17. The process of claim 13, wherein the one or more monomers comprise at least two of ethylene, propylene, and an alkyl diene.

18. The process of claim 13, wherein the pyridyldiamido transition metal complex is supported.

19. The process of claim 18, wherein the support is silica.

20. The process of claim 13, wherein the metal hydrocarbenyl chain transfer agent is represented by the formula:

$$Al(R')_{3-y}(R'')_y \text{ or } E[Al(R')_{2-y}(R'')_y]_2$$

wherein each R', independently, is a $C_1$-$C_{30}$ hydrocarbyl group;
each R'', independently, is a $C_4$-$C_{20}$ hydrocarbenyl group having an allyl chain end;
E is a group 16 element;
v is from 0.01 to 3; and
y is from 0.01 to 2.

21. The process of claim 20, wherein R'' is butenyl, pentenyl, heptenyl, or octenyl, R' is methyl, ethyl, propyl, isobutyl, or butyl and v=2.

22. The process of claim 13, further comprising adding a metallocene after contacting one or more alkene monomers with the catalyst system.

23. The process of claim 22, wherein the adding a metallocene is conducted in a second reactor.

24. The process of claim 22, wherein the contacting one or more alkene monomers with the catalyst system and the adding a metallocene are performed in a continuous stirred tank reactor.

25. A polymerization process to produce polyolefin having allyl chain ends, and optionally a g'vis of 0.95 or more, comprising contacting one or more alkene monomers with the catalyst system of claim 1 where moles of metal hydrocarbenyl chain transfer agent added to the reactor relative to an amount of polymer produced is 500,000 or more.

26. A polymerization process to produce polyolefin having a g'vis of 0.95 or less comprising contacting one or more alkene monomers with the catalyst system of claim 1 where moles of metal hydrocarbenyl chain transfer agent added to a reactor relative to an amount of polymer produced is less than 500,000.

27. A catalyst system comprising a pyridyldiamido transition metal complex represented by the formula:

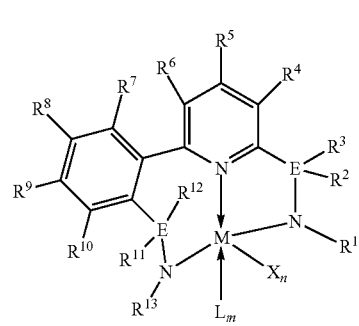

(I)

wherein:
M is a Group 3, 4, 5, 6, 7, 8, or 9 metal;
E is selected from carbon, silicon, or germanium;
X is an anionic leaving group;
L is a neutral Lewis base;
$R^1$ and $R^{13}$ are each independently selected from the group consisting of hydrocarbyls, substituted hydrocarbyls, and silyl groups;
$R^2$, $R^3$, $R^4$, $R^5$, $R^6$, $R^7$, $R^8$, $R^9$, $R^{10}$, $R^{11}$ and $R^{12}$ are each independently selected from the group consisting of hydrogen, hydrocarbyls, alkoxy, silyl, amino, aryloxy, substituted hydrocarbyls, halogen, and phosphino;
n is 1 or 2;
m is 0, 1, or 2; and
two X groups may be joined together to form a dianionic group;
two L groups may be joined together to form a bidentate Lewis base;
an X group may be joined to an L group to form a monoanionic bidentate group;
$R^7$ and $R^8$ may be joined to form a ring;
$R^{10}$ and $R^{11}$ are joined to form a ring;
an activator; and aluminum vinyl transfer agent represented by the formula: Al(R')$_{3-v}$(R")$_v$, wherein each R', independently, is a C$_1$ to C$_{30}$ hydrocarbyl group; each R", independently, is a C$_4$ to C$_{20}$ hydrocarbyl group having an allyl chain end; v is from 0.01 to 3.

28. The catalyst system of claim 27, wherein the aluminum vinyl transfer agent comprises one or more of tri(but-3-en-1-yl)aluminum, tri(pent-4-en-1-yl)aluminum, tri(oct-7-en-1-yl)aluminum, tri(non-8-en-1-yl)aluminum, tri(dec-9-en-1-yl)aluminum, dimethyl(oct-7-en-1-yl)aluminum, diethyl(oct-7-en-1-yl)aluminum, dibutyl(oct-7-en-1-yl)aluminum, diisobutyl(oct-7-en-1-yl)aluminum, diisobutyl(non-8-en-1-yl)aluminum, diisobutyl(dec-9-en-1-yl)aluminum, and diisobutyl(dodec-11-en-1-yl)aluminum.

29. A polymerization process comprising contacting one or more alkene monomers with the catalyst system of claim 27.

30. A catalyst system comprising an activator; and aluminum vinyl transfer agent represented by the formula: Al(R')$_{3-v}$(R")$_v$, wherein each R', independently, is a C$_1$ to C$_{30}$ hydrocarbyl group; each R", independently, is a C$_7$ to C$_{20}$ hydrocarbenyl group having an allyl chain end; v is from 0.01 to 3; and a transition metal complex represented by the formula:

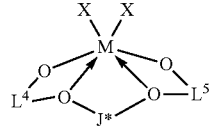

where: (1) J* is a divalent bridging group comprising C, Si, or both; (2) M is a group 4 metal; (3) O is oxygen; (4) each X is independently a univalent anionic ligand, or two Xs are joined and bound to the metal atom to form a metallocycle ring, or two Xs are joined to form a chelating ligand, a diene ligand, or an alkylidene ligand; and (5) L$^4$ and L$^5$ are independently, a substituted monocyclic or polycyclic aromatic group.

* * * * *